(12) United States Patent
Olson et al.

(10) Patent No.: US 10,933,370 B2
(45) Date of Patent: Mar. 2, 2021

(54) SORBENTS FOR THE OXIDATION AND REMOVAL OF MERCURY

(71) Applicant: Midwest Energy Emissions Corp., Lewis Center, OH (US)

(72) Inventors: Edwin S. Olson, Grand Forks, ND (US); Michael J. Holmes, Thompson, ND (US); John H. Pavlish, East Grand Forks, MN (US)

(73) Assignee: Midwest Energy Emissions Corp, Corsicana, TX (US)

( * ) Notice: Subject to any disclaimer, the term of this patent is extended or adjusted under 35 U.S.C. 154(b) by 245 days.

(21) Appl. No.: 15/951,970

(22) Filed: Apr. 12, 2018

(65) Prior Publication Data

US 2018/0229182 A1    Aug. 16, 2018

Related U.S. Application Data

(60) Continuation of application No. 14/712,558, filed on May 14, 2015, now Pat. No. 10,589,225, which is a
(Continued)

(51) Int. Cl.
*B01D 53/10* (2006.01)
*B01D 53/64* (2006.01)
(Continued)

(52) U.S. Cl.
CPC .............. *B01D 53/64* (2013.01); *B01D 53/10* (2013.01); *B01J 20/02* (2013.01); *B01J 20/027* (2013.01);
(Continued)

(58) Field of Classification Search
CPC ........ B01D 53/02; B01D 53/04; B01D 53/10; B01D 53/64; B01D 2253/102;
(Continued)

(56) References Cited

U.S. PATENT DOCUMENTS 1,984,164 A    12/1934  Alfred
2,317,857 A     4/1943  Soday
(Continued)

FOREIGN PATENT DOCUMENTS

CA       1099490 A      4/1981
CA       2150529 A1    12/1995
(Continued)

OTHER PUBLICATIONS

"U.S. Appl. No. 10/554,018 Response filed Nov. 1, 2010 to Final Office Action dated Apr. 27, 2010", 17 pgs.
(Continued)

*Primary Examiner* — Frank M Lawrence, Jr.
(74) *Attorney, Agent, or Firm* — Schwegman Lundberg & Woessner, P.A.

(57) ABSTRACT

A promoted activated carbon sorbent is described that is highly effective for the removal of mercury from flue gas streams. The sorbent comprises a new modified carbon form containing reactive forms of halogen and halides. Optional components may be added to increase reactivity and mercury capacity. These may be added directly with the sorbent, or to the flue gas to enhance sorbent performance and/or mercury capture. Mercury removal efficiencies obtained exceed conventional methods. The sorbent can be regenerated and reused. Sorbent treatment and preparation methods are also described. New methods for in-flight preparation, introduction, and control of the active sorbent into the mercury contaminated gas stream are described.

18 Claims, 11 Drawing Sheets

Related U.S. Application Data continuation of application No. 14/318,270, filed on Jun. 27, 2014, now Pat. No. 9,757,689, which is a continuation of application No. 13/966,768, filed on Aug. 14, 2013, now Pat. No. 8,821,819, which is a continuation of application No. 13/427,665, filed on Mar. 22, 2012, now Pat. No. 8,512,655, which is a continuation of application No. 12/419,219, filed on Apr. 6, 2009, now Pat. No. 8,168,147, which is a continuation of application No. 12/201,595, filed on Aug. 29, 2008, now abandoned, which is a division of application No. 11/209,163, filed on Aug. 22, 2005, now Pat. No. 7,435,286.

(60) Provisional application No. 60/605,640, filed on Aug. 30, 2004.

(51) Int. Cl.
| | | |
|---|---|---|
| *B01J 20/20* | (2006.01) | |
| *B01J 20/02* | (2006.01) | |
| *B01J 20/04* | (2006.01) | |
| *B01J 20/10* | (2006.01) | |
| *B01J 20/12* | (2006.01) | |
| *B01J 20/22* | (2006.01) | |
| *B01J 20/28* | (2006.01) | |
| *B01J 20/34* | (2006.01) | |

(52) U.S. Cl.
CPC ........... *B01J 20/0262* (2013.01); *B01J 20/04* (2013.01); *B01J 20/041* (2013.01); *B01J 20/043* (2013.01); *B01J 20/10* (2013.01); *B01J 20/106* (2013.01); *B01J 20/12* (2013.01); *B01J 20/20* (2013.01); *B01J 20/22* (2013.01); *B01J 20/223* (2013.01); *B01J 20/28004* (2013.01); *B01J 20/28016* (2013.01); *B01J 20/3416* (2013.01); *B01D 2253/102* (2013.01); *B01D 2253/25* (2013.01); *B01D 2257/602* (2013.01); *B01D 2258/0283* (2013.01); *B01J 2220/42* (2013.01); *Y10S 95/901* (2013.01)

(58) Field of Classification Search
CPC .......... B01D 2253/25; B01D 2257/602; B01D 2258/0283; B01J 20/02; B01J 20/0262; B01J 20/027; B01J 20/04; B01J 20/041; B01J 20/043; B01J 20/10; B01J 20/106; B01J 20/12; B01J 20/20; B01J 20/22; B01J 20/223; B01J 20/28004; B01J 20/28016; B01J 20/3416; B01J 2220/42; Y10S 95/901
USPC .................... 95/134, 142; 110/345; 423/210
See application file for complete search history.

(56) References Cited

U.S. PATENT DOCUMENTS

| | | | |
|---|---|---|---|
| 3,194,629 A | 7/1965 | Dreibelbis et al. | |
| 3,341,185 A | 9/1967 | Kennedy, Sr. | |
| 3,662,523 A | 5/1972 | Revoir et al. | |
| 3,786,619 A | 1/1974 | Melkersson | |
| 3,826,618 A | 7/1974 | Capuano | |
| 3,849,267 A | 11/1974 | Hilgen et al. | |
| 3,876,393 A | 4/1975 | Kasai et al. | |
| 3,935,708 A | 2/1976 | Harrewijne et al. | |
| 4,013,516 A * | 3/1977 | Greenfield | C10B 47/30 201/2.5 |
| 4,094,777 A | 6/1978 | Sugier et al. | |
| 4,101,631 A | 7/1978 | Ambrosini et al. | |
| 4,196,173 A | 4/1980 | DeJong et al. | |
| 4,338,896 A | 7/1982 | Papasideris | |
| 4,342,192 A | 8/1982 | Heyn et al. | |
| 4,500,327 A * | 2/1985 | Nishino | B01D 53/02 502/406 |
| 4,530,765 A | 7/1985 | Sabherwal | |
| 4,699,896 A * | 10/1987 | Sing | B01J 21/18 264/29.2 |
| 4,708,853 A | 11/1987 | Matviya et al. | |
| 4,772,455 A | 9/1988 | Izumi et al. | |
| 4,786,483 A | 11/1988 | Audeh | |
| 4,814,152 A | 3/1989 | Yan | |
| 4,820,318 A | 4/1989 | Chang et al. | |
| 4,889,698 A | 12/1989 | Moller et al. | |
| 4,956,162 A | 9/1990 | Smith et al. | |
| 5,245,120 A | 9/1993 | Srinivasachar et al. | |
| 5,288,306 A | 2/1994 | Aibe et al. | |
| 5,300,137 A | 4/1994 | Weyand et al. | |
| 5,336,835 A | 8/1994 | McNamara | |
| 5,346,674 A | 9/1994 | Weinwurm et al. | |
| 5,409,522 A | 4/1995 | Durham et al. | |
| 5,419,834 A | 5/1995 | Straten | |
| 5,435,980 A * | 7/1995 | Felsvang | B01D 53/10 423/210 |
| 5,462,908 A | 10/1995 | Liang et al. | |
| 5,480,619 A | 1/1996 | Johnson et al. | |
| 5,500,306 A | 3/1996 | Hsu et al. | |
| 5,505,766 A | 4/1996 | Chang | |
| 5,556,447 A * | 9/1996 | Srinivasachar | B09C 1/06 588/256 |
| 5,569,436 A * | 10/1996 | Lerner | B01D 53/64 110/235 |
| 5,575,982 A | 11/1996 | Reiss et al. | |
| 5,607,496 A | 3/1997 | Brooks | |
| 5,672,323 A | 9/1997 | Bhat et al. | |
| 5,695,726 A | 12/1997 | Lerner | |
| 5,785,935 A | 7/1998 | Fristad et al. | |
| 5,827,352 A | 10/1998 | Altman et al. | |
| 5,891,324 A | 4/1999 | Ohtsuka | |
| 6,001,762 A | 12/1999 | Harmer et al. | |
| 6,013,593 A | 1/2000 | Lee et al. | |
| 6,027,551 A | 2/2000 | Hwang et al. | |
| 6,074,974 A | 6/2000 | Lee et al. | |
| 6,080,281 A | 6/2000 | Attia | |
| 6,103,205 A * | 8/2000 | Wojtowicz | B01D 53/04 423/210 |
| 6,136,072 A | 10/2000 | Sjostrom et al. | |
| 6,136,749 A * | 10/2000 | Gadkaree | B01D 53/8665 502/180 |
| 6,214,304 B1 | 4/2001 | Rosenthal et al. | |
| 6,258,334 B1 | 7/2001 | Gadkaree et al. | |
| 6,284,199 B1 | 9/2001 | Downs et al. | |
| 6,342,462 B1 | 1/2002 | Kulprathipanja | |
| 2,456,272 A1 | 2/2002 | Pahlman et al. | |
| 6,372,187 B1 * | 4/2002 | Madden | B01D 53/508 110/345 |
| 6,375,909 B1 | 4/2002 | Dangtran et al. | |
| 6,383,981 B1 | 5/2002 | Blankenship et al. | |
| 6,471,936 B1 | 10/2002 | Chen et al. | |
| 6,475,451 B1 | 11/2002 | Leppin et al. | |
| 6,475,471 B1 | 11/2002 | Wehrli | |
| 6,528,030 B2 | 3/2003 | Madden et al. | |
| 6,558,454 B1 * | 5/2003 | Chang | B01D 53/10 110/342 |
| 6,576,585 B2 | 6/2003 | Fischer et al. | |
| 6,579,507 B2 | 6/2003 | Pahlman et al. | |
| 6,596,661 B2 | 7/2003 | Neufert | |
| 6,610,263 B2 | 8/2003 | Pahlman et al. | |
| 6,638,485 B1 | 10/2003 | Iida et al. | |
| 6,719,828 B1 * | 4/2004 | Lovell | B01D 53/02 423/210 |
| 6,808,692 B2 | 10/2004 | Oehr | |
| 6,818,043 B1 * | 11/2004 | Chang | B01D 53/64 423/213.2 |
| 6,848,374 B2 * | 2/2005 | Srinivasachar, Sr. | B01D 53/10 110/165 R |
| 6,878,358 B2 | 4/2005 | Vosteen et al. | |
| 6,942,840 B1 | 9/2005 | Broderick | |
| 6,953,494 B2 | 10/2005 | Nelson, Jr. et al. | |

(56) References Cited

U.S. PATENT DOCUMENTS

| | | | |
|---|---|---|---|
| 6,960,329 B2 | 11/2005 | Sellakumar | |
| 7,017,330 B2 | 3/2006 | Bellows | |
| 7,081,434 B2 | 7/2006 | Sinha | |
| 7,124,591 B2 | 10/2006 | Baer et al. | |
| 7,211,707 B2 | 5/2007 | Axtell et al. | |
| 7,247,279 B2 | 7/2007 | Pahlman et al. | |
| 7,293,414 B1 | 11/2007 | Huber | |
| 7,361,209 B1* | 4/2008 | Durham | B01D 53/10 110/203 |
| 7,435,286 B2* | 10/2008 | Olson | B01J 20/0262 95/142 |
| 7,442,239 B2 | 10/2008 | Armstrong et al. | |
| 7,479,263 B2 | 1/2009 | Chang et al. | |
| 7,514,052 B2* | 4/2009 | Lissianski | B01D 53/56 423/210 |
| 7,521,032 B2 | 4/2009 | Honjo et al. | |
| 7,544,338 B2 | 6/2009 | Honjo et al. | |
| 7,563,311 B2 | 7/2009 | Graham | |
| 7,611,564 B2 | 11/2009 | Mcchesney et al. | |
| 7,622,092 B2 | 11/2009 | Honjo et al. | |
| 7,722,843 B1 | 5/2010 | Srinivasachar | |
| 7,767,174 B2 | 8/2010 | Lui et al. | |
| 7,780,765 B2* | 8/2010 | Srinivasachar | B01D 53/10 110/203 |
| 7,938,571 B1 | 5/2011 | Irvine | |
| 7,942,566 B1 | 5/2011 | Irvine | |
| 8,007,749 B2 | 8/2011 | Chang et al. | |
| 8,080,088 B1* | 12/2011 | Srinivasachar | B01D 53/02 502/417 |
| 8,168,147 B2* | 5/2012 | Olson | B01J 20/22 423/210 |
| 8,168,149 B2 | 5/2012 | Gal et al. | |
| 8,173,566 B2 | 5/2012 | Olson et al. | |
| 8,216,535 B2 | 7/2012 | Pollack et al. | |
| 8,512,655 B2 | 8/2013 | Olson et al. | |
| 8,652,235 B2* | 2/2014 | Olson | B01D 53/10 95/142 |
| 8,821,819 B2 | 9/2014 | Olson et al. | |
| 9,011,805 B2 | 4/2015 | Olson et al. | |
| 9,468,886 B2* | 10/2016 | Olson | B01D 53/10 |
| 9,662,629 B2* | 5/2017 | Olson | B01J 20/20 |
| 9,669,355 B2 | 6/2017 | Olson et al. | |
| 9,757,689 B2* | 9/2017 | Olson | B01J 20/041 |
| 10,130,930 B2 | 11/2018 | Olson et al. | |
| 10,343,114 B2 | 7/2019 | Olson et al. | |
| 10,471,412 B2 | 11/2019 | Olson et al. | |
| 10,589,225 B2 | 3/2020 | Olson et al. | |
| 10,596,517 B2 | 3/2020 | Olson et al. | |
| 10,668,430 B2 | 6/2020 | Olson et al. | |
| 10,828,596 B2 | 11/2020 | Olson | |
| 2001/0002387 A1 | 5/2001 | Tsutsumi et al. | |
| 2001/0003116 A1 | 6/2001 | Neufert | |
| 2002/0033097 A1 | 3/2002 | El-shoubary et al. | |
| 2002/0043496 A1 | 4/2002 | Boddu et al. | |
| 2002/0114749 A1* | 8/2002 | Cole | B01D 53/64 423/210 |
| 2002/0134242 A1 | 9/2002 | Yang et al. | |
| 2002/0150516 A1 | 10/2002 | Pahlman et al. | |
| 2003/0057293 A1 | 3/2003 | Boecking | |
| 2003/0104937 A1* | 6/2003 | Sinha | B01J 20/08 502/400 |
| 2003/0113239 A1* | 6/2003 | Pahlman | B01D 53/56 422/171 |
| 2003/0136509 A1 | 7/2003 | Virtanen | |
| 2003/0161771 A1* | 8/2003 | Oehr | B01D 53/64 423/210 |
| 2003/0206843 A1 | 11/2003 | Nelson, Jr. | |
| 2003/0206846 A1 | 11/2003 | Jangbarwala | |
| 2004/0003716 A1* | 1/2004 | Nelson, Jr. | B01D 53/02 95/134 |
| 2004/0013589 A1 | 1/2004 | Vosteen et al. | |
| 2004/0076570 A1 | 4/2004 | Jia | |
| 2004/0086439 A1* | 5/2004 | Vosteen | B01D 53/64 423/210 |
| 2004/0109800 A1 | 6/2004 | Pahlman et al. | |
| 2004/0244657 A1* | 12/2004 | Srinivasachar | B01J 20/20 110/345 |
| 2005/0000197 A1 | 1/2005 | Krantz | |
| 2005/0019240 A1 | 1/2005 | Lu et al. | |
| 2005/0074380 A1 | 4/2005 | Boren et al. | |
| 2005/0147549 A1 | 7/2005 | Lissianski et al. | |
| 2005/0227146 A1 | 10/2005 | Ghantous et al. | |
| 2005/0274307 A1* | 12/2005 | Lissianski | F23J 15/022 110/345 |
| 2006/0048646 A1* | 3/2006 | Olson | B01J 20/043 95/134 |
| 2006/0057044 A1* | 3/2006 | Chang | B01D 53/64 423/210 |
| 2006/0112823 A1 | 6/2006 | Avina | |
| 2006/0191835 A1 | 8/2006 | Petrik et al. | |
| 2006/0204418 A1 | 9/2006 | Chao et al. | |
| 2007/0167309 A1 | 7/2007 | Olson | |
| 2007/0168213 A1 | 7/2007 | Comrie | |
| 2007/0179056 A1 | 8/2007 | Baek et al. | |
| 2007/0180990 A1* | 8/2007 | Downs | B01D 53/10 95/134 |
| 2007/0234902 A1 | 10/2007 | Fair et al. | |
| 2007/0259781 A1* | 11/2007 | Sinha | B01J 20/0248 502/400 |
| 2007/0295347 A1 | 12/2007 | Paine, III et al. | |
| 2008/0090951 A1 | 4/2008 | Mao et al. | |
| 2008/0107579 A1 | 5/2008 | Downs et al. | |
| 2008/0134888 A1 | 6/2008 | Chao et al. | |
| 2008/0182747 A1 | 7/2008 | Sinha | |
| 2008/0207443 A1 | 8/2008 | Gadkaree et al. | |
| 2008/0292512 A1 | 11/2008 | Kang | |
| 2009/0031708 A1 | 2/2009 | Schmidt | |
| 2009/0062119 A1 | 3/2009 | Olson et al. | |
| 2009/0081092 A1 | 3/2009 | Yang et al. | |
| 2009/0136401 A1 | 5/2009 | Yang et al. | |
| 2009/0235848 A1 | 9/2009 | Eiteneer et al. | |
| 2009/0297413 A1* | 12/2009 | Olson | B01J 20/02 423/215.5 |
| 2009/0320678 A1* | 12/2009 | Chang | B01D 46/521 95/92 |
| 2010/0024642 A1 | 2/2010 | Fukumoto et al. | |
| 2010/0047146 A1 | 2/2010 | Olson et al. | |
| 2011/0076210 A1 | 3/2011 | Pollack et al. | |
| 2011/0168018 A1 | 7/2011 | Mohamadalizadeh et al. | |
| 2012/0100053 A1 | 4/2012 | Durham et al. | |
| 2012/0183458 A1 | 7/2012 | Olson et al. | |
| 2013/0157845 A1 | 6/2013 | Nalepa et al. | |
| 2013/0280156 A1 | 10/2013 | Olson et al. | |
| 2014/0056787 A1 | 2/2014 | Olson et al. | |
| 2014/0099244 A1* | 4/2014 | Olson | B01J 20/027 423/210 |
| 2014/0224121 A1 | 8/2014 | Mimna et al. | |
| 2014/0255279 A1 | 9/2014 | Olson et al. | |
| 2014/0308188 A1 | 10/2014 | Olson et al. | |
| 2015/0098878 A1* | 4/2015 | Olson | B01D 53/64 423/210 |
| 2015/0246315 A1* | 9/2015 | Olson | B01J 20/12 423/215.5 |
| 2017/0056853 A1 | 3/2017 | Mimna et al. | |
| 2017/0100692 A1* | 4/2017 | Olson | B01J 20/0288 |
| 2017/0128908 A1* | 5/2017 | Olson | B01J 20/02 |
| 2017/0173524 A1* | 6/2017 | Olson | B01D 53/508 |
| 2017/0173557 A1 | 6/2017 | Olson et al. | |
| 2017/0239644 A1* | 8/2017 | Olson | C01B 32/354 |
| 2018/0133646 A1* | 5/2018 | Pavlish | B01J 20/223 |
| 2018/0229182 A1* | 8/2018 | Olson | B01J 20/3416 |
| 2018/0257030 A1* | 9/2018 | Olson | B01J 20/041 |
| 2018/0257031 A1* | 9/2018 | Olson | B01D 53/96 |
| 2018/0280870 A1 | 10/2018 | Olson et al. | |
| 2019/0009247 A1 | 1/2019 | Olson et al. | |
| 2019/0329179 A1 | 10/2019 | Olson et al. | |
| 2019/0329215 A1 | 10/2019 | Olson et al. | |

(56) References Cited

U.S. PATENT DOCUMENTS

| | | | |
|---|---|---|---|
| 2019/0336913 | A1 | 11/2019 | Olson et al. |
| 2020/0009532 | A1 | 1/2020 | Olson et al. |

FOREIGN PATENT DOCUMENTS

| | | | |
|---|---|---|---|
| CA | 2327602 | A1 | 6/2001 |
| CA | 2400898 | A1 | 8/2001 |
| CA | 2584327 | A1 | 4/2006 |
| CA | 2757309 | A1 | 10/2010 |
| CA | 2757309 | C | 1/2017 |
| CN | 1048173 | A | 1/1991 |
| CN | 101048218 | A | 10/2007 |
| CN | 101053820 | A | 10/2007 |
| CN | 101293196 | A | 10/2008 |
| CN | 101816922 | A | 9/2010 |
| CN | 102413899 | A | 4/2012 |
| CN | 104519410 | A | 4/2015 |
| CN | 105188910 | A | 12/2015 |
| CN | 104619410 | B | 5/2016 |
| CN | 107661744 | A | 2/2018 |
| DE | 3426059 | A1 | 1/1986 |
| DE | 3816600 | A1 | 11/1989 |
| DE | 10233173 | A1 | 2/2004 |
| DE | 202012003747 | U1 | 11/2012 |
| EP | 0208490 | A1 | 1/1987 |
| EP | 1386655 | A1 | 2/2004 |
| EP | 1458474 | | 9/2004 |
| EP | 1570894 | A1 | 9/2005 |
| FR | 2529802 | | 1/1984 |
| GB | 2122916 | A | 1/1984 |
| JP | 4953590 | A | 5/1974 |
| JP | 4953593 | A | 5/1974 |
| JP | 4966592 | A | 6/1974 |
| JP | 4943197 | B4 | 11/1974 |
| JP | 506438 | B4 | 3/1975 |
| JP | 51003386 | A | 1/1976 |
| JP | 544868 | A | 1/1979 |
| JP | 50145324 | A | 3/1980 |
| JP | 09256812 | | 9/1997 |
| KR | 102002700614 | | 7/2002 |
| SU | 732207 | A1 | 5/1980 |
| SU | 1163982 | A | 6/1985 |
| WO | WO-0162368 | A1 | 8/2001 |
| WO | WO-0228513 | A2 | 4/2002 |
| WO | WO-03072241 | A1 | 9/2003 |
| WO | WO-2004089501 | A2 | 10/2004 |
| WO | WO-2004094024 | A2 | 11/2004 |
| WO | WO-2006039007 | A2 | 4/2006 |
| WO | WO-2006039007 | A3 | 4/2006 |
| WO | WO-2006099611 | A1 | 9/2006 |
| WO | WO-2009018539 | A3 | 2/2009 |
| WO | WO-2010123609 | A1 | 10/2010 |
| WO | WO-2012030560 | A1 | 3/2012 |
| WO | WO-2013162968 | A2 | 10/2013 |
| WO | WO-2013162968 | A3 | 10/2013 |
| WO | WO-2014137907 | A2 | 9/2014 |

OTHER PUBLICATIONS

"U.S. Appl. No. 10/554,018, Final Office Action dated Apr. 27, 2010", 8 pgs.

"U.S. Appl. No. 10/554,018, Non Final Office Action dated Oct. 6, 2009", 8 pgs.

"U.S. Appl. No. 10/554,018, Notice of Allowance dated Jan. 19, 2012", 7 pgs.

"U.S. Appl. No. 10/554,018, Response filed Feb. 8, 2008-10 to Non Final Office Action dated Oct. 6, 2009", 9 pgs.

"U.S. Appl. No. 10/554,018, Response filed Aug. 10, 2009 to Restriction Requirement dated Jun. 9, 2009", 1 pg.

"U.S. Appl. No. 10/554,018, Restriction Requirement dated Jun. 9, 2009", 5 pgs.

"U.S. Appl. No. 11/209,163, Advisory Action dated Apr. 21, 2008", 3 pgs.

"U.S. Appl. No. 11/209,163, Final Office Action dated Jan. 23, 2008", 20 pgs.

"U.S. Appl. No. 11/209,163, Non Final Office Action dated Aug. 13, 2007", 14 pgs.

"U.S. Appl. No. 11/209,163, Notice of Allowance dated Jul. 14, 2008", 7 pgs.

"U.S. Appl. No. 11/209,163, Preliminary Amendment filed Feb. 27, 2007", 9 pgs.

"U.S. Appl. No. 11/209,163, Response filed Mar. 24, 2008 to Final Office Action dated Jan. 23, 2008", 29 pgs.

"U.S. Appl. No. 11/209,163, Response filed Jul. 9, 2007 to Restriction Requirement dated Jun. 7, 2007", 2 pgs.

"U.S. Appl. No. 11/209,163, Response filed Nov. 13, 2007 to Non Final Office Action dated Aug. 13, 2007", 19 pgs.

"U.S. Appl. No. 11/209,163, Restriction Requirement dated Jun. 7, 2007", 6 pgs.

"U.S. Appl. No. 12/184,860, Examiner Interview Summary dated Apr. 5, 2011", 3 pgs.

"U.S. Appl. No. 12/184,860, Final Office Action dated May 11, 2011", 15 pgs.

"U.S. Appl. No. 12/184,860, Non Final Office Action dated Jan. 19, 2011", 14 pgs.

"U.S. Appl. No. 12/184,860, Response filed Apr. 7, 2011 to Non Final Office Action dated Jan. 119, 2011", 12 pgs.

"U.S. Appl. No. 12/184,860, Response filed Jul. 8, 2011 to Final Office Action dated May 11, 2011", 11 pgs.

"U.S. Appl. No. 12/201,595, Final Office Action dated Mar. 10, 2010", 13 pgs.

"U.S. Appl. No. 12/201,595, Non Final Office Action dated Apr. 16, 2009", 21 pgs.

"U.S. Appl. No. 12/201,595, Response filed Oct. 15, 2009 to Non Final Office Action dated Apr. 16, 2009", 18 pgs.

"U.S. Appl. No. 12/419,219, Final Office Action dated Oct. 14, 2010", 17 pgs.

"U.S. Appl. No. 12/419,219, Non Final Office Action dated Jan. 15, 2010", 13 pgs.

"U.S. Appl. No. 12/419,219, Non Final Office Action dated Feb. 23, 2011", 17 pgs.

"U.S. Appl. No. 12/419,219, Non Final Office Action dated Aug. 4, 2011", 16 pgs.

"U.S. Appl. No. 12/419,219, Notice of Allowance dated Jan. 10, 2012", 7 pgs.

"U.S. Appl. No. 12/419,219, Preliminary Amendment filed Apr. 6, 2009", 7 pgs.

"U.S. Appl. No. 12/419,219, Response filed Feb. 14, 2011 to Final Office Action dated Oct. 14, 2011", 19 pgs.

"U.S. Appl. No. 12/419,219, Response filed May 20, 2011 to Non Final Office Action dated Feb. 23, 2011", 14 pgs.

"U.S. Appl. No. 12/419,219, Response filed Jul. 15, 2010 to Non Final Office Action dated Jan. 15, 2010", 22 pgs.

"U.S. Appl. No. 12/419,219, Response filed Oct. 27, 2011 to Non Final Office Action dated Aug. 4, 2011", 12 pgs.

"U.S. Appl. No. 12/429,058, Advisory Action dated May 29, 2012", 3 pgs.

"U.S. Appl. No. 12/429,058, Ex Parte Quayle Action mailed Feb. 14, 2013", 7 pgs.

"U.S. Appl. No. 12/429,058, Examiner Interview Summary dated Dec. 28, 2012", 4 pgs.

"U.S. Appl. No. 12/429,058, Final Office Action dated Oct. 31, 2012", 21 pgs.

"U.S. Appl. No. 12/429,058, Final Office Action dated Dec. 20, 2011", 21 pgs.

"U.S. Appl. No. 12/429,058, Non Final Office Action dated Jun. 11, 2012", 18 pgs.

"U.S. Appl. No. 12/429,058, Non Final Office Action dated Jul. 19, 2011", 20 pgs.

"U.S. Appl. No. 12/429,058, Notice of Allowance dated Jan. 16, 2014", 5 pgs.

"U.S. Appl. No. 12/429,058, Notice of Allowance dated Sep. 11, 2013", 11 pgs.

"U.S. Appl. No. 12/429,058, Response filed Jan. 31, 2013 to Final Office Action dated Oct. 31, 2012", 19 pgs.

(56) References Cited

OTHER PUBLICATIONS

"U.S. Appl. No. 12/429,058, Response filed Mar. 7, 2013 to Ex Parte Quayle Action dated Feb. 14, 2013", 7 pgs.
"U.S. Appl. No. 12/429,058, Response filed May 11, 2012 to Final Office Action dated Dec. 20, 2011", 11 pgs.
"U.S. Appl. No. 12/429,058, Response filed Sep. 11, 2012 to Non Final Office Action dated Jun. 11, 2012", 16 pgs.
"U.S. Appl. No. 12/429,058, Response filed Oct. 18, 2011 to Non Final Office Action dated Jul. 19, 2011", 17 pgs.
"U.S. Appl. No. 13/427,665, Non Final Office Action dated Jan. 4, 2013", 23 pgs.
"U.S. Appl. No. 13/427,665, Non Final Office Action dated Aug. 3, 2012", 12 pgs.
"U.S. Appl. No. 13/427,665, Notice of Allowance dated Apr. 16, 2013", 8 pgs.
"U.S. Appl. No. 13/427,665, Response filed Mar. 21, 2013 to Non Final Office Action dated Jan. 4, 2013", 20 pgs.
"U.S. Appl. No. 13/427,665, Response filed Oct. 10, 2012 to Non Final Office Action dated Aug. 3, 2012", 15 pgs.
"U.S. Appl. No. 13/427,685, Preliminary Amendment filed Mar. 22, 2012", 3 pgs.
"U.S. Appl. No. 13/453,274, Advisory Action dated Nov. 24, 2014", 3 pgs.
"U.S. Appl. No. 13/453,274, Final Office Action dated Oct. 16, 2014", 4 pgs.
"U.S. Appl. No. 13/453,274, Non Final Office Action dated May 30, 2014", 6 pgs.
"U.S. Appl. No. 13/453,274, Notice of Allowance Jan. 5, 2015", 5 pgs.
"U.S. Appl. No. 13/453,274, Response filed Sep. 2, 2014 to Non Final Office Action dated May 30, 2014", 13 pgs.
"U.S. Appl. No. 13/453,274, Response filed Nov. 6, 2014 to Final Office Action dated Oct. 16, 2014", 7 pgs.
"U.S. Appl. No. 13/453,274, Response filed Dec. 9, 2014 to Advisory Action dated Nov. 24, 20, 2014", 6 pgs.
"U.S. Appl. No. 13/966,768, Non Final Office Action dated Dec. 6, 2013", 7 pgs.
"U.S. Appl. No. 13/966,768, Notice of Allowability dated Aug. 1, 2014", 6 pgs.
"U.S. Appl. No. 13/966,768, Notice of Allowance dated Apr. 18, 2014", 7 pgs.
"U.S. Appl. No. 13/966,768, Preliminary Amendment filed Aug. 14, 2013", 3 pgs.
"U.S. Appl. No. 13/966,768, Response filed Mar. 6, 2014 to Non Final Office Action dated Dec. 6, 2013", 6 pgs.
"U.S. Appl. No. 13/966,768, Supplemental Preliminary Amendment filed Aug. 15, 2013", 6 pgs.
"U.S. Appl. No. 14/102,896, Advisory Action dated Dec. 16, 2015", 3 pgs.
"U.S. Appl. No. 14/102,896, Final Office Action dated Aug. 26, 2015", 12 pgs.
"U.S. Appl. No. 14/102,896, Non Final Office Action dated Mar. 23, 2015", 13 pgs.
"U.S. Appl. No. 14/102,896, Notice of Allowance dated Jun. 1, 2016", 7 pgs.
"U.S. Appl. No. 14/102,896, Response filed Jan. 22, 2016 to Advisory Action dated Dec. 16, 2015", 11 pgs.
"U.S. Appl. No. 14/102,896, Response filed Jun. 22, 2015 to Non Final Office Action dated Mar. 23, 2015", 10 pgs.
"U.S. Appl. No. 14/102,896, Response filed Nov. 24, 2015 to Final Office Action dated Aug. 26, 2015", 5 pgs.
"U.S. Appl. No. 14/195,360, Corrected Notice of Allowance dated Feb. 27, 2017", 2 pgs.
"U.S. Appl. No. 14/195,360, Corrected Notice of Allowance dated Mar. 29, 2017", 2 pgs.
"U.S. Appl. No. 14/195,360, Final Office Action dated Mar. 18, 2016", 18 pgs.
"U.S. Appl. No. 14/195,360, Final Office Action dated Nov. 22, 2016", 7 pgs.
"U.S. Appl. No. 14/195,360, Non Final Office Action dated Jun. 20, 2016", 11 pgs.
"U.S. Appl. No. 14/195,360, Non Final Office Action dated Nov. 24, 2015", 19 pgs.
"U.S. Appl. No. 14/195,360, Notice of Allowance dated Feb. 7, 2017", 5 pgs.
"U.S. Appl. No. 14/195,360, Response filed Jan. 18, 2017 to Final Office Action dated Nov. 22, 2016", 7 pgs.
"U.S. Appl. No. 14/195,360, Response filed Feb. 22, 2016 to Non Final Office Action dated Nov. 24, 2015", 21 pgs.
"U.S. Appl. No. 14/195,360, Response filed May 17, 2016 to Final Office Action dated Mar. 18, 2016", 15 pgs.
"U.S. Appl. No. 14/318,270, Advisory Action dated Feb. 17, 2017", 4 pgs.
"U.S. Appl. No. 14/318,270, Corrected Notice of Allowance dated May 22, 2017", 2 pgs.
"U.S. Appl. No. 14/318,270, Final Office Action dated Nov. 25, 2016", 25 pgs.
"U.S. Appl. No. 14/318,270, Non Final Office Action dated Jun. 2, 2016", 24 pgs.
"U.S. Appl. No. 14/318,270, Notice of Allowance dated MaY 15, 2017", 8 pgs.
"U.S. Appl. No. 14/318,270, Response filed Jan. 25, 2017 to Final Office Action dated Nov. 25, 2016", 14 pgs.
"U.S. Appl. No. 14/318,270, Response filed Feb. 27, 2017 to Final Office Action dated Nov. 25, 2016", 15 pgs.
"U.S. Appl. No. 14/318,270, Response filed Mar. 2, 2016 to Restriction Requirement dated Jan. 14, 2016", 9 pgs.
"U.S. Appl. No. 14/318,270, Response filed Aug. 22, 2016 to Non Final Office Action dated Jun. 2, 2016", 14 pgs.
"U.S. Appl. No. 14/318,270, Restriction Requirement dated Jan. 14, 2016", 8 pgs.
"U.S. Appl. No. 14/564,860, Final Office Action dated Nov. 17, 2016", 4 pgs.
"U.S. Appl. No. 14/564,860, Non Final Office Action dated Jul. 12, 2016", 6 pgs.
"U.S. Appl. No. 14/564,860, Notice of Allowance dated Jan. 30, 2017", 6 pgs.
"U.S. Appl. No. 14/564,860, Preliminary Amendment filed Dec. 10, 2014", 8 pgs.
"U.S. Appl. No. 14/564,860, Preliminary Amendment filed Dec. 10, 2014", 6 pgs.
"U.S. Appl. No. 14/564,860, Response filed May 6, 2016 to Restriction Requirement dated Mar. 16, 2016", 9 pgs.
"U.S. Appl. No. 14/564,860, Response filed Oct. 3, 2016 to Non Final Office Action dated Jul. 12, 2016", 11 pgs.
"U.S. Appl. No. 14/564,860, Restriction Requirement dated Mar. 16, 2016", 5 pgs.
"U.S. Appl. No. 14/712,558, Advisory Action dated Feb. 12, 2018", 8 pgs.
"U.S. Appl. No. 14/712,558, Examiner Interview Summary dated Mar. 5, 2018", 3 pgs.
"U.S. Appl. No. 14/712,558, Final Office Action dated Dec. 6, 20-17", 9 pgs.
"U.S. Appl. No. 14/712,558, Non Final Office Action dated Jul. 2, 2018", 16 pgs.
"U.S. Appl. No. 14/712,558, Non Final Office Action dated Jul. 6, 2017", 7 pgs.
"U.S. Appl. No. 14/712,558, Response filed Jan. 23, 2018 to Final Office Action dated Dec. 6, 2017", 13 pgs.
"U.S. Appl. No. 14/712,558, Response filed Apr. 2, 2018 to Final Office Action dated Dec. 6, 2017", 7 pgs.
"U.S. Appl. No. 14/712,558, Response filed Oct. 6, 2017 to Non Final Office Action dated Jul. 6, 2017", 12 pgs.
"U.S. Appl. No. 14/712,558, Supplemental Amendment filed Jun. 13, 2018", 14 pgs.
"U.S. Appl. No. 14/712,558, Supplemental Amendment filed May 15, 2018", 6 pgs.
"U.S. Appl. No. 14/712,558, Supplemental Preliminary Amendment filed May 15, 2015", 6 pgs.
"U.S. Appl. No. 15//974,343 Preliminary Amendment filed May 15, 2018", 7 pgs.

(56) References Cited

OTHER PUBLICATIONS

"U.S. Appl. No. 15//978,760, Preliminary Amendment filed May 15, 2018", 7 pgs.
"U.S. Appl. No. 15/295,594, Preliminary Amendment filed Jan. 26, 2017", 8 pgs.
"U.S. Appl. No. 15/295,594, Preliminary Amendment filed Jun. 13, 2017", 7 pgs.
"U.S. Appl. No. 15/295,594, Response filed Jul. 3, 2018 to Restriction Requirement dated May 22, 2018", 9 pgs.
"U.S. Appl. No. 15/295,594, Restriction Requirement dated May 22, 2018", 6 pgs.
"U.S. Appl. No. 15/295,594, Restriction Requirement dated Jun. 29, 2018", 5 pgs.
"U.S. Appl. No. 15/295,594, Supplemental Amendment filed May 15, 2018", 10 pgs.
"U.S. Appl. No. 15/382,114, Preliminary Amendment filed Apr. 4, 2017", 3 pgs.
"U.S. Appl. No. 15/449,112, Advisory Action dated Apr. 24, 2018", 3 pgs.
"U.S. Appl. No. 15/449,112, Final Office Action dated Feb. 15, 2018", 13 pgs.
"U.S. Appl. No. 15/449,112, Non Final Office Action dated Sep. 27, 2017", 17 pgs.
"U.S. Appl. No. 15/449,112, Notice of Allowance dated Jul. 12, 2018", 8 pgs.
"U.S. Appl. No. 15/449,112, Response filed Jan. 16, 2018 to Non Final Office Action dated Sep. 27, 2017", 16 pgs.
"U.S. Appl. No. 15/449,112, Response filed Feb. 15, 2018 to Final Office Action dated Feb. 15, 2018", 13 pgs.
"U.S. Appl. No. 15/449,112, Response filed Apr. 6, 2018 to Final Office Action dated Feb. 15, 2018", 13 pgs.
"U.S. Appl. No. 15/452,527, Preliminary Amendment filed Mar. 8, 2017", 3 pgs.
"U.S. Appl. No. 15/589,359, Final Office Action dated Jun. 4, 2018", 13 pgs.
"U.S. Appl. No. 15/589,359, Non Final Office Action dated Feb. 21, 2018", 15 pgs.
"U.S. Appl. No. 15/589,359, Preliminary Amendment filed Jan. 3, 2018", 6 pgs.
"U.S. Appl. No. 15/589,359, Response filed May 18, 2018 to Non Final Office Action dated Feb. 21, 2018", 14 pgs.
"U.S. Appl. No. 15/978,760 , Response filed Jul. 13, 2018 to Non Final Office Action dated Jun. 29, 2018", 12 pgs.
"U.S. Appl. No. 15/978,760, Non Final Office Action dated Jun. 29, 2018", 9 pgs.
"Application Serial No. PCT/US04/12828, International Search Report dated Oct. 22, 2004", 2 pgs.
"Application Serial No. PCT/US2014/019916, International Preliminary Report on Patentability dated Sep. 17, 2015", 14 pgs.
"U.S. Appl. Bo. 14/195,360, Response filed Sep. 16, 2016 to Non Final Office Action dated Jun. 30, 2016", 12 pgs.
"Bromine and its Compounds", Jolles, Z. E., Editor, Academic Press, Inc., New York, NY, (1966), pp. 193 and 205.
"Canadian Application Serial No. 2,523,132, Office Action dated Jul. 18, 2011", 3 pgs.
"Canadian Application Serial No. 2,523,132, Response filed Jan. 16, 2012 to Office Action dated Jul. 18, 2011", 5 pgs.
"Canadian Application Serial No. 2,584,327, Office Action dated Mar. 3, 2009", 4 pgs.
"Canadian Application Serial No. 2,584,327, Office Action dated Dec. 7, 2009", 2 pgs.
"Canadian Application Serial No. 2,584,327, Response filed Mar. 19, 2010 to Office Action dated Dec. 7, 2009", 8 pgs.
"Canadian Application Serial No. 2,584,327, Response filed Sep. 2, 2009 to Office Action dated Mar. 3, 2009", 21 pgs.
"Canadian Application Serial No. 2,707,363, First Examiners Report dated Jun. 16, 2011", 2 pgs.
"Canadian Application Serial No. 2,757,309, Office Action dated Dec. 7, 2015", 3 pgs.

"Canadian Application Serial No. 2,757,309, Response filed Jun. 6, 2016 to Office Action dated Dec. 7, 2015", 13 pgs.
"Canadian Application Serial No. 2,757,309, Voluntary Amendment filed Jan. 30, 2015", 27 pgs.
"Canadian Application Serial No. 2,871,422, Response filed Feb. 26, 2016 to Office Action dated Sep. 9, 2015", 13 pgs.
"Canadian Application Serial No. 2,871,422, Office Action dated Apr. 2, 2015", 5 pgs.
"Canadian Application Serial No. 2,871,422, Office Action dated Apr. 24, 2018", 4 pgs.
"Canadian Application Serial No. 2,871,422, Office Action dated Aug. 31, 2017", 4 pgs.
"Canadian Application Serial No. 2,871,422, Office Action dated Sep. 9, 2015", 3 pgs.
"Canadian Application Serial No. 2,871,422, Office Action dated Dec. 22, 2016", 5 pgs.
"Canadian Application Serial No. 2,871,422, Response filed Feb. 25, 2018 to Office Action dated Aug. 31, 2017", w/ Amended Claims, 53 pgs.
"Canadian Application Serial No. 2,871,422, Response filed Jun. 21, 2017 to Office Action dated Dec. 22, 2016", 41 pgs.
"Canadian Application Serial No. 2,871,422, Response filed Aug. 28, 2015 to Canadian Office Action dated Apr. 2, 2015", 22 pgs.
"Chinese Application Serial No. 200480017704.4, Office Action dated Dec. 8, 2011", (w/ English Translation), 6 pgs.
"Chinese Application Serial No. 200480017704.4, Response filed Jan. 20, 2012 to Office Action dated Dec. 8, 2012", (w/ English Translation of Amended Claims), 10 pgs.
"Chinese Application Serial No. 200580037037.0, Chinese Office Action, dated Jun. 25, 2013 (and English translation)", no english translation, 46 pgs.
"Chinese Application Serial No. 201380033231.6, Office Action dated Sep. 21, 2015", w/ Partial English Translation, 6 pgs.
"Chinese Application Serial No. 201380033231.6, Response filed Jan. 14, 2016 to Office Action dated Sep. 21, 2015", w/English Claims, 7 pgs.
"Chinese Application Serial No. 201480025701.9, Office Action dated Jan. 16, 2018", (English Translation), 8 pgs.
"Chinese Application Serial No. 201480025701.9, Office Action dated Jul. 12, 2017", W/ English Translation, 8 pgs.
"Chinese Application Serial No. 201480025701.9, Office Action dated Jul. 25, 2016", (With English Translation), 4 pgs.
"Chinese Application Serial No. 201480025701.9, Office Action dated Dec. 23, 2016", W/ English Translation, 39 pgs.
"Chinese Application Serial No. 201480025701.9, Office Action dated Dec. 23, 2016", 24 pgs.
"Chinese Application Serial No. 201480025701.9, Response filed Mar. 27, 2018 to Office Action dated Jan. 16, 2018", w/ English Claims, 20 pgs.
"Chinese Application Serial No. 201480025701.9, Response filed Sep. 15, 2017 to Office Action dated Jul. 12, 2017", w/ English Translation, 21 pgs.
"DARCO® FGD—Powdered Activated Carbon", Norit Americas Inc. Datasheet No. 1100, (May 2009), 1 pg.
"Database WPI Week 197450", Thomson Scientific, London, GB; AN 1974-86199V XP002514926.
"European Application Serial No. 05814011.2, Response filed Sep. 9, 2011 to European Search Report dated Apr. 15, 2009 and Office Actioin dated Nov. 5, 2009", 20 pgs.
"European Application Serial No. 05814011.2, Communication Pursuant to Article 94(3) EPC dated Nov. 5, 2009", 4 pgs.
"European Application Serial No. 05814011.2, Decision to grant dated Jun. 8, 2012", 2 pgs.
"European Application Serial No. 05814011.2, Extended European Search Report dated Apr. 14, 2009", 13 pgs.
"European Application Serial No. 05814011.2, Office Action dated Jan. 25, 2008", 2 pgs.
"European Application Serial No. 05814011.2, Office Action dated Jan. 31, 2012", 4 pgs.
"European Application Serial No. 05814011.2, Office Action dated Apr. 27, 2012", 6 pgs.
"European Application Serial No. 05814011.2, Office Action dated Nov. 5, 2009", 2 pgs.

(56) References Cited

OTHER PUBLICATIONS

"European Application Serial No. 05814011.2, Partial European Search Report dated Apr. 14, 2009", 13 pgs.
"European Application Serial No. 05814011.2, Response filed Feb. 28, 2012 to Office Action dated Jan. 31, 2012", 30 pgs.
"European Application Serial No. 05814011.2, Response filed Apr. 18, 2008 to Office Action dated Jan. 25, 2008 and Third Party Observations submitted Dec. 4, 2007", 7 pgs.
"European Application Serial No. 05814011.2, Response filed May 11, 2010 to Communication Pursuant to Article 94(3) EPC dated Nov. 5, 2009", 11 pgs.
"European Application Serial No. 05814011.2, Response filed May 11, 2010 to Office Action dated Nov. 5, 2009", 11 pgs.
"European Application Serial No. 05814011.2, Response filed Sep. 9, 2011 to Extended European Search Report dated Apr. 14, 2009", 20 pgs.
"European Application Serial No. 05814011.2, Third Party Observations submitted Mar. 19, 2012", 7 pgs.
"European Application Serial No. 05814011.2, Third Party Observations submitted Dec. 4, 2007", 5 pgs.
"European Application Serial No. 10767465.7, Decision to grant dated Apr. 17, 2014", 2 pgs.
"European Application Serial No. 10767465.7, Extended European Search Report dated Dec. 6, 2012", 5 pgs.
"European Application Serial No. 10767465.7, Intention to Grant dated Mar. 17, 2014", 44 pgs.
"European Application Serial No. 10767465.7, Intention to Grant dated Sep. 30, 2013", 44 pgs.
"European Application Serial No. 10767465.7, Response filed Feb. 3, 2014 to Intention to Grant dated Sep. 30, 2013", 11 pgs.
"European Application Serial No. 10767465.7, Response filed Jun. 20, 2013 to Extended European Search Report dated Dec. 6, 2012", 18 pgs.
"European Application Serial No. 11189249.3, Communication Pursuant to Article 94(3) EPC dated Nov. 26, 2012", 4 pgs.
"European Application Serial No. 11189249.3, Decision to Refuse mailed Dec. 19, 2013", 18 pgs.
"European Application Serial No. 11189249.3, Extended European Search Report dated Feb. 1, 2012", 7 pgs.
"European Application Serial No. 11189249.3, Office Action dated Nov. 4, 2013", 4 pgs.
"European Application Serial No. 11189249.3, Response filed Feb. 4, 2013 to Communication Pursuant to Article 94(3) EPC dated Nov. 26, 2012", 9 pgs.
"European Application Serial No. 11189249.3, Response filed Aug. 28, 2012 to Extended European Search Report dated Feb. 1, 2012", 9 pgs.
"European Application Serial No. 11189249.3, Summons to Attend Oral Proceedings mailed Apr. 15, 2013", 7 pgs.
"European Application Serial No. 11189252.7, Communication Pursuant to Article 94(3) EPC dated Jan. 9, 2013", 4 pgs.
"European Application Serial No. 11189252.7, Decision to grant dated May 2, 2014", 2 pgs.
"European Application Serial No. 11189252.7, Extended European Search Report dated Jan. 23, 2012", 6 pgs.
"European Application Serial No. 11189252.7, Extended European Search Report dated May 9, 2012", 12 pgs.
"European Application Serial No. 11189252.7, Office Action dated Oct. 30, 2013", 4 pgs.
"European Application Serial No. 11189252.7, Office Action dated Dec. 11, 2013", 6 pgs.
"European Application Serial No. 11189252.7, Response filed Feb. 11, 2013 to Communication Pursuant to Article 94(3) EPC dated Jan. 9, 2013", 5 pgs.
"European Application Serial No. 11189252.7, Response filed Oct. 10, 2013 to Office Action dated Apr. 15, 2013", 18 pgs.
"European Application Serial No. 11189252.7, Response filed Nov. 22, 2012 to Extended European Search Report dated ay 9, 2012", 13 pgs.
"European Application Serial No. 11189252.7, Summons to Attend Oral Proceedings dated Apr. 15, 2013", 6 pgs.
"European Application Serial No. 13719338.9, Notification Regarding Rule 164 and Article 94(3) EPC dated Apr. 24, 2017", 8 pgs.
"European Application Serial No. 13719338.9, Office Action dated May 12, 2017", 6 pgs.
"European Application Serial No. 13719338.9, Office Action dated Dec. 19, 2314", 2 pgs.
"European Application Serial No. 13719338.9, Response filed Jun. 29, 2015 to Office Action dated Dec. 19, 2014", 19 pgs.
"European Application Serial No. 14711106.6, Communication Pursuant to Article 94(3) EPC dated Feb. 22, 2017", 6 pgs.
"European Application Serial No. 14711106.6, Response filed Aug. 17. 2017 to Communication Pursuant to Article 94(3) EPC dated Feb. 22, 2017", 10 pgs.
"International Application No. PCT/US2008/071986, International Search Report dated Jan. 30, 2009", 3 pgs.
"International Application Serial No. PCT/US2005/030018, International Preliminary Report on Patentability dated Dec. 27, 2006", 3 pgs.
"International Application Serial No. PCT/US2005/030018, International Search Report dated Jul. 25, 2006", 2 pgs.
"International Application Serial No. PCT/US2005/030018, Written Opinion dated Jul. 25, 2006", 3 pgs.
"International Application Serial No. PCT/US2010/022807, International Preliminary Report on Patentability dated Nov. 3, 2011", 6 pgs.
"International Application Serial No. PCT/US2010/022807, International Search Report dated Sep. 13, 2010", 3 pgs.
"International Application Serial No. PCT/US2010/022807, Written Opinion dated Sep. 13, 2010", 4 pgs.
"International Application Serial No. PCT/US2013/036964, International Preliminary Report on Patentability dated Jul. 17, 2014", 11 pgs.
"International Application Serial No. PCT/US2013/036964, International Search Report dated Nov. 29, 2013", 7 pgs.
"International Application Serial No. PCT/US2013/036964, Invitation to Pay Additional Fees and Partial Search Report dated Aug. 2, 2013", 7 pgs.
"International Application Serial No. PCT/US2013/036964, Written Opinion dated Apr. 15, 2014", 10 pgs.
"International Application Serial No. PCT/US2013/036964, Written Opinion dated Nov. 29, 2013", 13 pgs.
"International Application Serial No. PCT/US2014/019916, International Search Report dated Oct. 13, 2014", 6 pgs.
"International Application Serial No. PCT/US2014/019916, Invitation to Pay Additional Fees and Partial Search Report dated May 30, 2014", 6 pgs.
"International Application Serial No. PCT/US2014/019916, Written Opinion dated Oct. 13, 2014", 13 pgs.
"Powdered Activated Carbon", Cabot Corp, [Online] retrieved from the internet: <http://www.cabotcorp.com/solutions/products-plus/activated-carbon/powdered>, (Jan. 3, 2015), 3 pgs.
"Response filed Sep. 4, 2017 to Notification Regarding Rule 164 and Article 94(3) EPC dared Apr. 24, 2017", 7 pgs.
"Supplementary European Search Report, dated Dec. 6, 2012", 2 pgs.
Arenillas, A, et al., "CO2 removal potential of carbons prepared by co-pyrolysis of sugar and nitrogen containing compounds", Journal of analytical and applied pyrolysis 74.1, (2005), 298-306.
Bakandritsos, A., et al., "Aqueous and Gaseous Adsorption from Montmorillonite-Carbon Composites and from Derived Carbons", Langmuir, 21, (2005), 2349-2355.
Bakandritsos, A., et al., "High Surface Area Montmorillonite—Carbon Composites and Derived Carbons", Chemistry of Materials, vol. 16, No. 8, (Mar. 16, 2004), 1551-1559.
Bimer, Jan, et al., "Modified active carbons from precursors enriched with nitrogen functions: sulfur removal capabilities", (1998), 519-525.
Chang, Shih-Ger, "Method for Oxidation of Mercury Vapor", U.S. Appl. No. 60/560,904, filed Apr. 9, 2004, (Apr. 9, 2004), 9 pgs.

(56) References Cited

OTHER PUBLICATIONS

Criswell, Gordon, et al., "Progress Report on Mercury Control Retrofit at the Colstrip Power Station", Paper #91, Mega Symposium, Baltimore, MD, (Aug. 2011), 1-23.
Darder, M., et al., "Caramel-clay nanocomposites", Journal of Materials Chemistry, 15, (2005), 3913-3918.
Diamantopoulou, LR G Skodras, et al., "Sorption of mercury by activated carbon in the presence of flue gas components", Fuel Processing Technology 91.2, (2010), 158-163.
Dong, J., et al., "Mercury Removal from Flue Gases by Novel Regenerable Magnetic Nanocomposite Sorbents", Environ. Sci. Technol., 43, (2009), 3266-3271.
Dunham, G. E., et al., "Mercury Capture by an Activated Carbon in a Fixed-Bed Bench-Scale System", Environmental Progress, 17(3), (1998), 203-208.
Eisazadeh, H,, "Removal of Mercury from Water Using Polypyrrole and its Composites", Chinese Journal of Polymer Science, 25(4), (2007), 393-397.
Felsvang, K., et al., "Mercury Reduction and Control Options", The U.S. EPA-DOE-EPRI Combined Power Plant Air Pollutant Control Symposium; The Mega Symposium and the A&WMA Specialty Conference and Mercury Emissions: Fate, Effects and Control; Chicago, IL, (Aug. 2001), 1-19.
Fernandez-Saavedra, R., et al., "Polymer-Clay Nanocomposites as Precursors of Nanostructured Carbon Materials for Electrochemical Devices: Templating Effect of Clays", Journal of Nanoscience and Nanotechnology, 8, (2008), 1741-1750.
Ghorbani, M., et al., "Application of polyaniline nanocomposite coated on rice husk ash for removal of Hg(II) from aqueous media", Synthetic Metals, (2001), 4 pgs.
Ghorishi, Behrooz, et al., "Sorption of Mercury Species by Activated Carbons and Calcium-Based Sorbents: Effect of Temperature, Mercury Concentration and Acid Gases", Waste Manage. Res., 16:6, (1998), 582-593.
Gomez-Aviles, A., et al., "Functionalized Carbon-Silicates from Caramel-Sepiolite Nanocomposites", Angew. Chem. Int. Ed., 46, (2007), 923-925.
Gomez-Aviles, A., et al., "Multifunctional materials based on graphene-like/sepiolite nanocomposites", Applied Clay Science, 47, (2010), 203-211.
Ha, et al., "Effect of unburnt carbon on the corrosion performance of fly ash cement mortar", Construction and Building Materials, (Sep. 1, 2005), 7 pgs.
Ikeue, K., et al., "Noble-metal-containing nanoporous carbon synthesized within the interlayer space of montmorillonite and its catalytic property", Applied Catalysis A: General, 351, (2008), 68-74.
Kawabuchi, Yuji, et al., "Chemical vapor deposition of heterocyclic compounds over active carbon fiber to control its porosity and surface function", Langmuir 13.8, (1997), 2314-2317.
Kyotani, T., et al., "Formation of highly orientated graphite from polyacrylonitrile by using a two-dimensional space between montmorillonite lamellae", Nature, 331, (1988), 331-333.
Lancia, A., et al., "Adsorption of Mercuric Chloride Vapours from Incinerator Flue Gases on Calcium Hydroxide Particles", Combust. Sci. & Tech., 93, (1993), 277-289.
Laumb, Jason D., et al., "X-ray photoelectron spectroscopy analysis of mercury sorbent surface chemistry", Fuel Processing Technology, 85, (2004), 577-585.
Li, Y., et al., "Removal of elemental mercury from simulated coal-combustion flue gas using a SiO2-TiO2 nanocomposite", Fuel Processing Technology, 89, (2008), 567-573.
M, Hocquel, "Quecksilber and seine Verbindungen bei der Abfallverbrennung", with English Abstract p. 3, (Dec. 31, 2000), 112 pgs.
Maroto-Valer, M. Mercedes, et al., "Development of Activated Carbons From Coal and Biomass Combustion and Gasification Chars", (2004), 2 pgs.
Mochida, I., et al., "Preparation of nitrogen containing pitches from quinoline and isoquinoline by AID of AlCl3", Carbon, 33(8), (1995), 1069-1077.
Nguyen-Thanh, D., et al., "High Porosity Carbonaceous Adsorbents Templated From Porous Clay Heterostructures", Prepr. Pap.-Am. Chem. Soc., Div. Fuel Chem., 51(1), (2006), 7-8.
Nguyen-Thanh, D., et al., "Metal-loaded carbonaceous adsorbents templated from porous clay heterostructures", Microporous and Mesoporous Materials, 92, (2006), 47-55.
Nickels, Dale L, et al., "Processing and reuse of activated carbon used to adsorb mercury from power plant flue gases", Final report, (2004).
Olson, David, et al., "The reduction of gas phase air toxics from combustion and incineration sources using the MET-Mitsui-BF activated coke process", Fule Processing Technology, (2000), 13 pgs.
Olson, David G., et al., "The Reduction of Gas Phase Air Toxics from Combustion and Incineration Sources using the MET-Mitsui-BF Activated Coke Process", Fuel Processing Technology, 65-66, (2000), 393-405.
Olson, E. S., et al., "Catalytic effects of carbon sorbents for mercury capture", Journal of Hazardous Materials, 74, (2000), 61-79.
Olson, Edwin S., et al., "Surface Compositions of Carbon Sorbents Exposed to Simulated Low-Rank Coal Flue Gases", J. Air & Water Waste Manage. Assoc., 55, (2005), 747-754.
Padak, Bihter, "Understanding mercury binding on activated carbon", Carbon 47.1 2, (2009), 2855-2864.
Przepiorski, J, et al., "High temperature ammonia treatment of activated carbon for enhancement of CO2 adsorption", Applied Surface Science 225.1, (2004), 235-242.
Rachel, Ribeirovieira Azzi Rios, et al., "Tailoring Activated Carbon by Surface Chemical Modification with O, S, and N Containing Molecules", Materials Research. 6 (2), (2003), 129-135.
Raymundo-Pinero, E, et al., "Structural characterization of N-containing activated carbon fibers prepared from a low softening point petroleum pitch and a melamine resin", Carbon 40.4, (2002), 597-608.
Smokey, et al., "Alternative to Activated Carbon for Mercury Control", Power Engineering, (Oct. 2012), 10 pgs.
Streng, Sabine, et al., "Toxics control by activated charcoal within the "System Dusseldorf" full scale experience", B. Fuel Processing Technology, (1994), 14 pgs.
Tsuji, K, et al., "The Activated Coke Process for Combinded SOx/NOx/Air Toxics Reduction", Air and Water Management Assoc., (Mar. 10, 1993), 27 pgs.
Vosteen, B, et al., "Chlor-und Bromgestutzte Hg-Sorption an Elektrofilter-Flugaschen eines kohlegefeuerten Schmelzkammerkessels und an Zementrohmehl", Matin-Luther-Universitat Halle-Wittenberg, English translation and abstract are unavailable., (2003), 1-30.
Vosteen, B. W., "Bromine-enhanced Mercury Abatement from Combustion Flue Gases—Recent Industrial Applications and Laboratory Research", VGB PowerTech, vol. 86, Issue Mar. 2006, (2006), 70-75.
Vosteen, B. W., et al., "Mercury—Emissions, Measuring and Mitigation Techniques", Flyer on Mercury Abatement given at the VDI-Wissensforum, Dusseldorf, Germany, German language with machine translation, (Sep. 2003), 11 pgs.
Vosteen, B.W., et al., "Emissionsminderung von Quecksilber durch chlor- und bromgestutzte Hg-Oxidation in Rauchgas", (Sep. 2003), 23 pgs.
Wan, Q., et al., "Removal of gaseous elemental mercury over a CeO2—WO3/TiO2 nanocomposite in simulated coal-fired flue gas", Chemical Engineering Journal, 170, (2011), 512-517.
Wang, B., et al., "Performance of a diatomite-based sorbent in removing mercury from aqueous and oil matrices", J. Environ. Eng. Sci., 6, (2007), 469-476.
Zhang, Y., et al., "High efficient removal of mercury from aqueous solution by polyaniline/humic acid nanocomposite", Journal of Hazardous Materials, 175, (2010), 404-409.
Zhao, Yongxin, et al., "Effectsof Sulfur Dioxide and Nitric Oxide on Mercury Oxidation and Reducton under Homogeneous Conditions", J. Air & Waste Manage. Assoc., 56, (2006), 628-635.

(56) References Cited

OTHER PUBLICATIONS

Zheng, Yuanjing, et al., "Review of technologies for mercury removal from flue gas from cement production processes", Progress in Energy and Combustion Science, vol. 38, No. 5, (Apr. 26, 2012), 599-629.

Zhu, Jianzhong, et al., "Enhanced mercury ion adsorption by amine-modified activated carbon", Journal of hazardous materials 166, (2009), 866-872.

U.S. Appl. No. 16/574,935, filed Sep. 18, 2019, Activated Carbon Sorbent Including Nitrogen and Methods of Using the Same.

"U.S. Appl. No. 14/712,558, Non Final Office Action dated Sep. 12, 2019", 15 pgs.

"U.S. Appl. No. 14/712,558, Response filed Sep. 17, 2019 to Non Final Office Action dated Sep. 12, 2019", 12 pgs.

"U.S. Appl. No. 15/295,594, Final Office Action dated Aug. 2, 2019", 18 pgs.

"U.S. Appl. No. 15/382,114, Response filed Oct. 3, 2019 to Final Office Action dated Jun. 21, 2019", 23 pgs.

"U.S. Appl. No. 15/589,359, Corrected Notice of Allowability dated Oct. 11, 2019", 2 pgs.

"U.S. Appl. No. 15/974,343, Corrected Notice of Allowability dated Oct. 23, 2019", 2 pgs.

"U.S. Appl. No. 15/974,343, Non Final Office Action dated Aug. 21, 2019", 13 pgs.

"U.S. Appl. No. 15/974,343, Notice of Allowance dated Sep. 17, 2019", 7 pgs.

"U.S. Appl. No. 15/997,091, Corrected Notice of Allowability dated Oct. 23, 2019", 3 pgs.

"U.S. Appl. No. 15/997,091, Corrected Notice of Allowability dated Nov. 22, 2019", 3 pgs.

"U.S. Appl. No. 15/997,091, Non Final Office Action dated Aug. 23, 2019", 14 pgs.

"U.S. Appl. No. 15/997,091, Notice of Allowance dated Sep. 18, 2019", 8 pgs.

"U.S. Appl. No. 16/509,071, Non Final Office Action dated Sep. 11, 2019", 21 pgs.

"U.S. Appl. No. 16/509,071, Response filed Oct. 3, 2019 to Non Final Office Action dated Sep. 11, 2019", 26 pgs.

"U.S. Appl. No. 16/509,102, Amendment and Response filed Nov. 11, 2019 to Non Final Office Action dated Oct. 23, 2019", 34 pgs.

"U.S. Appl. No. 16/509,102, Non Final Office Action dated Oct. 23, 2019", 26 pgs.

"U.S. Appl. No. 16/509,146, Amendment and Response filed Nov. 11, 2019 to Non Final Office Action dated Oct. 17, 2019", 34 pgs.

"U.S. Appl. No. 16/509,146, Non Final Office Action dated Oct. 17, 2019", 24 pgs.

"Ch. 35: Mercury, Hazardous Air Pollutants and other Multi-Pollutant Control", Tomei, G. L. (Ed.), Steam: its generation and use, Babcock and Wilcox Co., (2015), 24 pgs.

"Defendant's Answer and Counterclaim", Midwest Energy Emissions Corp., et al., v. Vistra Energy Corp., et al.—Case 1:19-cv-01334-RGA, (Oct. 9, 2019), 71 pgs.

"Original Complaint for Patent Infringement", Midwest Energy Emissions Corp., et al., v. Vistra Energy Corp., et al.—Case 1:19-cv-01334-UNA, (Jul. 17, 2019), 31 pgs.

"Plaintiff's Answer to Defendant's Counterclaims", Midwest Energy Emissions Corp., et al., v. Vistra Energy Corp., et al.—Case 1:19-cv-01334-RGA, (Oct. 30, 2019), 37 pgs.

Olson, E.S., et al,, "Chemical mechanisms in mercury emission control technologies", J. Phys. IV France 107, PrOC, of the XIIth Intl. Conference on Heavy Metals in the Environment vol. II, pp. 979-982, (2003), 6 pgs.

Olson, Edwin S., "Abstract—Multiple Site Model for Flue Gas—Mercury interactions on Activated Carbons: The Basic Site", Abstracts of Papers Part 1, 225th ACS National Meeting, New Orleans, LA, (2003), 3 pgs.

Olson, Edwin S., et al., "An Improved Model for Flue Gas—Mercury Interactions on Activated Carbons", Proceedings of the Combined Power Plant Air Pollutant Control Mega Symposium, (May 2003), 8 pgs.

Olson, Edwin, et al., "The Multiple Site Model for Flue Gas—Mercury Interactions on Activated Carbons: The Basic Site", Fuel Chemistry Preprints, 48(1), (2003), 3 pgs.

U.S. Appl. No. 16/509,071, filed Jul. 11, 2019, Sorbents for the Oxidation and Remowil of Mercury.

U.S. Appl. No. 16/509,102, filed Jul. 11, 2019, Treatment of Coal With Mercury Control Additives.

U.S. Appl. No. 16/509,146, filed Jul. 11, 2019, Sorbents for the Oxidation and Removal of Mercury.

"U.S. Appl. No. 14/712,558, Non Final Office Action dated Oct. 19, 2018", 26 pgs.

"U.S. Appl. No. 14/712,558, Non-Final Office Action dated Oct. 19, 2018", 35 pgs.

"U.S. Appl. No. 14/712,558, Response filed Aug. 14, 2018 to Non Final Office Action dated Jul. 2, 2018", 11 pgs.

"U.S. Appl. No. 15/295,594, Non Final Office Action dated Oct. 23, 2018", 20 pgs.

"U.S. Appl. No. 15/295,594, Response filed Jul. 24, 2018 to Restriction Requirement dated Jun. 29, 2018", 9 pgs.

"U.S. Appl. No. 15/382,114, Response filed Sep. 12, 2018 to Restriction Requirement dated Aug. 28, 2018", 8 pgs.

"U.S. Appl. No. 15/382,114, Restriction Requirement dated Aug. 28, 2018", 9 pgs.

"U.S. Appl. No. 15/589,359, Final Office Action dated Sep/ 12, 2018", 14 pgs.

"U.S. Appl. No. 15/589,359, Non Final Office Action dated Oct. 22, 2018", 12 pgs.

"U.S. Appl. No. 15/589,359, Response filed Jul. 26, 2018 to Non Final Office Action dated Jun. 4, 2018", 14 pgs.

"U.S. Appl. No. 15/589,359, Response filed Sep. 14, 2018 to Final Office Action dated Sep. 12, 2018", 18 pgs.

"U.S. Appl. No. 15/974,343, Non Final Office Action dated Jul. 27, 2018", 12 pgs.

"U.S. Appl. No. 15/974,343, Non Final Office Action dated Oct. 29, 2018", 22 pgs.

"U.S. Appl. No. 15/974,343, Response filed Aug. 14, 2018 to Non Final Office Action dated Jul. 27, 2018", 11 pgs.

"U.S. Appl. No. 15/978,760, Non Final Office Action dated Oct. 10, 2018", 17 pgs.

"U.S. Appl. No. 15/997,091, Non Final Office Action dated Jul. 27, 2018", 13 pgs.

"U.S. Appl. No. 15/997,091, Non Final Office Action dated Nov. 2, 2018", 27 pgs.

"U.S. Appl. No. 15/997,091, Response filed Aug. 14, 2018 to Non Final Office Action dated Jul. 27, 2018", 10 pgs.

Pietrzak, et al., "Preparation of nitrogen-enriched activated carbons from brown coal", Energy and Fuels 20.3, (2006), 1275-1280.

"U.S. Appl. No. 14/712,558, Amendment and Response filed Dec. 3, 2018 to Non Final Office Action dated Oct. 19, 2018", 28 pgs.

"U.S. Appl. No. 14/712,558, Final Office Action dated Jan. 11, 2019", 27 pgs.

"U.S. Appl. No. 15/382,114, Non Final Office Action dated Dec. 12, 2018", 46 pgs.

"U.S. Appl. No. 15/382,114, Response filed Mar. 12, 2019 to Non Final Office Action dated Dec. 12, 2018", 24 pgs.

"U.S. Appl. No. 15/589,359, Amendment and Response filed Jan. 17, 2019 to Non Final Office Action dated Oct. 22, 2018", 14 pgs.

"U.S. Appl. No. 15/589,359, Final Office Action dated Mar. 1, 2019", 10 pgs.

"U.S. Appl. No. 15/974,343, Amendment and Response filed Dec. 3, 2018 to Non Final Office Action dated Oct. 29, 2018", 37 pgs.

"U.S. Appl. No. 15/974,343, Final Office Action dated Jan. 14, 2019", 25 pgs.

"U.S. Appl. No. 15/978,760, Amendment and Response filed Dec. 3, 2018 to Non Final Office Action dated Oct. 10, 2018", 25 pgs.

"U.S. Appl. No. 15/978,760, Final Office Action dated Dec. 26, 2018", 21 pgs.

"U.S. Appl. No. 15/978,760, Response filed Mar. 20, 2019 to Final Office Action dated Dec. 26, 2018", 89 pgs.

"U.S. Appl. No. 15/997,091, Final Office Action dated Jan. 11, 2019", 20 pgs.

"U.S. Appl. No. 15/997,091, Response filed Dec. 3, 2018 Non Final Office Action dated Nov. 2, 2018", 40 pgs.

(56) References Cited

OTHER PUBLICATIONS

"Coal Combustion Products (CCPs): Characteristics, Utilization and Beneficiation", Edited by Tom Robl, et al., Woodhead Publishing (Elsevier), (2017), 565 pgs.
"Control of Mercury Emissions from Coal Fired Electric Utility Boilers: An Update", US EP Air Pollution Prevention and Control Division, National Risk Management Research Laboratory, Office of Research and Development, (Feb. 18, 2005), 59 pgs.
"Sorbent Enhancement Additives for Mercury Control", US DOE Office of Fossil Energy, National Energy Technology Laboratory, (Jun. 2008), 4 pgs.
Benson, Steven A., et al., "JV Task 73—Mercury Control Technologies for Electric Utilities Burning Subbituminous Coals—Draft Final Report", University of North Dakota Energy and Environmental Research Center, (Jun. 2005), 165 pgs.
Benson, Steven A., et al., "Pilot-and Full-Scale Demonstration of Advanced Mercury Control Technologies for Lignite-Fired Power Plants", University of North Dakota Energy and Environmental Research Center, (Feb. 2005), 97 pgs.
Berry, Mark, et al., "Mercury control evaluation of calcium bromide injection into a PRB-fired furnace with an SCR", Proc. of the Air Quality VI Conference, Arlington, VA, (2007), 9 pgs.
Brown, Thomas D., et al., "Mercury Measurement and Its Control: What We Know, Have Learned, and Need to Further Investigate", Journal of the Air and Waste Management Association, 49(6), (Jun. 1999), 98 pgs.
Feeley, Thomas J., et al., "A Review of DOE/NETL's Mercury Control Technology R and D Program for Coal-Fired Power Plants", DOE/NETL1 Hg R and D Program Review, (Apr. 2003), 32 pgs.
French, Charles L., et al., "Study of Hazardous Air Pollutant Emissions from Electric Utility Steam Generating Units—Final Report to Congress: vol. 1", US EPA Office of Air Quality Planning and Standards, (Feb. 1998), 502 pgs.
Ghorishi, Behrooz S., et al., "In-Flight Capture of Elemental Mercury by Chlorine-Impregnated Activated Carbon", Proc. of the 94th Annual Meeting of the Air and Waste Management Association, Orlando, FL, (Jun. 2001), 14 pgs.
Jones, Andrew P., et al., "DOE/NETL's Phase II Mercury Control Technology Field Testing Program: Preliminary Economic Analysis of Activated Carbon Injection", Environmental Science and Technology, 41(4), (2007), 7 pgs.
Keating, Martha H., et al., "Mercury Study Report to Congress vol. 1: Executive Summary", US EPA Office of Air Quality Planning and Standards, (Dec. 1997), 95 pgs.
Kilgroe, James D., et al., "Control of Mercury Emissions from Coal-Fired Electric Utility Boilers: Interim Report", US EPA Office of Research and Development, National Risk Management Laboratory, Air Pollution Prevention and Control Division, (Dec. 2001), 485 pgs.
Nelson, Sid Jr., et al., "How China Can Leapfrog the World in Mercury Emission Reductions", Proc. of the AWMA Intl. Specialty Conference on Leapfrogging Opportunities for Air Quality Improvement, (2010), 24 pgs.
Pavlish, John H., et al., "Status review of mercury control options for coal-fired power plants", Fuel Processing Technology, vol. 82, (2003), 77 pgs.
Yang, Yang, et al., "Effect of HBr formation on mercury oxidation via CaBr(2) addition to coal during combustion", RSC Advances, 6(64), (2016), 7 pgs.
"U.S. Appl. No. 14/712,558, Response filed Jul. 10, 2019 to Final Office Action dated Jan. 11, 2019", 57 pgs.
"U.S. Appl. No. 15/295,594, Response filed Apr. 23, 2019 to Non Final Office Action dated Oct. 23, 2018", 45 pgs.
"U.S. Appl. No. 15/382,114, Final Office Action dated Jun. 21, 2019", 31 pgs.
"U.S. Appl. No. 15/589,359, Advisory Action dated May 22, 2019", 3 pgs.
"U.S. Appl. No. 15/589,359, Non Final Office Action dated Jun. 21, 2019", 7 pgs.
"U.S. Appl. No. 15/589,359, Notice of Allowance dated Jul. 31, 2019", 7 pgs.
"U.S. Appl. No. 15/589,359, Response filed Apr. 30, 2019 to Final Office Action dated Mar. 1, 2019", 11 pgs.
"U.S. Appl. No. 15/589,359, Response filed Jul. 16, 2019 to Non Final Office Action dated Jun. 21, 2019", 7 pgs.
"U.S. Appl. No. 15/974,343, Response filed Jul. 10, 2019 to Final Office Action dated Jan. 14, 2019", 81 pgs.
"U.S. Appl. No. 15/978,760, Ex Parte Quayle Action mailed Apr. 19, 2019", 13 pgs.
"U.S. Appl. No. 15/978,760, Notice of Allowability dated May 30, 2019", 3 pgs.
"U.S. Appl. No. 15/978,760, Notice of Allowance dated May 8, 2019", 7 pgs.
"U.S. Appl. No. 15/978,760, Response filed Apr. 23, 2019 to Ex Parte Quayle Action mailed Apr. 19, 2019", 15 pgs.
"U.S. Appl. No. 15/997,091, Response filed Jul. 10, 2019 to Final Office Action dated Jan. 11, 2019", 80 pgs.
"Activated carbon", Wikipedia, [Online] Retrieved from the Internet: <URL: https://en.wikipedia.org/wiki/Activated_carbon.>, (Retrieved on May 11, 2020), 21 pgs.
"U.S. Appl. No. 14/712,558, Notice of Allowance dated Dec. 13, 2019", 7 pgs.
"U.S. Appl. No. 15/382,114, Non Final Office Action dated Dec. 31, 2019", 33 pgs.
"U.S. Appl. No. 15/382,114, Notice of Allowance dated Aug. 10, 2020", 11 pgs.
"U.S. Appl. No. 15/382,114, Response filed Jun. 30, 2020 to Non Final Office Action dated Dec. 31, 2019", 21 pgs.
"U.S. Appl. No. 15/853,029, Response filed Nov. 20, 2020 to Restriction Requirement dated May 21, 2020", 10 pgs.
"U.S. Appl. No. 15/853,029, Restriction Requirement dated May 21, 2020", 8 pgs.
"U.S. Appl. No. 15/974,343, Non Final Office Action dated Dec. 2, 2019", 12 pgs.
"U.S. Appl. No. 15/974,343, Notice of Allowance dated Apr. 13, 2020", 7 pgs.
"U.S. Appl. No. 15/974,343, Response filed Apr. 2, 2020 to Non-Final Office action flied Dec. 2, 2019", 13 pgs.
"U.S. Appl. No. 16/130,670, Final Office Action dated Aug. 24, 2020", 11 pgs.
"U.S. Appl. No. 16/130,670, Non Final Office Action dated Dec. 16, 2019", 8 pgs.
"U.S. Appl. No. 16/130,670, Response filed Jun. 16, 2020 to Non Final Office Action dated Dec. 16, 2019", 14 pgs.
"U.S. Appl. No. 16/509,071, Final Office Action dated Dec. 12, 2019", 23 pgs.
"U.S. Appl. No. 16/509,071, Non Final Office Action dated May 29, 2020", 31 pgs.
"U.S. Appl. No. 16/509,071, Response filed May 12, 2020 to Final Office Action dated Dec. 12, 2019", 31 pgs.
"U.S. Appl. No. 16/509,102, Final Office Action dated Feb. 14, 2020", 13 pgs.
"U.S. Appl. No. 16/509,146, Final Office Action dated Feb. 14, 2014-20", 23 pgs.
"U.S. Appl. No. 16/574,935, Non Final Office Action dated Sep. 9, 2020", 17 pgs.
"U.S. Appl. No. 16/574,935, Response filed Sep. 16, 2020 to Non Final Office Action dated Sep. 9, 2020", 12 pgs.
"DARCO Hg, Powdered Activated Carbon Data SHeet", CABOT Corp., (Oct. 24, 2017), 2 pgs.
"Fluegas Properties Calculator", Increase Performance, Inc., [Online] Retrieved from the Internet: <URL: http://www.increase-performance.com/calc-flue-gas-prop.html>, (Retrieved on May 11, 2020), 1 pg.
"STEAM Table 8a, 8b", Steam: Its Generation and Use 42nd Ed, (2015), 2 pgs.

* cited by examiner

SORBENTS FOR THE OXIDATION AND REMOVAL OF MERCURY

CROSS-REFERENCE TO RELATED APPLICATIONS

This application is a continuation of U.S. patent application Ser. No. 14/318,270, filed Jun. 27, 2014, which is a continuation of U.S. patent application Ser. No. 13/966,768, filed Aug. 14, 2013, issued as U.S. Pat. No. 8,821,819, which is a continuation of U.S. patent application Ser. No. 13/427,665, filed Mar. 22, 2012, issued as U.S. Pat. No. 8,512,655, which is a continuation of U.S. patent application Ser. No. 12/419,219, filed Apr. 6, 2009, issued as U.S. Pat. No. 8,168,147, which is a continuation of U.S. patent application Ser. No. 12/201,595, filed Aug. 29, 2008, which is a division of U.S. patent application Ser. No. 11/209,163, filed Aug. 22, 2005, issued as U.S. Pat. No. 7,435,286, which application claims the benefit under 35 U.S.C. § 119 (e) of U.S. Provisional Patent Application No. 60/605,640 filed Aug. 30, 2004, the disclosure of which is hereby incorporated by reference in its entirety.

STATEMENT REGARDING FEDERALLY SPONSORED RESEARCH OR DEVELOPMENT

This invention was made with United States Government support under Grant Numbers R 827649-01 and CR 830929-01 awarded by the United States Environmental Protection Agency and under Contract Number DE-FC26-98FT40320 awarded by the United States Department of Energy. The United States Government has certain rights in this invention.

BACKGROUND OF THE INVENTION

1. Technical Field of the Invention

The present invention relates to methods and materials for the removal of pollutants from flue gas or product gas from a gasification system. In particular, mercury is removed from gas streams generated during the burning or gasification of fossil fuels by highly reactive regenerable sorbents.

2. Background of the Invention

The combustion and gasification of fossil fuel such as coal generates flue gas that contains mercury and other trace elements that originate from the fuel. The release of the mercury (and other pollutants) to the environment must be controlled by use of sorbents, scrubbers, filters, precipitators, and other removal technologies. Mercury is initially present in the elemental form during combustion and gasification. In downstream process sections, such as in the ducts and stack of a combustion system, some of the elemental mercury is oxidized. The amount that is oxidized depends on the amount of acid gases present in the flue gas and other factors. Amounts of mercury vary with the fuel, but concentrations of mercury in the stream of flue gas from coal combustion are typically less than 5 parts per billion (ppb). Large coal combustion facilities such as electric utilities may emit a pound of mercury, or more, per day. Mercury removal applications include, without limitation, flue gas from coal (or other fossil fuel) combustion, waste incineration, product gas from gasification, as well as off gases from mineral processing, metal refining, retorting, cement manufacturing, chloralkali plants, dental facilities, and crematories.

Mercury Sorbent Technologies

Several types of mercury control methods for flue gas have been investigated, including injection of fine sorbent particles into a flue gas duct and passing the flue gas through a sorbent bed. Fine-particle injection sorbents include activated carbon, metal oxide sorbent, sodium sulfide particles, and basic silicate or oxide sorbents. When particle injection is employed, the mercury captured on the sorbent particles is removed from the gas stream in a bag house or electrostatic precipitator (ESP) and collected along with ash particulate. The sulfide and basic silicate and oxide particles are effective only for the oxidized mercury, and the metal oxide sorbents exhibit slower capture kinetics than the carbon particles. Additionally, injection of fine carbon particles into the flue gas stream has been only partially successful in removing mercury, especially elemental mercury, where effective removal of only about 60% is attained for some applications with a FF (fabric filter) to collect carbon and ash. Even lower removal rates have been observed when using an ESP to collect the carbon because the contact time of the carbon with the gas is very short.

A major problem with existing carbon injection systems is that the sorbent is initially unreactive, and only after extended exposure to the flue gas does the sorbent become effectively seasoned and provide increased reactivity with the mercury in the gas. Consequently, these sorbents must be used in large amounts, at high sorbent-to-mercury ratios, to effectively capture the mercury. These sorbents tend to be relatively expensive and cannot be easily separated from the ash for regeneration and reuse. The collection of carbon in the ash also creates solid waste disposal problems, and the spent sorbent may contaminate the collected ash, preventing its use in various applications.

Accordingly, there remains a need for more economical and effective mercury removal technology. This invention provides for cost-effective removal of pollutants including mercury, using sorbent enhancement additives and/or highly reactive sorbents, with contact times of seconds (or less), and that may be regenerated and reused.

SUMMARY OF THE INVENTION

It is thus an object of the present invention to overcome the deficiencies of the prior art and thereby to provide new and economical methods for the removal of mercury from the gases produced in the utilization of fossil fuels.

A halogen/halide promoted activated carbon sorbent is described that is highly effective for the removal of mercury from flue gas streams. The sorbent comprises a new halide-modified carbon form containing a reactive compound produced by the reaction of bromine (or halide or other halogen) with the carbon. Optional secondary components and alkali may be added to further increase reactivity and mercury capacity. Mercury removal efficiencies obtained exceed or match conventional methods with added benefits such as reduced costs. Optionally, the sorbent can be regenerated and reused. Sorbent treatment and/or preparation methods are also described. New methods for in-flight preparation, introduction, and control of the active sorbent into the mercury contaminated gas stream are described.

In some embodiments, a promoted carbon sorbent is provided comprising a base activated carbon that has reacted with a promoter selected from the group consisting of halides, halogens, and combinations thereof, such that the reaction product is effective for the removal of mercury from a gas stream.

In an embodiment, a promoted carbon sorbent is provided wherein the base activated carbon is selected from the group consisting of powdered activated carbon, granular activated carbon, carbon black, carbon fiber, aerogel carbon, pyrolysis char, activated carbon with an average particle size greater than that of flyash produced such that it is physically separable therefrom, and combinations thereof, and the promoter is selected from the group consisting of molecular halogens, Group V (CAS nomenclature is used throughout) halides. Group VI halides, hydrohalides, and combinations thereof. In an embodiment, the base activated carbon may have an mass mean particle diameter such that it can be substantially separated by physical means from entrained ash in the gas stream from which mercury is to be removed. In an embodiment, the base activated carbon may have a mass mean particle diameter greater than about 40 micrometers.

In another embodiment, the sorbent comprises from about 1 to about 30 grams promoter per 100 grams of base activated carbon. Another embodiment further comprises an optional secondary component comprising a halogen or a hydrohalide such that the reactivity and mercury capacity of the sorbent are enhanced.

In another embodiment, the concentration of the optional secondary component on the finished sorbent is within the range of from about 1 to about 15 wt-% of the concentration of the promoter on the finished sorbent.

In another embodiment, an optional alkali component may preferably be added to provide a synergistic effect through combination of this alkali with the primary sorbent.

In another embodiment, the optional secondary component is selected from the group consisting of Group V halides. Group VI halides, HI, HBr, HCl, and combinations thereof. In another embodiment, the promoter is substantially in vapor form when combined with the base activated carbon. In another embodiment, the promoter is combined with an organic solvent prior to reaction with the base activated carbon. In another embodiment, the promoter and optional secondary component are combined with the base activated carbon substantially simultaneously. Another embodiment further comprises adding a mercury-stabilizing reagent selected from the group consisting of S, Se, $H_2S$, $SO_2$, $H_2Se$, $SeO_2$, $CS_2$, $P_2S_5$, and combinations thereof. Another embodiment further comprises adding an optional alkali component.

In an embodiment, a method is provided comprising providing a granular activated carbon; reacting the activated carbon with a promoter selected from the group consisting of halogens, halides, and combinations thereof, such that the reaction product comprises a promoted carbon sorbent effective for removal of mercury from a gas stream. In a further embodiment, the reaction product comprises from about 1 to about 30 grams promoter per 100 grams activated carbon. In another embodiment the reaction product has an average particle size distribution greater than the average size of entrained ash particles in the gas stream from which mercury is to be removed, such that the reaction product can be substantially removed from the entrained ash particles by physical means. In another embodiment the reaction product has a mass mean particle diameter greater than about 40 micrometers.

In another embodiment, the promoter is selected from the group consisting of molecular halogens, hydrohalides, Group V halides. Group VI halides, and combinations thereof. In another embodiment the promoter is in the gas phase when contacting the activated carbon. In another embodiment, the promoter is in an organic solvent when contacting the activated carbon.

In another embodiment, the promoter is selected from the group consisting of $Br_2$, a Group V bromide, a Group VI bromide, and combinations thereof.

In another embodiment, the method further comprises reacting the granular activated carbon with an optional secondary component comprising a halogen or a hydrohalide such that the reactivity and mercury capacity of the sorbent are enhanced. In another embodiment, the promoter and optional secondary component are contacted simultaneously with the activated carbon. In another embodiment the method further comprises adding a mercury-stabilizing reagent selected from the group consisting of S, Se, $H_2S$, $SO_2$, $H_2Se$, $SeO_2$, $CS_2$, $P_2S_5$, and combinations thereof. In an embodiment, a method is provided for control of mercury in a flue gas with substantially lower sorbent requirements. Through enhanced sorbent reactivity, mercury removal per gram of sorbent is increase, thereby decreasing the capital and operating costs by decreasing sorbent requirements.

In an embodiment, a method is provided for reducing mercury in flue gas comprising providing a sorbent, injecting the sorbent into a mercury-containing flue gas stream, collecting greater than 70 wt-% of the mercury in the flue gas on the sorbent to produce a cleaned flue gas, and substantially recovering the sorbent from the cleaned flue gas. In embodiments where less than 70 wt-% mercury removal is desired, the required removal may preferably be attained using less than half as much carbon as would be required with standard (non-enhanced) carbon. In a further embodiment, the method further comprises monitoring the mercury content of the clean flue gas, regenerating the recovered sorbent, and using the monitored mercury content of the cleaned flue gas to control the rate of injection of the sorbent. In another embodiment the injected sorbent is prepared in-flight by reacting an activated carbon and a promoter within a pneumatic transport line from which the reaction product is injected to the mercury-containing flue gas stream.

In another embodiment, the promoter is selected from the group consisting of molecular halogens, halides, and combinations thereof. In another embodiment, the promoter is reacted in the gas phase or as a vapor. In another embodiment, the promoter is added at from about 1 to about 30 grams per 100 grams of activated carbon.

In another embodiment, the injected sorbent is prepared in-flight by reacting an activated carbon, a promoter, and an optional secondary component to enhance the reactivity and capacity of the sorbent within a pneumatic transport line from which the reaction product is injected to the mercury-containing flue gas stream.

In another embodiment, the optional secondary component is selected from the group consisting of iodine, hydrohalides. Group V halides, Group VI halides, and combinations thereof. In another embodiment, the optional secondary component is added at from about 1 to about 15 wt % of the promoter content. In another embodiment, the method further comprises adding to the sorbent a mercury-stabilizing reagent selected from the group consisting of S, Se, $H_2S$, $SO_2$, $H_2Se$, $SeO_2$, $CS_2$, $P_2S_5$, and combinations thereof.

In an embodiment, the method further comprises co-injecting an optional alkaline material, including without limitation alkaline and alkaline earth components, to improve the efficiency of mercury capture by capturing oxidized mercury and/or capturing gaseous components that might otherwise reduce sorbent capacity. In another embodiment, the optional alkaline material may preferably comprise calcium oxide, sodium carbonate, and the like, as are known in the art.

In another embodiment, the method further comprises using the monitored mercury content of the cleaned flue gas to control the composition of the sorbent. In another embodiment, the injected sorbent is prepared in-flight by reacting an activated carbon and a promoter within a pneumatic transport line from which the reaction product is injected to the mercury-containing flue gas stream, wherein the promoter is selected from the group consisting of molecular halogens, halides, and combinations thereof, wherein the promoter is reacted in the gas phase or as a vapor, wherein the promoter is added at from about 1 to about 30 grams per 100 grams of activated carbon, wherein the rate at which the promoter is added and the rate of sorbent injection are determined by a digital computer based at least in part on the monitored mercury content of the cleaned flue gas.

In an embodiment, a method for reducing the mercury content of a mercury and ash containing gas stream is provided wherein particulate activated carbon sorbent with a mass mean size greater than 40 μm is injected into the gas stream, mercury is removed from the gas by the sorbent particles, the sorbent particles are separated from the ash particles on the basis of size, and the sorbent particles are re-injected to the gas stream. In another embodiment, the mercury-containing sorbent particles are regenerated to remove some or substantially all of the mercury. In another embodiment, an alkaline component is co-injected into the gas stream. In another embodiment, the sorbent may further comprise a promoter. The promoter may preferably comprise a halide, a halogen, or both.

As will be described in more detail below, the present invention thus provides several advantages over previously known techniques, including significantly more effective and economical mercury sorbents for effluent gases, advantageously applicable to treating gas streams from fired equipment and gasification systems.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the an that such equivalent constructions do not depart from the spirit and scope of the invention as set forth in the appended claims.

BRIEF DESCRIPTION OF THE DRAWINGS

For a more detailed description of the preferred embodiments of the present invention, reference will now be made to the accompanying drawings.

DETAILED DESCRIPTION OF THE PREFERRED EMBODIMENTS

Herein will be described in detail specific preferred embodiments of the present invention, with the understanding that the present disclosure is to be considered an exemplification of the principles of the invention, and is not intended to limit the invention to that illustrated and described herein. The present invention is susceptible to preferred embodiments of different forms or order and should not be interpreted to be limited to the specifically expressed methods or compositions contained herein. In particular, various preferred embodiments of the present invention provide a number of different configurations and applications of the inventive method, compositions, and their uses.

The present invention provides a cost-effective way to capture pollutants by utilizing exceptionally reactive halogen/halide promoted carbon sorbents using a bromide (or other halogen/halide) treatment of the carbon, that capture mercury via mercury-sorbent surface reactions, at very short contact times of seconds or less. The sorbent does not require in situ activation (no induction period) in the gas stream to achieve high reactivity, as do conventional activated carbon sorbents. The reactivity of the sorbent toward the pollutants is greatly enhanced and the sorption capacity can be regenerated, the promoted sorbent may be regenerated, recycled and/or reused.

The treated carbons, treatment techniques, and optional additives discussed herein have applicability to mercury control from the product or effluent gas or gases from gasification systems, syngas generators, and other mercury-containing gas streams, in addition to the flue gas from combustion systems. Thus, it should be understood that the terms combustion system and flue gas as used throughout this description may apply equally to gasification systems and syngas or fuel gas, as will be understood by those skilled in the art.

Figure 1:
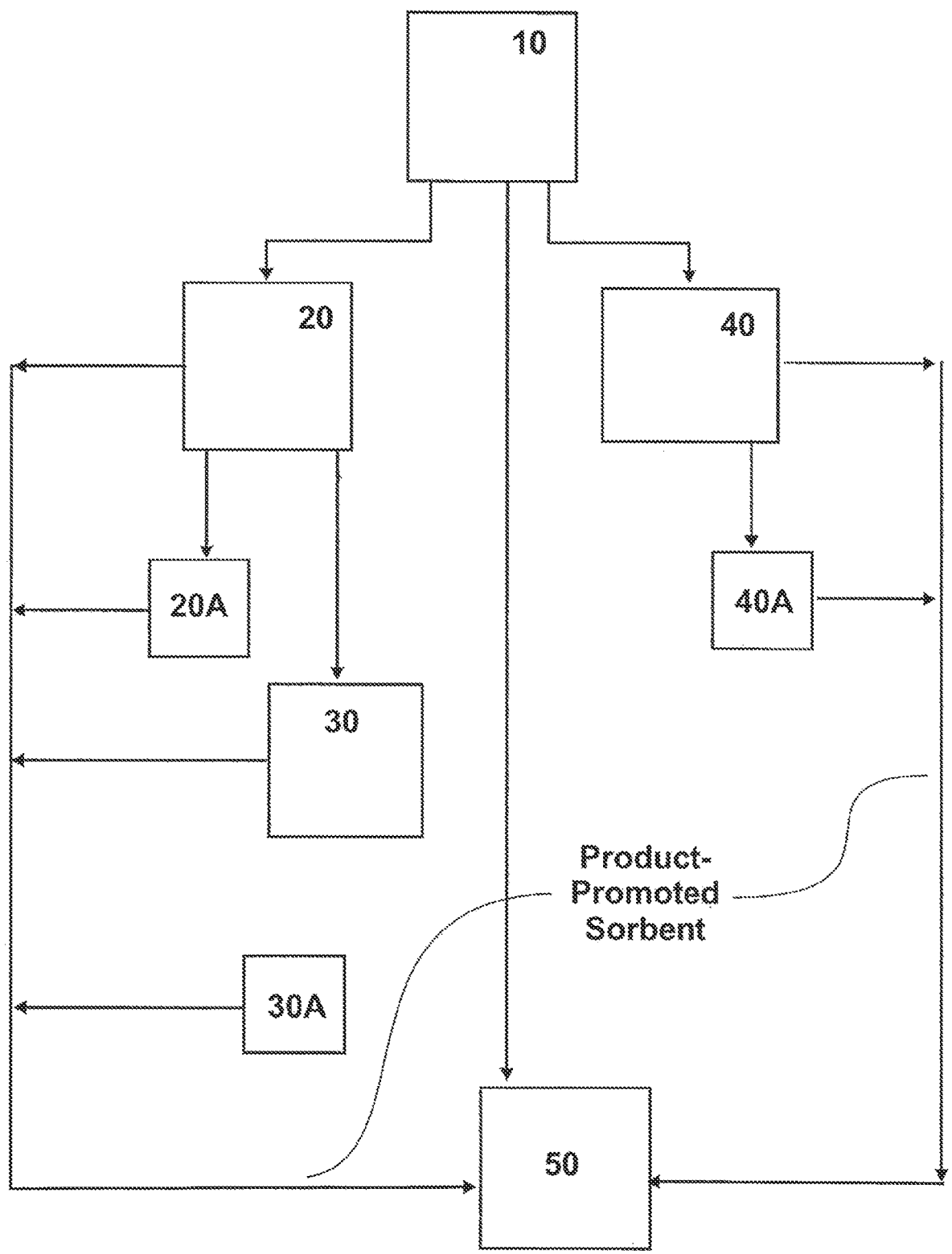
FIG. 1 schematically illustrates methods for preparation of promoted carbon sorbents in accordance with the present invention.

Referring now to FIG. 1, there is shown a block flow diagram illustrating some preferred embodiments of the process of the present invention to prepare promoted sorbents useful for mercury capture from flue gas and/or product gas form a gasification system streams. In a preferred embodiment illustrated by path 10-20, block 10 illustrates providing a base activated carbon, and adding a halogen or halide promoter that reacts with the carbon, illustrated at block 20, to produce a product promoted carbon sorbent. In embodiments where the halogen or halide is added, for example, as a vapor, no further steps may be necessary. In embodiments where the halogen or halide is added in, for example, a solvent, it may be desirable to employ solvent removal as illustrated by block 20A.

Referring still to FIG. 1, another preferred embodiment of the process of the present invention is illustrated by path 10-20-30, comprising providing a base activated carbon as shown by block 10, adding a halogen or halide promoter that reacts with the carbon, illustrated at block 20, and adding a secondary component illustrated at block 30 that reacts with the result of block 20 to produce a product promoted carbon sorbent. In embodiments where both the halogen or halide promoter and the secondary component are added, for example, as a vapor, no further steps may be necessary. In embodiments where the halogen or halide promoter and/or secondary component are added in, for example, a solvent, it may be desirable to employ solvent removal as illustrated by block 30A.

Referring still to FIG. 1, another preferred embodiment of the process of the present invention is illustrated by path 10-40, comprising providing a base activated carbon as illustrated at block 10, and adding a halogen or halide promoter and a secondary component to the activated carbon together, with which they react as illustrated by block 40, producing a product promoted carbon sorbent. As above, in embodiments where vapor additions are made to the activated carbon no further steps may be desired. In embodiments where one or more components are added in solvent, a solvent removal step may be provided as illustrated by block 40A.

Referring still to FIG. 1, also illustrated are preferred embodiments in which, as illustrated by block 50, a flue gas stream is treated with product promoted carbon sorbent prepared as described above.

In some preferred embodiments the activated carbon provided may preferably be any of several types, as understood by those skilled in the art. For example, the activated carbon may include powdered activated carbon, granular activated carbon, carbon black, carbon fiber, carbon honeycomb or plate structure, aerogel carbon film, pyrolysis char, regenerated activated carbon from product promoted carbon sorbent, or other types as known in the art.

In some preferred embodiments the activated carbon provided may preferably be any of several types, as understood by those skilled in the art. For example, the activated carbon may include powdered activated carbon, granular activated carbon, carbon black, carbon fiber, carbon honeycomb or plate structure, aerogel carbon film, pyrolysis char, an activated carbon or regenerated activated carbon with a mass mean particle size greater than fly ash in a flue gas stream to be treated.

In some preferred embodiments the activated carbon provided may preferably be any of several types, as understood by those skilled in the art. For example, the activated carbon may include powdered activated carbon, granular activated carbon, carbon black, carbon fiber, carbon honeycomb or plate structure, aerogel carbon film, pyrolysis char, an activated carbon or regenerated activated carbon with a mass mean particle diameter preferably greater than 40 micrometers, more preferably greater than 60 micrometers, or a particle size distribution greater than that of the fly ash or entrained ash in a flue gas stream to be treated, such that the activated carbon and ash can be separated by physical means.

In some preferred embodiments, the halogen or halide promoter that is added to, and reacts with, the base activated carbon may preferably comprise, by way of illustration and not limitation, a molecular halogen in vapor or gaseous form, a molecular halogen in an organic solvent, a Group V or Group VI halide, such as $PBr_3$ or $SCl_2$, respectively, in vapor, liquid, or solution form (though not in an aqueous solvent).

Embodiments are also provided in which the organic solvent may preferably comprise a chlorinated hydrocarbon, such as dichloromethane, a hydrocarbon solvent, including for example, petroleum ether, ligroin, pentane, hexane, toluene, and benzene, carbon disulfide, a waste solvent, an ether, a recycled solvent, a supercritical solvent, such as supercritical $CO_2$, water (though not in the case of a Group V or Group VI halide), and others as will be apparent to those of skill in the art.

Figure 2:
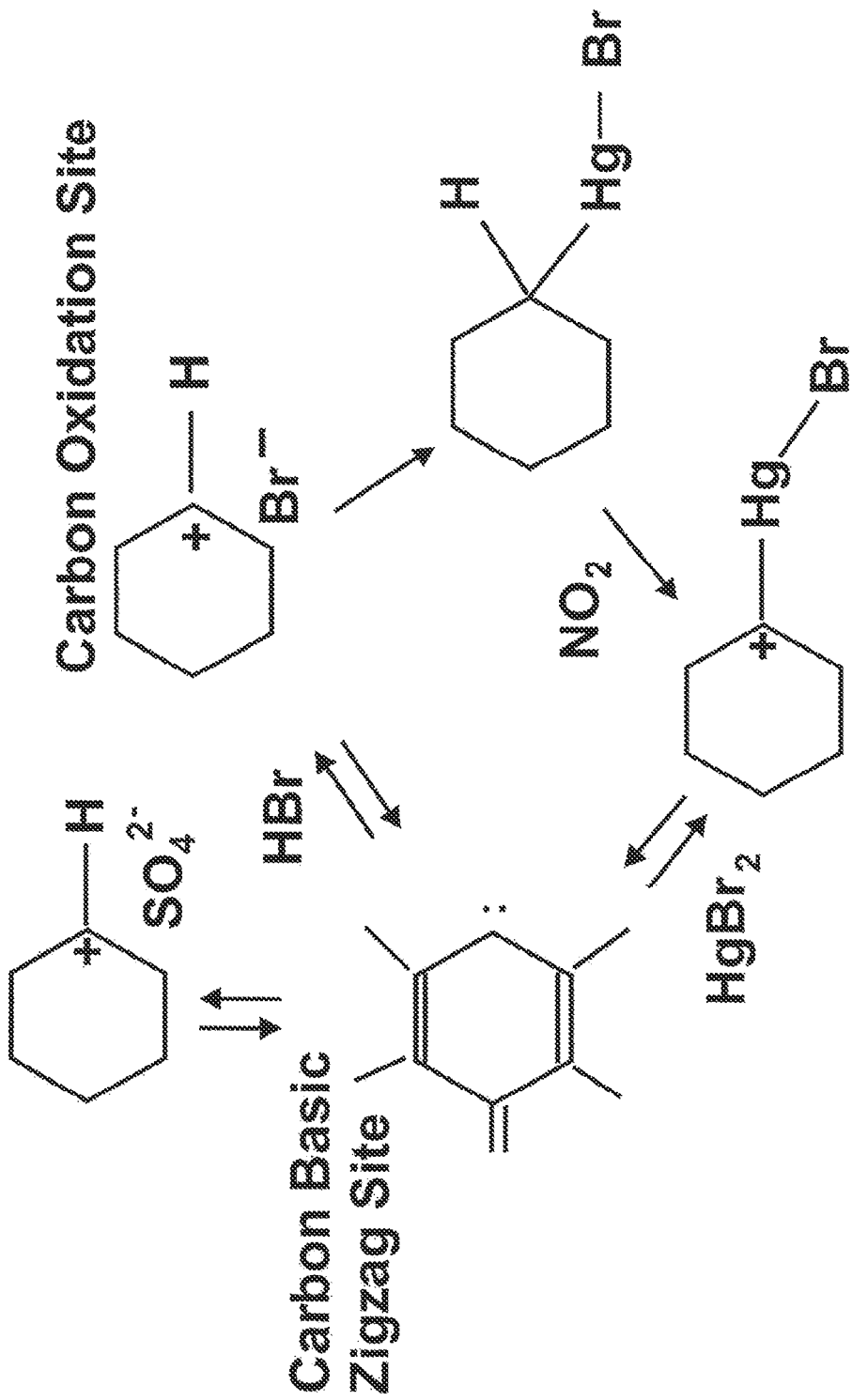
FIG. 2 illustrates a proposed mechanistic model of the chemical reactions resulting in the oxidation and capture of mercury.

Referring now to FIG. 2, there is illustrated a theory developed from scientific evidence to explain the nature of the promoting compounds. For example, as illustrated in FIG. 2, hydrogen bromide reacts with the unsaturated structure of the activated carbon. This may be, by way of illustration only, a carbene species on the edge of the graphene sheet structures of the carbon. Molecular bromine or a bromine compound reacts to form a similar structure, with a positive carbon that is active for oxidizing the mercury with subsequent capture by the sorbent.

It has now been found that the formation of the new bromide compound with carbon increases their reactivity toward mercury and other pollutants. Additionally, the resulting bromide compound is uniquely suited to facilitate oxidation of the mercury. The effectiveness of the oxidation apparently results from the promotion effect of the halide, exerted on the developing positive charge on the mercury during the oxidation, known in the chemical art as a specific catalytic effect. Thus, as the mercury electrons are drawn toward the positive carbon, the halide anion electrons are pushing in from the other side, stabilizing the positive charge developing on the mercury and lowering the energy requirement for the oxidation process. Bromide is especially reactive, owing to the highly polarizable electrons in the outer $4p$ orbitals of the ion. Thus, adding HBr or $Br_2$ to the carbon forms a similar carbon bromide, in which the positive carbon oxidizes the mercury with the assistance of the bromide ion.

Figure 3:
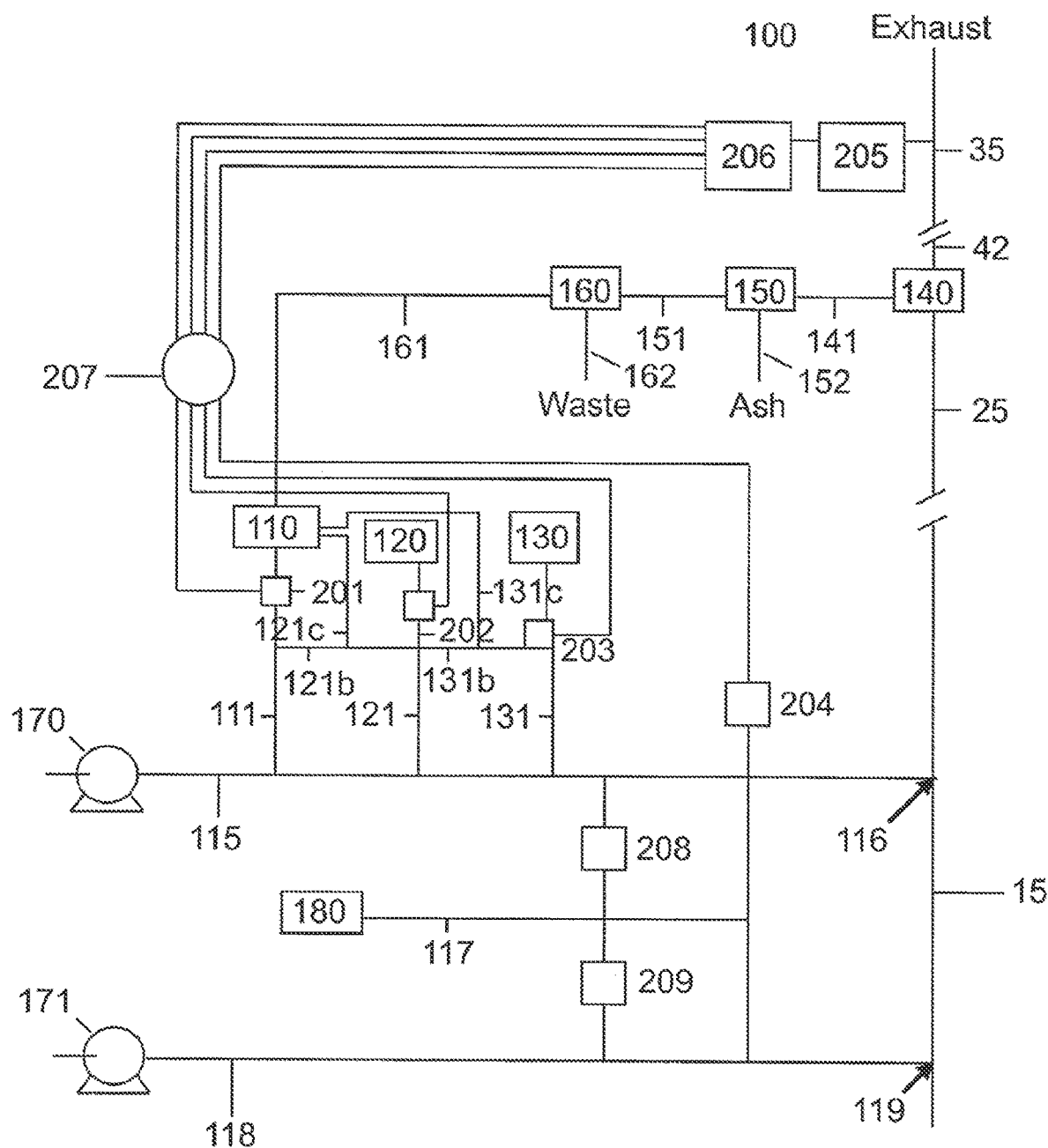
FIG. 3 schematically illustrates preparation of promoted carbon sorbents and processes for flue gas mercury reduction in flue gases and/or product gases from a gasification system in accordance with the present invention, including in-flight preparation of promoted carbon sorbent.

Referring now to FIG. 3, a schematic flow diagram is provided of mercury control system 100 comprising preparation of promoted carbon sorbents, and flue gas mercury reduction, in accordance with preferred embodiments of the present invention. There is provided base activated carbon reservoir 110, an optional halogen/halide promoter reservoir 120, an optional secondary component reservoir 130, and an optional alkali component reservoir 180, each of which with corresponding flow control device(s) 201, 202, 203, and 208/209, respectively. In conjunction with the optional alkali component reservoir 180, optional flow control devices 208 and 209 can be used independently, together, or not at all.

Reservoirs 110, 120, 130, and 180 connect through their respective flow control devices and via associated piping, to transport line 115. Optional alkali component reservoir 180 may also connect, through respective flow control devices and via associated piping, to transport line 118. A source of air, nitrogen, or other transport gas(es) is provided by gas source 170 to transport line 115 for the purpose of entraining materials discharged from reservoirs 110, 120, 130, and 180 and injecting such materials, via injection point 116, into contaminated flue gas stream 15. A source of air, nitrogen, or other transport gas(es) may be provided by gas source 171 to transport line 118 for the purpose of entraining materials discharged from reservoirs 180 and injecting such materials, via injection point 119, into flue gas stream 15. Gas sources 170 and 171 may be the same or different, as desired. Alternatively, transport gas(es) may be provided to both transport lines 115 and 118 by gas source 170 (connection from source 170 to line 118 not shown). Although gas sources 170 and 171 are shown in FIG. 3 as compressors or blowers, any source of transport energy known in the art may be acceptable, as will be appreciated by those of skill in the art.

For clarity, single injection points 116 or 119 are shown in FIG. 3, although one skilled in the art will understand that multiple injection points are within the scope of the present invention. Optical density measuring device(s) 204 is connected to transport line 115 and/or 118 to provide signals representative of the optical density inside transport line 115 and/or 118 as a function of time.

Downstream from injection point 116 and 119 is provided particulate separator 140. By way of illustration and not limitation, particulate separator 140 may comprise one or more fabric filters, one or more electrostatic precipitators (hereinafter "ESP"), or other particulate removal devices as are known in the art. It should be further noted that more than one particulate separator 140 may exist, sequentially or in parallel, and that injection point 116 and 119 may be at a location upstream and/or downstream of 140 when parallel, sequential, or combinations thereof exist. Particulate separator 140 produces at least a predominantly gaseous ("clean") stream 142, and a stream 141 comprising separated solid materials. A sorbent/ash separator 150 separates stream 141 into a largely ash stream 152, and a largely sorbent stream 151. Stream 151 may then preferably be passed to an optional sorbent regenerator 160, which yields a regenerated sorbent stream 161 and a waste stream 162.

An optional Continuous Emission Monitor (hereinafter "CEM") 205 for mercury is provided in exhaust gas stream 35, to provide electrical signals representative of the mercury concentration in exhaust stream 35 as a function of time. The optional mercury CEM 205 and flow controllers 201, 202, 203, 208, and 209 are electrically connected via optional lines 207 (or wirelessly) to an optional digital computer (or controller) 206, which receives and processes signals and preferably controls the preparation and injection of promoted carbon sorbent into contaminated flue gas stream 15.

In operation, promoted carbon sorbent and/or an optional alkali component is injected into contaminated flue gas stream 15. After contacting the injected material with the contaminated flue gas stream 15, the injected material reduces the mercury concentration, transforming contaminated flue gas into reduced mercury flue gas, 25. The injected material is removed from the flue gas 25, by separator 140, disposed of or further separated by optional separator 150, and disposed of or regenerated by an optional regenerator 160, respectively. The reduced mercury "clean" flue gas stream 142 is then monitored for mercury content by an optional CEM 205, which provides corresponding signals to an optional computer/controller 206. Logic and optimization signals from 206 then adjust flow controllers 201, 202, 203, 208, 209 to maintain the mercury concentration in exhaust stream 35 within desired limits, according to control algorithms well known in the art. Flow controllers 201, 202, 203, 208, 209 can also be adjusted manually or be some other automated means to maintain the mercury concentration in exhaust stream 35 within desired limits, according to control algorithms well known in the art.

Referring still to FIG. 3, there are illustrated several preferred embodiments for preparation and injection of promoted carbon sorbents and/or alkali components in accordance with the present invention. Stream 111 provides for introduction of base activated carbon from reservoir 110, as metered by flow controller 201 manually or under the direction of computer 206. The halogen/halide may be combined and react with the base activated carbon according to any of several provided methods. The halogen/halide may preferably be combined via line 121 directly into transport line 115, within which it contacts and reacts with the base activated carbon prior to injection point 116. This option is one form of what is referred to herein as "in-flight" preparation of a promoted carbon sorbent in accordance with the invention. Further, the halogen/halide may be combined via line 121b with base activated carbon prior to entering transport line 115. Still further, the halogen/halide may be contacted and react with the base activated carbon by introduction via line 121c into reservoir 110. This option is preferably employed when, for example, reservoir 110 comprises an ebullated or fluidized bed of base activated carbon, through which halogen/halide flows in gaseous form or as a vapor. Of course, the halogen/halide may also preferably be contacted with the base activated carbon in liquid form or in a solvent, as discussed previously, and solvent removal (not shown in FIG. 3) may then be provided if necessary as mentioned with respect to embodiments discussed with reference to FIG. 1.

Similarly, the optional secondary component may be contacted and react directly in transport line 115 via line 131, or optionally as described above with respect to the halogen/halide, via lines 131b and 131c.

Similarly, the optional alkali component from 180 may either be added in transport line 115 directly, or may be injected separately by transport line 118, combining downstream in flue gas 15 for synergistic effects with base activated carbon, promoted carbon, or optional secondary components. Being able to vary onsite the amount of the optional alkali component relative to base activated carbon, promoted carbon, or optional secondary components is a key feature to overcome and optimize for site-specific operating and flue gas conditions.

In some preferred embodiments wherein contacting between components and reaction is performed in a liquid or solvent phase, stirring of such liquid and/or slurry mixtures may be provided. In other embodiments, the halogen/halide promoter and optional secondary component(s) may preferably be sprayed in solution form into or on the base activated carbon. In some such embodiments, drying, filtering, centrifugation, settling, decantation, or other solvent removal methods as are known in the art may then be provided.

In embodiments wherein the halogen/halide promoter is in gaseous or vapor form, it may be diluted in air, nitrogen, or other gas as appropriate. The halide/halogen gas, for example, gaseous HBr or $Br_2$, may be passed through an ebullated or fluidized bed of granular or fibrous activated carbon, with the promoted carbon sorbent so produced removed from the top of the bed via gas entrainment for injection.

In some embodiments, the secondary component(s) may preferably comprise iodine or other halogens, hydrohalides, including without limitation HI, HBr, HCl, a Group V or Group VI element with a molecular halogen, such as $SCl_2$ and others. In some preferred embodiments, the promoted carbon sorbent may comprise from about 1 to about 30 g halogen/halide per 100 g base activated carbon. In some preferred embodiments, the promoted carbon sorbent may comprise an secondary component in concentration of from about 1 to about 15 wt-% of the concentration of the halogen/halide component.

In still other embodiments, the product promoted carbon sorbent may be applied to a substrate. In other embodiments, such prepared substrate(s) may be caused to contact a contaminated flue gas or gasification system product gas stream for mercury reduction purposes. Such substrates may be monolithic, rotating, or exposed to the gas stream in any number of ways known to those skilled in the art.

In some embodiments, a method is provided whereby a mercury stabilizing reagent is added to a promoted carbon sorbent to produce a bifunctional sorbent. Such stabilizing reagent(s) may be sequentially added, either before or after the addition and reaction of the halogen/halide. In some preferred embodiments, the halogen/halide preferably comprises Br or HBr, and the mercury-stabilizing reagent may comprise S, Se, $H_2S$, $SO_2$, $H_2Se$, $SeO_2$, $CS_2$, $P_2S_5$, and combinations thereof.

Halogens in Mercury Capture

Methodologies for using halogens for the treatment of flue gas have been problematic, owing to their reactivity with other gases and metals, resulting in corrosion and health issues. A "halogen" is defined as a member of the very active elements comprising Group VIIA (CAS nomenclature is used throughout; Group VIIA (CAS) corresponds to Group VIIB (IUPAC)) of the periodic table. In the molecular elemental form of the halogens, including $F_2$, $Cl_2$, $Br_2$, and $I_2$, the reaction with a hot flue gas components leave little to react with elemental mercury. The atomic elemental halogen form, which includes the fluorine, chlorine, bromine, and iodine atoms, is about a million times more reactive to mercury but the concentration of the atomic forms is typically extremely low. In a large portion of electric utility coal combustion facilities, the concentrations are generally not sufficient to oxidize a significant amount of mercury.

The term "halide" as used herein is defined as a compound formed from the reaction of a halogen with another element or radical. In general, halide compounds are much less reactive than the molecular halogens, having a low chemical potential. Halides are considered reduced forms that do not, alone, oxidize other compounds. In the conventional view therefore, a halide-salt-treated activated carbon will not effectively oxidize elemental mercury and capture elemental mercury.

Halogen Promoted Sorbent Characteristics

The sorbent described here has a very high initial reactivity for oxidizing mercury and therefore can be used in very small amounts to achieve very high capture efficiencies, thus lowering operation costs and lessening waste disposal problems. In addition, further disposal reductions are obtainable by regenerating and reusing the sorbents produced using the inventive technology. The time interval required for the mercury and the promoted carbon sorbents of the present invention to successfully interact in a flue gas duct, with the subsequent collection of the mercury on the sorbent and ash is very short-less than seconds. Clearly, such collection times require the sorbent to have both high capacity and high reactivity toward mercury. The promoted carbon sorbent can be utilized in a very finely powdered form to minimize mass transfer limitations. However, again, the reactivity should be very high to capture all of the mercury encountered by the fine particles. Additionally, use of these enhancement technologies allows capture to be effective for larger sorbent particles which also allows separation of the sorbent from the ash to enable subsequent regeneration as well as ash utilization. One feature of this invention is the process to prepare a sorbent containing a halide compound formed on the carbon structure that provides a sorbent that is highly active on initial contact with the mercury contaminated gas stream, which allows for very effective capture of the mercury.

It appears that the inventive sorbents chemically combine molecular bromine, for example, from solution, with activated carbon (edge sites). X-ray photoelectron spectroscopy has established that the addition of bromine, chlorine, HBr, or HCl formed a chemical compound in the carbon structure. Thus, the sorbent produced from halogen and activated carbon does not represent a molecular halogen form, but rather a new chemically modified carbon (or halocarbon) structure. This phenomenon may not occur with the less reactive iodine, where an $I_2$ molecular complex can exist on the carbon basal plane. In the case of bromine, modified cationic carbon has a high chemical potential for oxidation of mercury. Thus, an entirely new model is presented for the reactivity of the bromine-treated carbon with mercury. The reactive carbon form can preferably be generated by the addition of bromine, hydrogen bromide, or combinations of bromine and other elements, as described herein. Halogen treatment resulted in higher-activity carbons because the halide anions (especially bromide and iodide) were effective in promoting the oxidation by stabilizing the developing positive charge on the mercury in the transition state for oxidation. Based on this model, several innovative, inexpensive, activity-enhancing features have been developed.

Optional Second Component

It has been demonstrated that addition of an optional second component, in addition to the bromine, results in improved reactivity and capacity for the sorbent, typically exceeding that of both the untreated carbon and the brominated carbon. The second compound comprises either a second halogen or a compound derived from a second halogen, such as HI. Thus, in addition to having a reactive carbon form present, the second component generates a Lewis base with greater ability to stabilize the developing positive charge on the mercury. Thus, the second component is an element with more polarized electrons ($4p$ and $5p$).

Optional Alkali Component

It has been demonstrated that addition of an optional alkali component with a base or promoted activated carbon results in improved mercury capture, typically exceeding that of both the untreated carbon and the promoted carbon. Test data indicate that flue gas contaminants, flue gas constituents ($SO_2$, $NO_x$, HCl, etc), operating temperature, mercury form, and mercury concentration may impact the effectiveness of the alkali addition. This suggests the need to be able to adjust and tailor the alkali-to-activated-carbon ratio onsite in order to overcome and optimize for a given set of site conditions.

The synergy that can be gained when co-injecting the two materials can be explained as follows. First, testing shows that binding sites on activated carbon (hereinafter "AC") can be consumed by chlorine species, sulfur species (i.e. sulfates), and other flue gas contaminants (arsenates, selenates, etc). The addition of optional alkali material will interact and react with these species/contaminants thus minimizing their consumption of AC mercury binding sites. Second, testing also shows that standard AC will continue to oxidize mercury, even though the binding sites are fully consumed. This oxidized mercury can then react with alkali material and subsequently be captured by particulate control devices. Consequently, the addition of the optional alkali component acts to protect mercury binding sites and capture oxidized mercury, thereby resulting in improved mercury reduction at lower cost. Alkali is generally much lower in cost (~an order of magnitude less) than activated carbon, thus more of it can be used still resulting in overall lower costs.

"In-Flight" Sorbent Preparation

Furthermore, we have demonstrated that the halogen promoted carbon sorbent can be readily produced "in-flight". This is accomplished by, for example, contacting the vapors of any combination of halogens and optionally a second component, in-flight, with very fine carbon particles. The particles may be dispersed in a stream of transport air (or other gas), which also conveys the halogen/halide promoted carbon sorbent particles to the flue gas duct, or other contaminated gas stream, from which mercury is to then be removed. There is no particular temperature requirement for this contact. This technology is obviously very simple to implement, and results in a great cost savings to facilities using this technology for mercury capture.

Advantages of On-Site Preparation

In-flight preparation of the halogen/halide promoted carbon sorbent on location produces certain advantages. For example, the treatment system can be combined with the carbon injection system at the end-use site. With this technique, the halogen/halide is introduced to the carbon-air (or other gas) mixture in a transport line (or other part of the sorbent storage and injection system). This provides the following benefits over current conventional concepts for treating sorbents off-site:

Capital equipment costs at a treatment facility are eliminated.
  Costs to operate the treatment facility are eliminated
  There are no costs for transporting carbon and additive to a treatment facility.
  The inventive process uses existing hardware and operation procedures.
  The inventive technology ensures that the sorbent is always fresh, and thus, more reactive.
  No new handling concerns are introduced.
  There are no costs for removing carbon from treatment system
  The inventive process allows rapid on-site tailoring of additive-sorbent ratios in order to match the requirements of flue gas changes, such as may be needed when changing fuels or reducing loads, thus further optimizing the economics.
  The inventive technology reduces the amount of spent sorbents that are disposed.

With the foregoing and other features in view, there is provided, in accordance with the present invention, embodiments including a process for preparing and regenerating halogen/halide promoted carbon sorbents, whose activity for mercury capture is enhanced by the addition of halogen (e.g. bromine) to the carbon structure.

Sorbent Injection Location

Some of the preferred embodiments contemplate the use of a halogen promoted sorbent in a powdered form that has been injected into a flue gas stream before or after ash particulates have been removed. Other embodiments of the inventive composition of the halogen promoted carbon sorbent comprise a powdered modified activated carbon prepared by adding $Br_2$ or HBr plus a second optional component. Other embodiments allow the addition of the optional alkali component in conjunction with a base activated carbon and/or with the use of a halogen based sorbent and any other combinations of the sorbent technologies provided in this patent. Alternatively, embodiments include methods wherein the sorbent is on a moving contactor consisting of particles or fibers containing one or more of the compositions listed above.

Sorbent Regeneration

Any of the above embodiments of the halogen/halide promoted carbon sorbent can be easily regenerated; the poisoning contaminants from the flue gas are preferably removed and an inexpensive promoting agent added, to restore mercury sorption activity. This process of promoting the activity of the carbon itself contrasts with the earlier, more expensive, conventional methods of adding a reagent (such as peroxide, gold, triiodide, etc.) to a sorbent. The halogen/halide promoted carbon sorbent of the present invention, treated with bromine and/or optional components, is noncorrosive. Detailed examples of sorbent regeneration techniques are described in co-pending, commonly owned PCT patent application No PCT/US04/12828, titled "PROCESS FOR REGENERATING A SPENT SORBENT", which is hereby incorporated by reference in its entirety.

Sorbent Injection Control Schemes

Another advantage of the present invention relates to the use of a feedback system to more efficiently utilize certain aspects of the invention. Where possible and desirable, the mercury control technology of the present invention may preferably utilize continuous measurement of mercury emissions as feedback to assist in control of the sorbent injection rate. Tighter control on the sorbent and optional component(s) levels can be achieved in this way, which will ensure mercury removal requirements are met with minimal material requirements, thus minimizing the associated costs. In an embodiment, the mercury emissions are continuously measured downstream of the injection location, preferably in the exhaust gas at the stack.

Promoted Carbon Sorbents

Reactions of halogens and acidic species with the basic binding sites on the activated carbon sorbent create sites for oxidizing mercury. Other metal ions, such as boron, tin, arsenic, gallium, Sb, Pb, Bi, Cd, Ag, Cu, Zn, or other contaminants, will also react with the oxidation sites generated on the carbon.

According to our model, adding the bromine from the bromine reagent or a proton from a hydrogen halide acid to a basic carbene site on the carbon edge structure forms a carbocation that accepts electrons from the neutral mercury atom forming the oxidized mercury species that is bound to the sorbent surface. The reactive site may also generate reactive bromine radicals or carbon radicals at the active sites on the carbon. Thus, the activated carbon serves to stabilize the bromine, yet provides a highly reactive bromine-containing reagent that can oxidize the mercury and promote its capture on the activated carbon. The sorbent that contains bromine is expected to be more reactive than the corresponding sorbent containing chlorine and much less expensive than the sorbent containing iodine.

EXAMPLES

To more clearly illustrate the present invention, several examples are presented below. These examples are intended to be illustrative and no limitations to the present invention should be drawn or inferred from the examples presented herein.

Example 1

Preparation and Testing of Halogenated Carbon (& Comparative Example) Gas Phase Halogenation Finely powdered activated carbon (such as NORIT Darco FGD. NORIT Americas, Inc., Marshall. Tex. (USA), although others are suitable, as will be recognized by those skilled in the art), was placed in a rotating plastic barrel with side blades (a 5 ft$^3$ (0.14 m$^3$) cement mixer) fitted with a tight plastic lid to prevent loss of the fine powder during the preparation. In a separate vessel, gas phase bromine was generated by passing a nitrogen stream over a weighed amount of liquid bromine that is warmed to about 40°-50° C. The vapor pressure of the bromine was such that a dark red gas is generated and passed out of the generator. The outlet from the gaseous bromine generator is connected via a ¼ inch (0.64 cm) plastic hose to a stationary metal tube inserted through a flange in the center of the plastic lid and passing into the center of the barrel. The flange is not air tight so that the excess of nitrogen is released after the bromine is transferred to the tumbling carbon. Thus, the bromine gas stream continuously passed into the rotating barrel where it contacted the tumbling carbon. The unit is then operated until the desired amount of bromine has combined with the carbon. Typically, this is 0.4 to 1 kg of bromine to 20 kg of carbon (2-5 wt %). When the reaction is completed, the carbon is weighed. The treated carbon is odorless and does not cause skin irritation since the bromine has completely reacted with the carbon to produce the brominated carbon.

XPS spectra demonstrate that the brominated carbon contains both covalent carbon-bound (organic) bromide as well as anionic bromide. The product contains the same moisture originally present in the activated carbon (5-17 wt %), but does not require further drying for use. The moisture is driven out at higher temperatures (>150° C.), and the bromine was not released until very high temperatures Bench-Scale Testing of Mercury Oxidation and Capture Efficiency A bench-scale apparatus and procedure based on the above description was used to test the initial activities and capacities of several promoted activated carbon sorbents using powdered carbon, including bromine-containing activated carbons prepared from a variety of carbons, including commercially available sorbents, aerogel film sorbents, and the original precursor carbons for comparison.

A detailed description of the apparatus and its operation is provided in Dunham, G. E.; Miller. S. J. Chang, R.; Bergman, P. *Environmental Progress* 1998, 17, 203, which is incorporated herein by reference in its entirety. The bench scale mercury sorbent tests in the flue gas compositions were performed with finely (−400 mesh) powdered sorbents (37 mg) mixed with 113 mg sand and loaded on a quartz filter (2.5 inch (6.35 cm)). The loaded filter and holder were heated in an oven (125° C.) in the simulated flue gas stream (30 SCFH (standard cubic feet/hr) or 0.79 NCMH (normal cubic meters per hour)) containing the following: $O_2$ (6%), $CO_2$ (12%), $SO_2$ (600 ppm), NO (120 ppm) $NO_2$ (6 ppm), HCl (1 ppm), $Hg^0$ (11 µg/m$^3$), $H_2O$ (15%), and $N_2$ (balance). Elemental mercury was provided by a standard permeation tube source placed in a double jacketed glass condenser, and heated to the desired temperature. Mercury concentrations in the gas streams were determined with a continuous mercury emission monitor (Sir Galahad mercury CEM mfr. P.S. Analytical Deerfield Beach Fla. USA), and a $SnCl_2$ cell was used to convert oxidized species to elemental, so that both elemental and oxidized mercury concentration data could be obtained for both the influent and the effluent concentrations from the sorbent bed. Mercury concentrations were calibrated for the flow rates used. Spent sorbents were analyzed for mercury to determine the mass balance.

Figure 4:
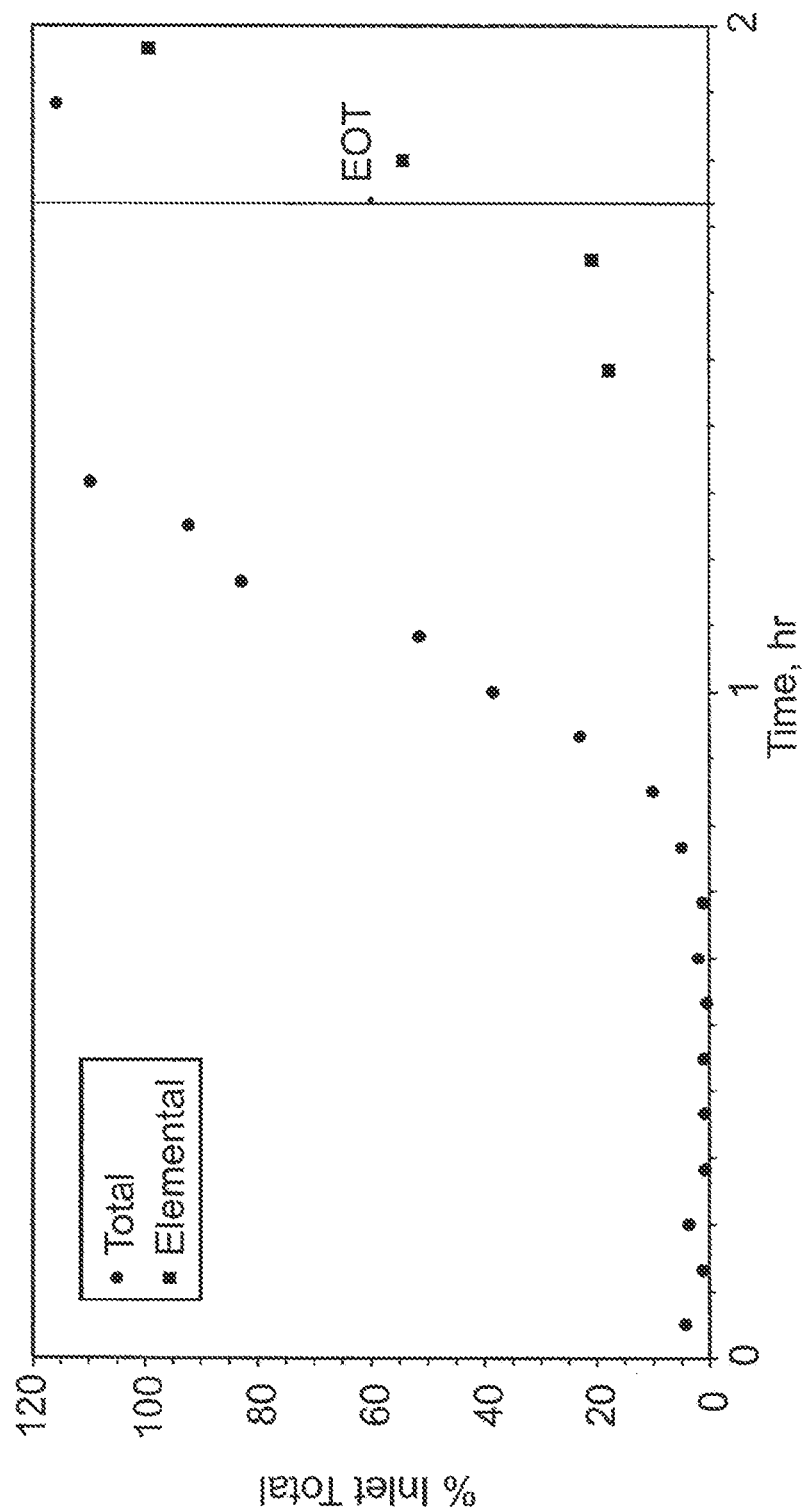
FIG. 4 is a diagram illustrating breakthrough curves for 5 wt/wt % brominated NORIT Darco FGD sorbent (37 mg+113 mg sand) in low-HCl (1 ppm) synthetic flue gas.

Referring now to FIG. 4, the effluent mercury concentration data are plotted as a percent of the influent mercury versus time. The resulting curve (breakthrough curve) for the halogenated sorbents typically showed 0%-1% Hg in the effluent (99+% capture) at the beginning, and increasing only after 30-60 minutes (breakthrough point), depending on the sorbent FIG. 4 illustrates the breakthrough curves for 5 wt/wt % brominated NORIT Darco FGD sorbent (37 mg+113 mg sand) with synthetic flue gas containing 1 ppm HCl. Total Hg (solid circles) and elemental Hg (solid squares) in the effluent are presented as a percent of the inlet Hg "EOT" indicates the end of test (the later data points shown are for calibration checks).

Figure 5:
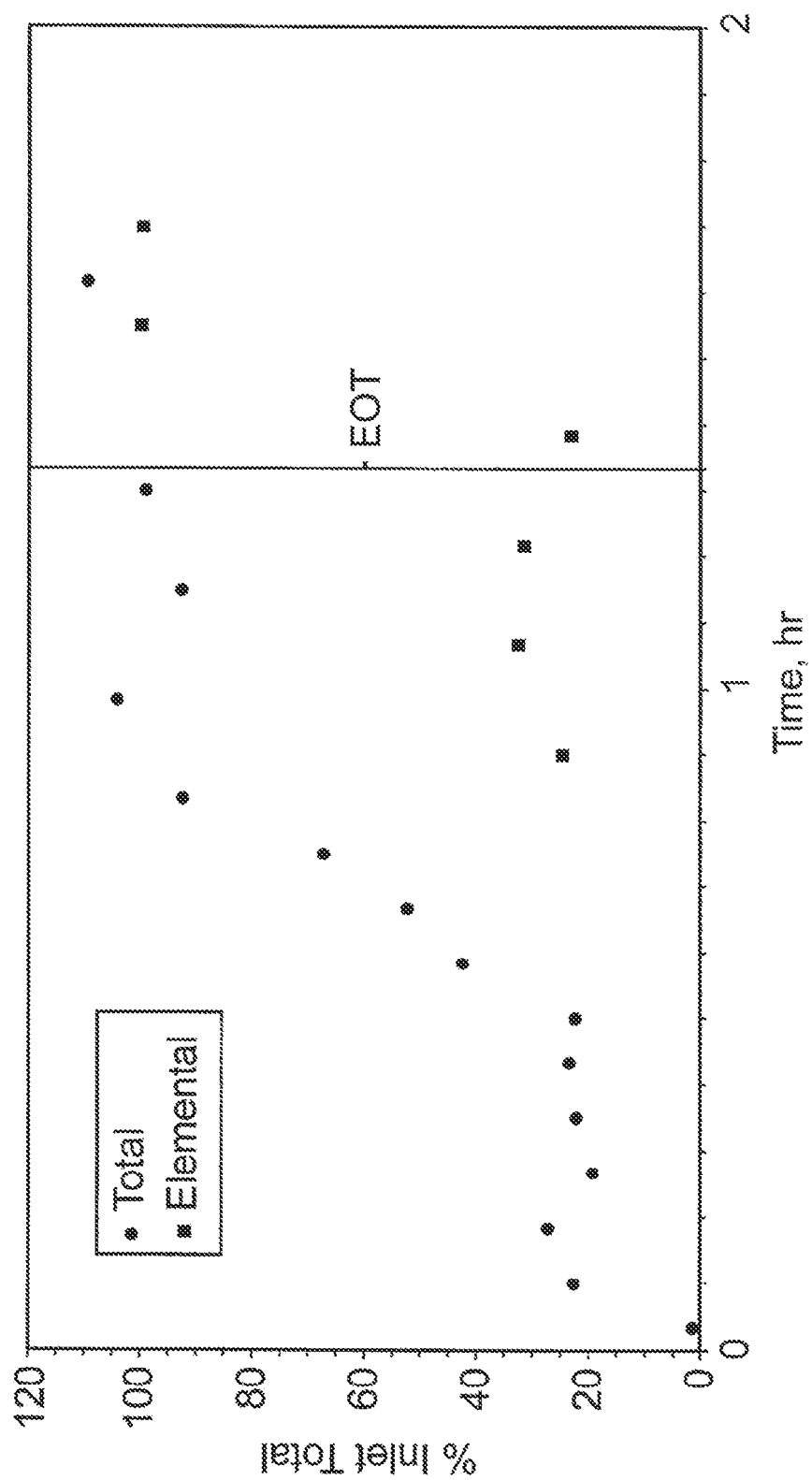
FIG. 5 is a diagram illustrating breakthrough curves for non-halogenated NORIT Darco FGD sorbent (37 mg+113 mg sand) in low-HCl (1 ppm) synthetic flue gas.

FIG. 5 presents the comparative breakthrough curves for the corresponding nonhalogenated sorbents typically initiated at 5%-50% of inlet mercury, depending on the HCl concentration in the synthetic flue gas, thus indicating considerably lower reactivity for oxidation and capture of the mercury for the nonhalogenated sorbents. After breakthrough of either halogenated or nonhalogenated sorbent, most of the mercury in the effluent was oxidized mercury.

Example 2

Gas Phase Halogenation of Fluidized Carbon

A bed of activated carbon supported in a vertical tube by a plug of glass wool was fluidized by a nitrogen stream. The top of the fluidized bed tube was connected to a catching trap for carbon fines that blow out the top of the tube. The bromine gas generator as described in Example 1 was attached to the fluidized carbon bed and the desired amount of gaseous bromine was passed into the bed. The contents of the trap were then mixed with the material in the bed and weighed. The resulting brominated carbon exhibited properties similar to the brominated carbon of Example 1.

Example 3

Liquid Phase (Water) Halogenation

A 5% solution of bromine in water was prepared by carefully adding 50 g of bromine to 1 liter of cold water. One kg of activated carbon was added to the bromine solution in a large metal can. The resulting slurry was stirred with a large paddle during the addition and for a short time afterwards until all the bromine had reacted with the carbon, as indicated by the disappearance of the red color. The slurry was then filtered using a Buchner funnel under vacuum. The moist carbon that was collected on the filter was dried in an oven at 110° C. for several hours to constant weight. As in Example 1, some moisture remains in the carbon, however. The dried carbon was then tumbled in the rotating barrel with metal pieces to break up and fluff the carbon.

Example 4

Addition of the Optional Second Halide Component

Brominated carbon was produced by solution phase bromination similar to that described with reference to Example 3. However, before filtration, a solution of hydriodic acid (HI) was added to the slurry in an amount equal to 10% of the bromine amount. The slurry was stirred to complete the reaction and then filtered and dried as described in Example 3.

Example 5

Liquid Phase Phosphohalogenation

A solution of phosphorus tribromide (500 g) in ligroin (10 liters) was stirred in a large metal can and 10 kg of activated carbon was added. The resulting slurry was stirred with a large paddle at ambient temperature to complete the reaction. The slurry was filtered under vacuum on a large Buchner funnel in several batches. The wet filter cake was dried at 110° C. in an oven to constant weight. The dried product was fluffed in the rotating barrel as described in Example 3.

Example 6

Preparation and Sorption on Larger-Particle Carbon

Tests were conducted on a pilot-scale combustor while firing a subbituminous coal, to evaluate mercury control by injecting larger-than-normal sized treated activated carbon. Standard AC sorbents generally are of fine size with a mean particle diameter of less than 20 micrometers, which is also typical of the flyash that is generated from pulverized coal combustion. Consequently, because the sizes of standard AC and flyash are similar, separation of the two is difficult. Injection of larger sized AC is generally not considered because the sorbent effectiveness decreases with size. In a scheme to recycle the injected carbon, the carbon is separated from the flyash. A separation based on size fractionation requires a treated larger particle sorbent. To test this concept, a treated larger sized (>60 μm) sorbent was developed, prepared, and tested.

Treatment—Gas Phase Halogenation

Granular activated carbon (Calgon F400) was ground and sieved through conventional mesh screens. The mesh size fraction −170 to +240 (corresponding to about 60 to about 88 micrometers) was collected and placed in a rotating vessel as described in Example 1 above. In a separate vessel, gas phase bromine was generated by passing a nitrogen stream over a weighed amount of liquid bromine that was warmed to about 40°-50° C., and the outlet from this gaseous bromine generator was connected via a ¼ inch (6.35 mm) plastic hose to a stationary metal tube inserted through a flange in the center of the lid and passing into the center of the rotating vessel, also as described in Example 1. The unit was operated until the desired amount of bromine had combined with the carbon, in this case 0.05 kg of bromine to 1 kg of carbon (5 wt %). When the reaction was completed, the carbon was weighed. The treated carbon was odorless as has been described above.

PTC Apparatus

The pilot-scale combustor, known as the "Particulate Test Combustor" (hereinafter "PTC"), is a 550,000-Btu/hr (about 161 kW) pulverized coal ("PC")-fired unit, designed to generate combustion flue gas properties and fly ash that are representative of those produced in a full-scale utility boiler. The combustor is oriented vertically to minimize wall deposits. A refractory lining helps to ensure adequate flame temperature for complete combustion and prevents rapid quenching of the coalescing or condensing fly ash. Based on the superficial gas velocity, the mean residence time of a particle in the combustor is approximately 3 seconds. The coal nozzle of the PTC fires axially upward from the bottom of the combustor, and secondary air is introduced concentrically to the primary air with turbulent mixing. Coal is introduced to the primary air stream via a screw feeder and eductor. An electric air preheater is used for precise control of the combustion air temperature. Originally, the PTC used cold-water annular heat exchangers to provide flue gas temperature control to the baghouse (also referred to as a "fabric filter") or electrostatic precipitator (ESP). However, analysis of ash deposits collected from the heat exchangers indicated that some mercury was collected on the duct walls. To minimize this effect, the heat exchangers were modified to provide for higher duct wall temperatures.

The PTC instrumentation permits system temperatures, pressures, flow rates, flue gas constituent concentrations, and particulate control device (baghouse, Advanced Hybrid Particle Collector/AHPC™, and/or electrostatic precipitator/ESP) operating data to be monitored continuously and recorded on a data logger.

PTC Procedure

Flue gas samples were taken at combinations of two of the three available system sample points: the furnace exit, the particulate control device inlet, and the particulate control device outlet. After passing through sample conditioners to remove moisture, the flue gas was typically analyzed for $O_2$, CO, $CO_2$, $SO_2$, and $NO_x$. Each constituent was normally analyzed at both the furnace exit and the outlet of the particulate control device simultaneously, using two analyzers. The concentration values from all of the instruments were recorded continuously. In addition, data were manually recorded at set time intervals. $NO_x$ was determined using a pair of Rosemount Analytical $NO_x$ chemiluminescent analyzers. $SO_2$ was measured using a pair of Ametek Instruments photometric gas analyzers. The remaining gases were measured by a pair of Rosemount Analytical multi-gas continuous emissions monitors. Each of these analyzers was regularly calibrated and maintained to provide accurate flue gas concentration measurements.

The baghouse vessel was a 20 inch (50.8 cm) (ID) chamber that is heat-traced and insulated, with the flue gas introduced near the bottom. The combustor produced about 200 ACFM (actual cubic feet per minute; about 5.7 actual $m^3$/min) of flue gas at 300° F. (about 150° C.), therefore three 13-ft by 5-inch (3.96 m by 12.7 cm) bags provided an air-to-cloth ratio of 4 ft/min (1.22 m/min). Each bag was cleaned separately in operation with its own diaphragm pulse valve. In order to quantify differences in pressure drop for different test conditions, the bags were cleaned on a time basis, rather than with the cleaning cycle initiated by pressure drop. Once bag cleaning was initiated, all three bags were pulsed in rapid succession on-line.

Tests were also conducted with a single-wire, tubular ESP replacing the fabric filter. The ESP unit was designed to provide a specific collection area of 125 at 300° F. (150° C.). Since the flue gas flow rate for the PTC is 130 SCFM (standard cubic feet per minute; about 3.7 NCMM (normal $m^3$/min)), the gas velocity through the ESP is 5 ft/min (about 1.52 m/min). The plate spacing for the ESP unit is 11 in (27.9 cm). The ESP was designed to facilitate thorough cleaning between tests so that all tests can begin on the same basis.

PTC Results

Figure 6:
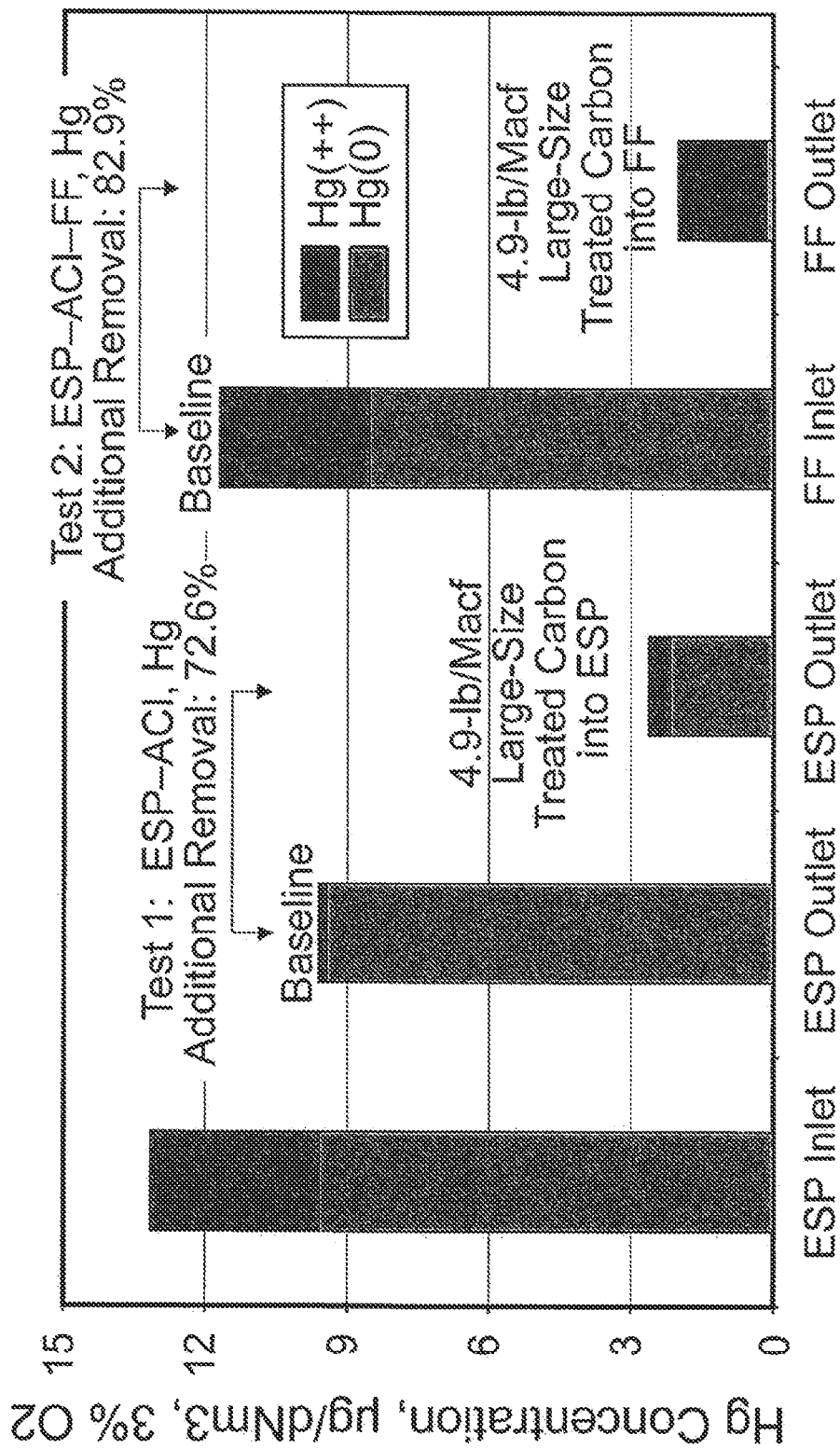
FIG. 6 is a bar chart illustrating pilot-scale mercury removal results, including large-size sorbent results.

Results are illustrated in FIG. 6. As can be observed in FIG. 6, even though the tested sorbent particle size is significantly larger than normal sorbent particles, the treated larger-than-normal sized (that is, >60 micrometers) activated carbon sorbent was quite effective at capturing mercury. Approximately 75% of the mercury was captured when the larger-sized treated AC was injected ahead of the pilot-scale ESP, while approximately 85% of the mercury was captured when injected ahead of the pilot-scale fabric filter ("FF"). Note that in FIG. 6 (and throughout) "Macf" (and "MACF") indicates million actual cubic feet (1 MACF is about 0.028 million actual cubic meters or "MACM").

Figure 7:
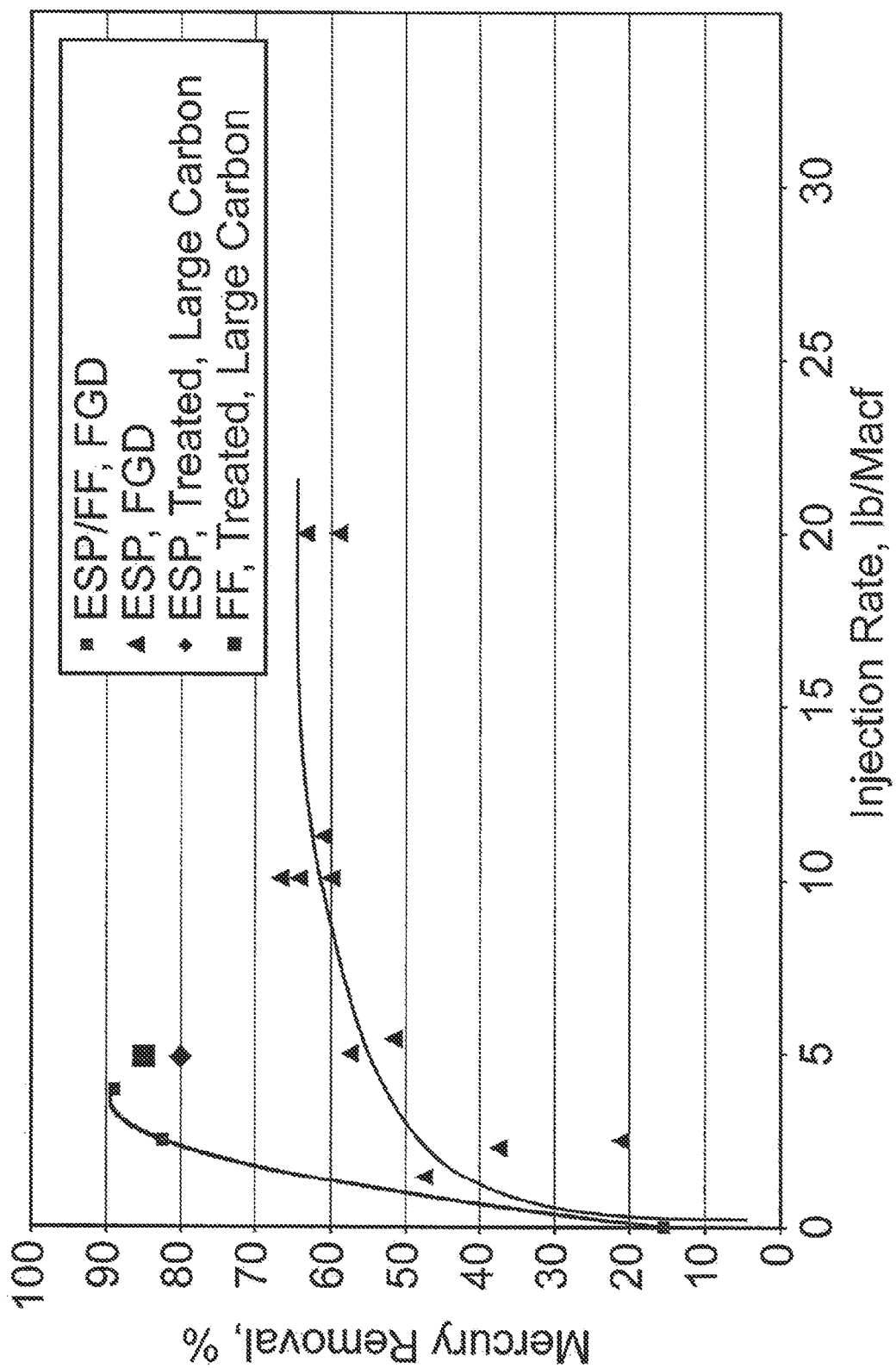
FIG. 7 is a diagram illustrating the effects of sorbent size and injection rate on mercury removal for ESPs and fabric filters.

Referring now to FIG. 7, it can be observed that the larger-sized treated AC when injected ahead of the pilot-scale ESP (diamond symbol(s)) performed better than the finer standard AC (triangles) under the same arrangement. In comparison, when injected ahead of the fabric filter (FF), the larger-sized treated AC (square) performed similarly to slightly worse. However, for this application, the larger-sized treated AC can be physically separated from the smaller flyash particles, and the sorbent can then be regenerated, recycled, and reused. This will substantially improve overall utilization and economics. These data thus show that a larger-than-normal sized sorbent can provide effective mercury control and ease flyash and AC separation, thereby also preserving the characteristics of the flyash for sale and beneficial use. Accordingly, because >60 μm sorbent particles have been successfully demonstrated, superior mercury control can be obtained with >40 μm particles, which may be preferred in some applications, depending on the sorbent particle/ash separation system used. Note that in FIG. 7 (and throughout) "Macf" (and "MACF") indicates million actual cubic feet.

Example 7

Liquid Phase (Organic Solvent) Halogenation

A 5% solution of bromine in ligroin was prepared by carefully adding 50 g of bromine to 1 liter of cold ligroin. One kg of activated carbon was added to the bromine solution in a large metal can. The slurry was stirred with a large paddle during the addition and for a short time afterwards until all the bromine had reacted with the carbon as indicated by the disappearance of the red color. The slurry was filtered using a Buchner funnel under vacuum. The carbon cake that was collected on the filter was dried in an oven at 110° C. for several hours until it appeared dry and a constant weight was obtained. As in Example 1, some moisture was left in the carbon, however. The dried carbon was then tumbled in the rotating barrel with metal pieces to break up and fluff the carbon.

Example 8

Promoted Activated Carbon Sorbents

A bench-scale procedure based on the above description was used to test the initial activities and capacities of several promoted activated carbon sorbents using powdered carbon, including the bromine-containing activated carbons prepared from a commercially available sorbent and an aerogel carbon film sorbent, as well as the original precursor carbons for comparison. Bromine-treated carbons were prepared by impregnation of the powdered activated carbon precursors in a stirred solution of bromine in carbon tetrachloride or methylene chloride, or alternatively, in an aqueous solution of HBr, followed by drying in air at ambient temperature and drying in an oven at 100° C. in air or nitrogen. Bromine-treated carbons were also prepared by impregnating bromine from the gas phase by passing the gas through a rotating dry bed of the activated carbon precursor. The results indicated that adding a second component to the solution improved the capacity of the sorbent.

The carbons were initially tested in a heated bed, where a synthetic flue gas stream containing elemental mercury (11 μg/m$^3$) was passed through the bed. Concentrations of total and elemental Hg in the effluent gas were determined using a Sir Galahad mercury CEM ("continuous emission monitor") (mfr. P S Analytical, Deerfield Beach, Fla., USA). The powdered sorbent was supported on a quartz filter during the test, and the other sorbents were tested as a triple layer. A comparison of the original commercial-grade powdered carbon sorbent with the sorbent after it was treated with 0.1 N HBr, and the powder was collected by centrifugation and drying, revealed that the mercury capture activity increased from an initial capture efficiency of about 50% of the Hg in the inlet to 100% capture. A comparison of the sorbent after subsequent regeneration with HBr indicated that it not only captured mercury at the same level as before (100% capture) but its capacity was prolonged by several minutes, and thus enhanced. Similar results were obtained with the carbon film and carbon fiber sorbents by treatment with molecular bromine in solution or in dry beds as described above.

Example 9

Fluidized/Ebullated Bed Preparation

An activated carbon sorbent was prepared by treating the carbon by impregnating molecular bromine from a gas composition containing molecular bromine by flowing the gas through a liquid bromine reservoir in series with a fluidized bed or ebullated bed of the carbon. The amount of bromine taken up by the carbon ranges (in one example) from <1 to about 30 g per 100 g of activated carbon, depending on the proportions used.

Example 10

Full-Scale Testing

In this example, a baghouse (fabric filter) or ESP was used to collect particulates in the exhaust of a full-scale commercial pulverized coal-burning facility. A scrubber and sorbent bed were also used to remove undesired constituents from the flue gas stream, before being fed to the stack. In this example, the halogen/halide promoted carbon sorbent was injected into the flue gas after the boiler. In general however, the inventive sorbent can be injected where desired (e.g., before, after, or within the boiler).

In one exemplary test conducted at a facility fired with lignite coal, the flue gas phase mercury (elemental) concentration was between 10 and 11 μg/m$^3$. The ash and injected carbon were collected in the baghouse at 350° F. to 375° F. (about 175-190° C.). Injection of commercial-grade activated carbon powder (untreated) at a rate of 1.0 lb/MACF ("MACF" and "Macf" represent one million actual cubic feet; 1.0 lb/MACF is about 16 kg/MACM (million actual cubic meters)) resulted in mercury effluent concentrations of 3.8-4.2 μg/m$^3$ (representing 62%-58% removal of the mercury from the gas, respectively), and at 2.0 lb/MACF (about 32 kg/MACM), gave 74%-71% removal. Injection of the bromine-treated carbon at 1.0 lb/MACF resulted in 73%-69%° removal and at 2.0 lb/MACF gave 86%-84° % removal. Thus, a significant increase in the mercury capture was exhibited during use of the bromine promoted carbon sorbent of the present invention.

Example 11A

Addition of Optional Alkaline Component-Bench-Scale

The efficiency of the activated carbons for mercury capture can be improved considerably by employing a basic material co-injected with the activated carbon, in order to capture any oxidized mercury that may be released from the sorbent, or to capture some of the sulfur or selenium oxides in the flue gas that can have a detrimental effect on the sorbent capacity.

Figure 8:
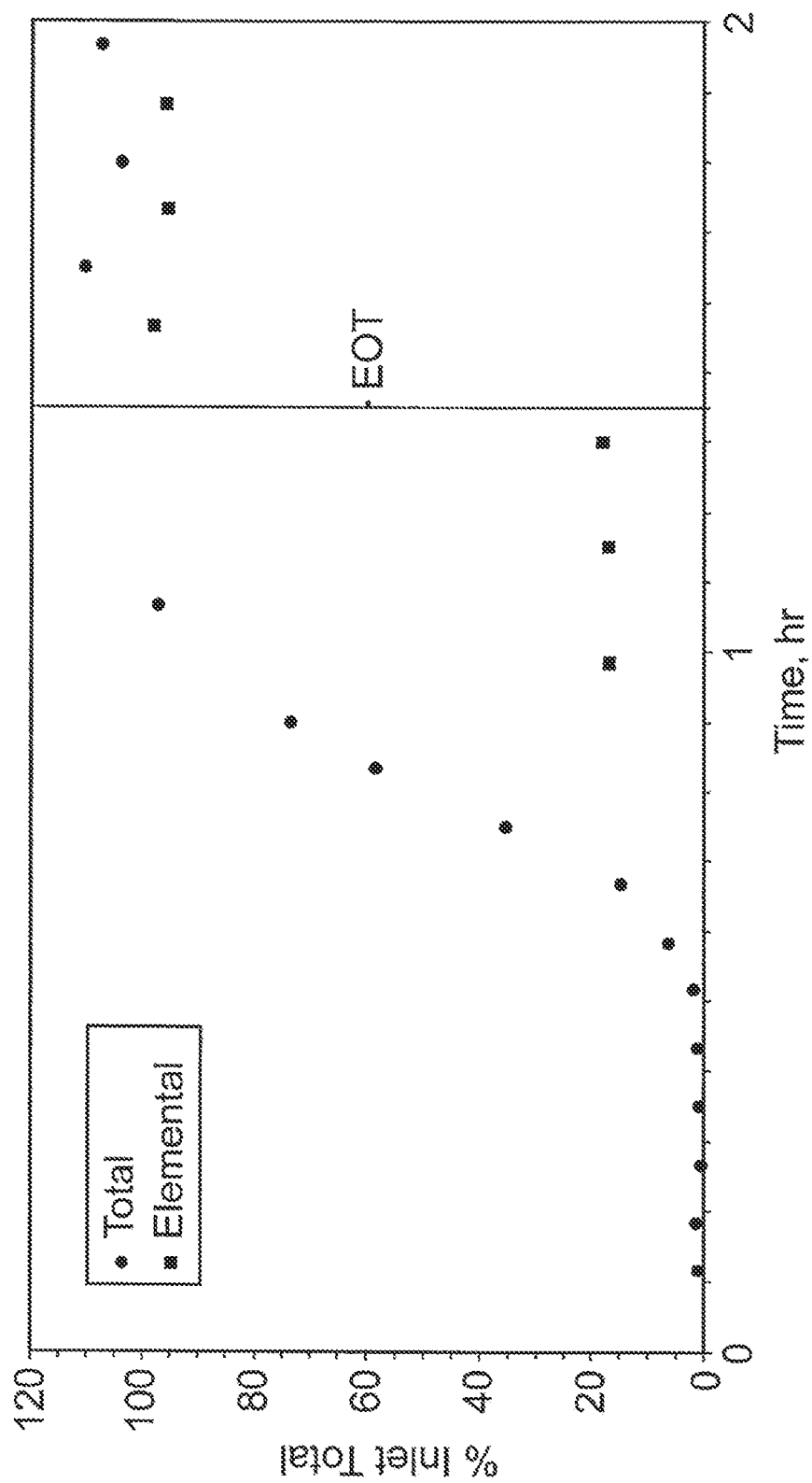
FIG. 8 is a diagram illustrating the breakthrough curves for a brominated NORIT Darco FGD sorbent with inert sand.
Figure 9:
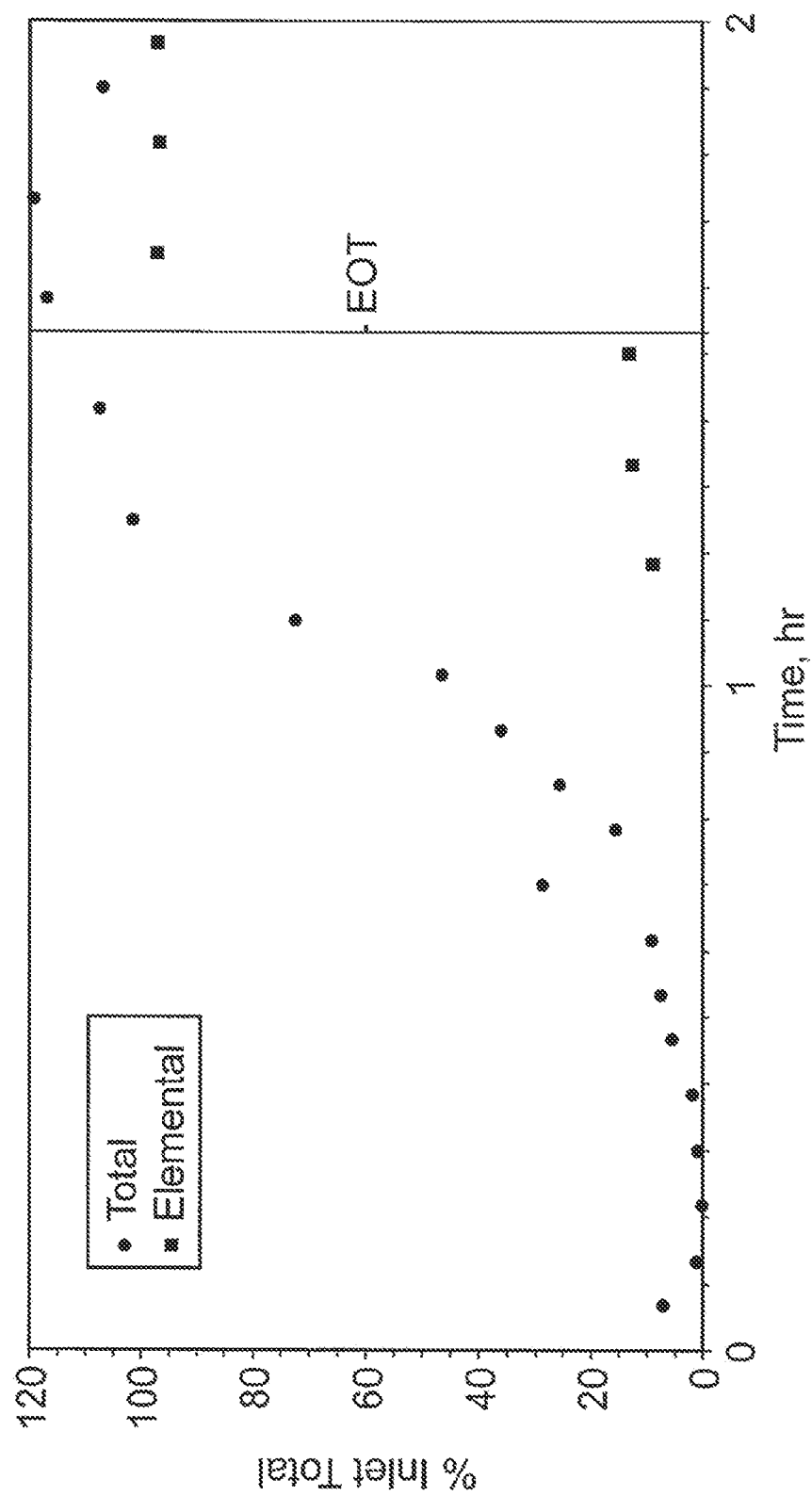
FIG. 9 is a diagram illustrating the breakthrough curves for brominated NORIT Darco FGD sorbent with a co-injected alkali material.

Bench-scale testing was conducted by preparing a filter composed of 37 mg of brominated activated carbon mixed with 113 mg of calcium oxide. The test was conducted as described in Example 1 and compared with the same carbon sorbent but with an inert diluent. The breakthrough curve for the mixture of brominated (2%) NORIT Darco FGD sorbent with inert sand is shown in FIG. 8, and the breakthrough curve for the mixture with CaO is shown in FIG. 9. It can be seen that the point of 50% breakthrough improves to 65 minutes with the mixture with CaO from only 48 min with the sand mixture.

Example 11B

Addition of Optional Alkaline Component—Pilot-Scale

Figure 10:
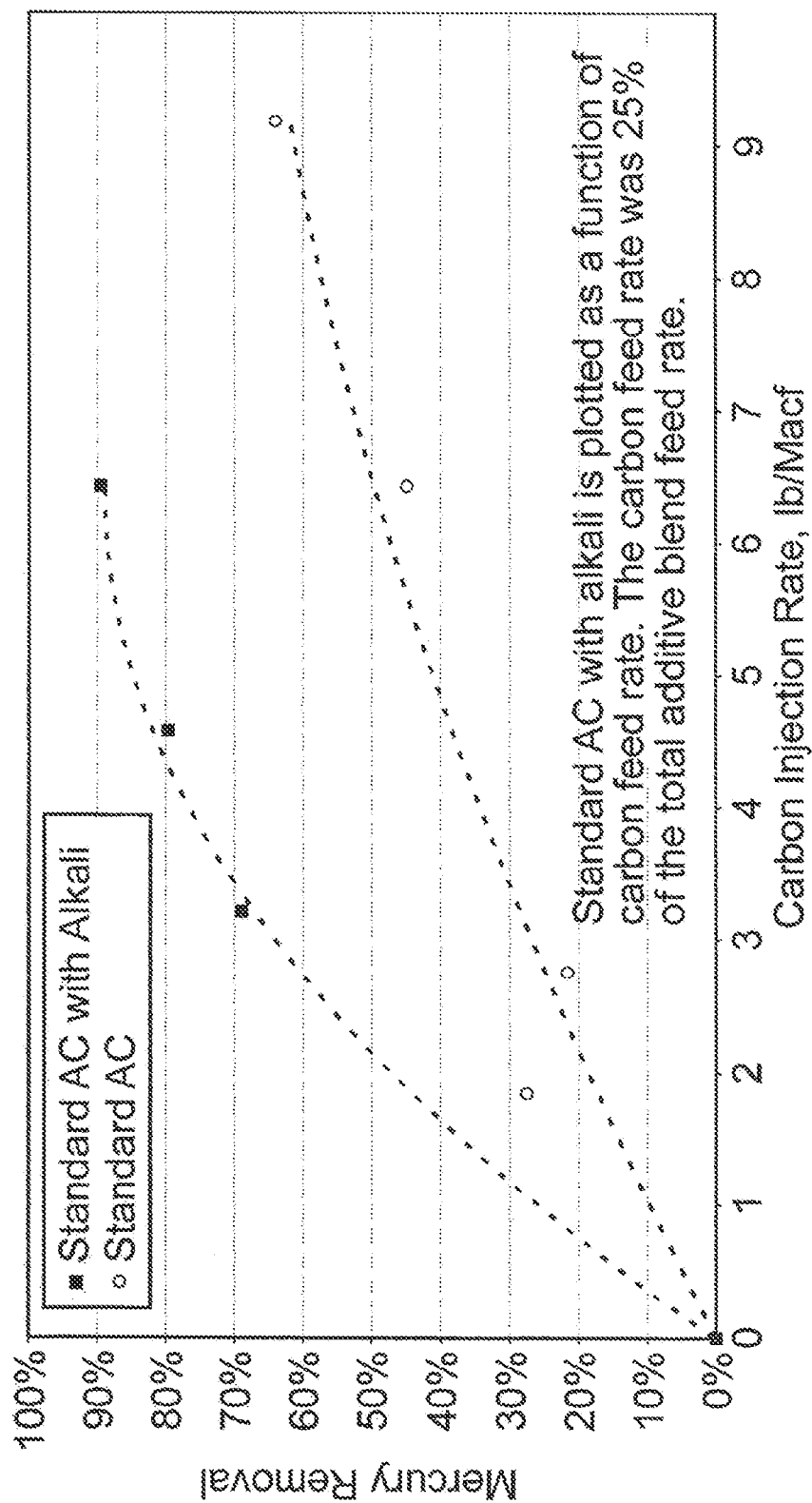
FIG. 10 is a plot of mercury removal vs. carbon injection rate with and without co-injection of alkali material.

Tests were conducted on the pilot-scale PTC combustor described above with reference to Example 6 while firing a Texas lignite to evaluate mercury control by co-injecting a standard activated carbon (also referred to herein as "AC") and an alkali material upstream of a fabric filter. Typical results are illustrated in FIG. 10. As shown in FIG. 10, co-injecting lime with activated carbon vastly improved mercury removal. Mercury removals of approximately 90% were achieved with the co-injected sorbents, whereas less than 60% removal was achieved with the use of standard AC alone, even at much higher injection rates. Data from similar tests show that injecting similar quantities of sodium carbonate and AC, and lime and AC, resulted in mercury removals of approximately 80%, and 87%, respectively. These data suggest that other alkali can also be co-injected with AC to improve mercury removal. Other data show that flue gas temperature may impact the effectiveness of the alkali addition. Further test data indicate that flue gas contaminants, flue gas constituents ($SO_2$, $NO_x$, HCl, etc.), operating temperature, mercury form, and mercury concentration may impact the effectiveness of the alkali addition. This indicates that it may be desirable to be able to adjust and tailor, onsite, the alkali-to-AC ratio in order to optimize removal for a given set of site conditions.

Without wishing to be bound by any particular theory, the synergy observed in the improved performance when co-injecting the two materials can be explained as follows. First, tests indicate that binding sites on AC can be consumed by sulfur species and other contaminants. The alkali material interacts and reacts with these species thus minimizing their consumption of AC mercury binding sites. Second, other work has shown that standard AC will continue to oxidize mercury even though the binding sites are fully consumed. This oxidized mercury can then react with alkali material and subsequently be captured by the particulate control device. Thus, combining alkali with treated and/or non-treated AC synergistically takes advantage of these two mechanisms, resulting in improved mercury capture at reduced costs.

Example 12

Brominated Carbon Sorbent for Gasification Fuel Gas

Preparation of 5% Br2W-AC

Using a procedure similar to Example 3, a 2.5 wt/vol % solution of bromine in water was prepared. Granular Calgon F400 was added to the bromine solution to give a 5 wt/wt % brominated carbon product. The bromine solution was stirred with a large paddle during and after the addition until the red color in the water disappeared. The suspension was filtered by vacuum on a large Buchner funnel. The filter cake was dried in air, and then in an oven at 110° C. until a stable weight was obtained. The moisture was reduced to 15%.

Preparation of 5% Br2D-AC

A brominated sorbent was prepared from $Br_2$ addition in solvent as described in Example 7, except that dichloromethane was used as the solvent instead of ligroin, and granular Calgon F400 was used.

Preparation of 5% PBr3-AC

A phosphohalogenated sorbent was prepared from $PBr_3$ using the method described in Example 5, except granular Calgon F400 was used.

Testing in Hydrogen Atmosphere—Procedure

To simulate the capture of mercury from a heated fuel gas or syngas from coal gasification, tests were conducted employing a stream comprising 10% vol/vol hydrogen in nitrogen passing through the sorbent at 500 cc/min. The stream contained 26.9 micrograms/$m^3$ of elemental mercury from a commercial mercury permeation source.

In the tests, the sorbent (0.5 g) was placed in a 0.39 inch (1 cm, inside diameter) glass tube fitted with a medium frit sintered glass filter disc to hold the sorbent in the gas stream. The tube containing the sorbent bed was connected to a gas inlet tube for introducing the gas stream containing the mercury vapor and at the outlet to a tube connection to the detector. The detector was a Semtech 2000 continuous mercury emission monitor. The tube was equilibrated in a nitrogen flow (450 cc/min) for 5 minutes at ambient temperature to stabilize the system. The detector showed 0 concentration of mercury in the effluent from the sorbent bed. (The blank run with no sorbent read 26.9 micrograms/$m^3$). The tube was then placed in an oven at the selected temperature for the test (from 250° to 400° C.). Effluent mercury concentration data from the detector were collected until the detector showed a constant reading for 5 minutes. Hydrogen (50 cc/min) was then added to the gas stream and detector readings were taken every 5 min. Tests were conducted at several oven temperatures for various periods of time up to 3 hours, depending on the temperature and sorbent. The elemental mercury concentration data were plotted as a percent of inlet mercury concentration versus time as in Example 1. All the mercury in the effluent was elemental, so a single detector was sufficient, and no $SnCl_2$ trap was needed to convert to elemental mercury (as in Example 1). The time for 50% breakthrough (time to reach 50% capture) was then determined from the breakthrough curves.

Results

The results are shown in Table 1 (below) for the unbrominated sorbent (Calgon F-400), the brominated sorbents (5% Br2W-AC and 5% BrD-AC), and the phosphobrominated sorbent (5% PBr3-AC). The maximum mercury concentration obtained in the effluent in each run is also reported in Table 1 for the time period indicated in the last column.

Under the reducing hydrogen conditions, the unbrominated sorbent broke through immediately and was exhausted after only 6.5 min. This complete failure occurred because the hydrogen reduces the captured mercury in the unbrominated sorbent at any temperature above 100° C. Both of the brominated sorbents exhibited excellent reactivity and good capacity at all temperatures, up to at least 400° C. The phosphobrominated sorbent exhibited superior reactivity and capacity at all temperatures, up to at least 400° C.

| Times for 50% Breakthrough Maximum Observed Hg Concentrations for Sorbents (10% Hydrogen Streams) | | | |
|---|---|---|---|
| Sorbent | Temp (° C.) | 50% breakthrough (min) | Maximum [Hg] (µg/m³) | Time (min) |
| F-400 | 250 | 6 | 20.3 | 6.5 |
| 5% Br2W-AC | 250 | >150 | 1.4 | 150 |
| 5% Br2W-AC | 300 | >180 | 4.3 | 180 |
| 5% Br2W-AC | 350 | 160 | 15.1 | 180 |
| 5% Br2W-AC | 400 | 60 | 13.9 | 65 |
| 5% PBr3-AC | 250 | >140 | 0.4 | 140 |
| 5% PBr3-AC | 300 | >150 | 0.5 | 150 |
| 5% PBr3-AC | 350 | >150 | 1.4 | 150 |
| 5% Br2D-AC | 350 | >180 | 2.1 | 180 |
| 5% Br2D-AC | 400 | >180 | 10.9 | 180 |

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The examples provided in the disclosure are presented for illustration and explanation purposes only and are not intended to limit the claims or embodiment of this invention. While the preferred embodiments of the invention have been shown and described, modifications thereof can be made by one skilled in the art without departing from the spirit and teachings of the invention. Process criteria, equipment, and the like for any given implementation of the invention will be readily ascertainable to one of skill in the art based upon the disclosure herein. The embodiments described herein are exemplary only, and are not intended to be limiting. Many variations and modifications of the invention disclosed herein are possible and are within the scope of the invention. Use of the term "optionally" with respect to any element of the invention is intended to mean that the subject element is required, or alternatively, is not required. Both alternatives are intended to be within the scope of the invention.

The discussion of a reference in the Background is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

Although the invention is described herein as a sorbent material and associated processes for its preparation and use, it is nevertheless not intended to be limited to the details described, since various modifications and structural changes may be made therein without departing from the spirit of the invention and within the scope and range of equivalents of the claims.

Provisional Application

A reactive sorbent material is described for capture of mercury in a vapor stream. The vapor stream includes flue gas from coal combustion or incineration, synthesis gas from gasification, as well as offgases from mineral processing, metal refining, retorting, cement manufacturing, chloralkali plants, dental facilities, and crematories. The sorbent is especially suited to, but not limited to, use in low-chlorine flue or exhaust gases where the mercury is mainly elemental. The sorbent comprises a bromide-modified carbon form containing a reactive compound produced by the reaction of bromine with the carbon. Other additional promoting substances can be added in smaller amounts to increase the reactivity with and sorption of elemental mercury. This combination results in a carbon bromide structure in the carbon lattice that can oxidize the mercury to a species that is strongly bonded to the carbon structure and, therefore, easily retained on the sorbent at higher temperatures in the presence of flue gas constituents. In some examples, the sorbent consists of a fine or coarse powdered material for injection into the gas stream or a granular or fibrous material for use in a fixed or moving bed. In some examples, the sorbent does not require in situ activation (an induction period) in a flue gas stream as do conventional activated carbon sorbents. Other additives of base chemistry (Ca, Na, and others) may be added to flue gas as a sorbent mixture, or co-injected to selectively sorb acid gases or other flue gas constituents to keep available reactive sites for mercury oxidation and subsequent capture. The sorbent can be regenerated by washing off contaminating components derived from flue gas that poison the spent sorbent. Novel methods for introduction of the sorbent dispersion into the mercury contaminated gas stream are described.

Following is an outline of examples of the invention. The invention may also take on various other examples or embodiments, as a person skilled in the art would understand.

1. A modified carbon sorbent was prepared by reacting the carbon with molecular bromine by applying a solution of molecular bromine in an organic solvent to the carbon, followed by removal of the modified carbon from the bulk of solvent and further removal of solvent from the pores by drying the carbon in air or nitrogen. The solution may also contain an additional promoting substance in small amounts. In one example, the amount of bromine taken up by the carbon ranges from <1 to about 30 g per 100 g of activated carbon, depending on the proportions used.

1A. (Dependent)
Same as 1, carbon is powdered activated carbon.
Carbon is granular activated carbon.
Carbon is very fine carbon black.
Carbon is very fine carbon fiber.
Carbon is aerogel carbon film.
Carbon is char recovered from pyrolysis process.
Carbon is powdered activated carbon of size distribution larger than fly ash size distribution, so that it can be physically separated from the ash and regenerated for reuse.

Carbon is regenerated from previous usage cycle and recycled.

Other desired types of carbon may also be used.

1B. (Dependent)

Same as 1, Solvent is chlorinated hydrocarbon such as dichloromethane.

Same as 1, Solvent is hydrocarbon solvent such as petroleum ether or ligroin or pentane or hexane or toluene or benzene.

Same as 1, Solvent is water.

Same as 1, Solvent is carbon disulfide.

Same as 1, Solvent is a waste solvent.

Same as 1, Solvent is an ether.

Same as 1, Solvent is recycled from previous batch.

Same as 1, Solvent is supercritical solvent such as $CO_2$.

Other desired types of Solvents may also be used.

1C. (Dependent)

Same as 1, solution of bromine is applied by stirring the carbon in the bromine solution.

Same as 1, solution of bromine is applied by spraying a solution of molecular bromine in an organic solvent, followed by removal of solvent from the pores by drying the carbon in air or nitrogen.

The bromine may also be applied using other desired techniques.

1D. (Dependent)

Same as 1, removal of solvent is by filtration, centrifugation, settling, and decantation and drying in vacuum, air, or other gas.

Same as 1, when sprayed or minimal volume, removal of solvent is by drying in air, vacuum, or other gas.

The solvent may also be removed using other desired techniques.

1E. (Dependent)

Same as 1, additional substance is iodine, at 1%-10% of the bromine concentration added.

Same as 1, additional substance is hydrohalide (HI, HBr, HCl), etc, 1%-10% of bromine.

Same as 1, additional substance is a compound comprised of a Group V or VI element or combination of Group V or VI with Group VII element, such as $SCl_2$, 1-10 wt % of bromine.

2. A modified carbon sorbent was prepared by reacting the carbon with molecular bromine by contacting the carbon with a gas containing molecular bromine. In one example, the amount of bromine taken up by the carbon ranges from <1 to about 30 g per 100 g of activated carbon, depending on the proportions used.

Contacting is by passing the $Br_2$ gas through a bed of the carbon.

Bed is ebullated or fluidized.

Bed is moving bed of granules or fibers.

Contacting is by admitting $Br_2$ gas to a duct through which the carbon is transported from a reservoir to the flue gas duct via an air-driven entrainment method, thus promoting the activity of the carbon in-flight.

Same additives as 1E, except these are added in the gas phase, and added in-flight as in 2 above.

3. A modified activated carbon sorbent was prepared by reacting the carbon with hydrogen bromide (HBr) by stirring the carbon in a solution of HBr in an organic solvent or in water, followed by removal of the modified carbon from the bulk of solvent and further removal of solvent from the pores by drying the carbon in air or nitrogen. In one example, the amount of bromine taken up by the carbon ranges from <1 to about 30 g per 100 g of activated carbon, depending on the proportions used.

Same dependent clauses as in 1A with regard to carbon forms. Same solutions and treatment as 1B, 1C, 1D.

Same additives as 1E, added into the solution phase or later in the gas phase, and added in-flight as in 2 above.

4. An activated carbon sorbent was prepared by impregnating hydrogen bromide by passing a gas composition containing hydrogen bromide diluted with nitrogen or air through a fluidized bed or ebullated bed of the carbon. In one example, the amount of bromine taken up by the carbon ranges from <1 to about 30 g per 100 g of activated carbon, depending on the proportions used.

Same dependent clauses as in 1A with regard to carbon forms.

Contacting options are similar to 2.

5. Sequential treatment of activated carbon with bromine or HBr, followed by another mercury stabilizing reagent to generate a highly reactive bifunctional sorbent, the reagent to include sulfur and selenium species, such as $H_2S$, $SO_2$, $H_2Se$, Se, $SeO_2$, $CS_2$, $P_2S_5$.

6. Sequential treatment of activated carbon with mercury stabilizing reagent, followed by bromine or HBr to generate a highly reactive bifunctional sorbent, the reagent to include sulfur and selenium species, such as $H_2S$, $SO_2$, $H_2Se$, Se, $SeO_2$, $CS_2$, $P_2S_5$.

7. Treatment of a carbon with a Group V or VI element combined with Group VII element, such as $PBr_3$ or $SCl_2$. In one example, the amount of Group V or VI halide is 1-30 wt % of the carbon. The compound is added in vapor phase or in solution (solvent is hydrocarbon, chlorinated hydrocarbon, or other solvent as described in 1B, but not water, since the compound is destroyed in water solution).

8. The process for preparing the bromine-containing activated carbon sorbent as described in Examples 1-6 and coupled with the injection of the bromine-containing fine-particle sorbent into the contaminated gas stream and subsequent removal of the fine particles of sorbent from the gas stream in a collection device, such as bag filtration of electrostatic precipitator (ESP).

9. The process of using additives (1-8) in conjunction with sorbents to capture acid gases and other flue gas constituents that block oxidation reactions or consume sorbent sites that would otherwise capture mercury. The additive is a compound comprised of Group I or II elements, such as Ca, Na, and others. These additives of base chemistry may be added to flue gas as a sorbent mixture or co-injected to selectively sorb acid gases or other gas constituents that compete for mercury reactive/sorption sites, thereby improving the effectiveness of activated carbon to capture mercury. In addition, the base additives can augment the treated activated carbon by helping to capture oxidized mercury forms in the flue gas, such as mercuric chloride, or that are produced on the carbon sorbent, such as mercuric bromide, but are released to the gas phase as the sorbent becomes saturated or capacity limited.

10. The process of preparing a larger-than-normal (>40 μm) sorbent particle size, promoting with the halogen treatment as described in 1-8, using the treated sorbent for capture of mercury by injecting in the flue gas, and finally separating and recovering the sorbent from the ash particles. The larger sorbent size thus will allow easy mechanical/physical separation so that sorbent can be regenerated, recycled, and reused, and the ash can be sold as a low-carbon cementatious byproduct for concrete. The separation can be effected by various methods, such as density (gravity), floatation, or sieving methods.

11. The process for preparing the bromine-containing activated carbon sorbent as described in Example 1-10, coupled with the direct injection of the slurry of the prepared fine-particle sorbent in the solvent or aqueous phase, so that the aerosol particles of the slurry achieve a high degree of dispersion in the gas stream and evaporation of the solvent in the hot gas occurs rapidly. The amount of slurry added is flow-controlled, and the concentration of particles in the slurry is monitored by optical density measurements prior to injection. Collection of particles is performed.

12. The process for preparing the bromine-containing activated carbon sorbent, as described in Examples 2 and 4, coupled where the fine-particle dispersion of brominated sorbent in the gas stream at the top of the ebullated bed is led to the flue gas or offgas duct where the said dispersion is contacted with mercury-contaminated flue gas or offgas stream. The amount of aerosol dispersion added is controlled by the gas flow to the ebullated bed, and the concentration of particles in the dispersion can be monitored by optical density measurements prior to injection. Collection of particles is performed by the existing particulate-collection equipment.

13. The process for preparing the bromine-containing activated carbon sorbent bed, coupled with contacting the bed with the mercury-contaminated flue gas or offgas.

14. The process for preparing the bromine-containing activated carbonBsorbent, as described in Examples 2 and 4, or untreated activated carbon, coated on a substrate or as activated carbon material. This material is placed in a moving system that geometrically allows for control of rate of exposure, sorption, and exchange of material in a continuous or semicontinuous manner.

15. In the sorbent and mercury removal process outlined in paragraphs above, the bromine reagents promote metal oxidation activity by creating cationic or radical character on the carbon edge structure that attracts mercury atoms and extracts electrons from said mercury atoms, resulting in oxidized mercury, which is more easily captured on a sorbent. A similar mechanism applies to oxidation and capture of reduced arsenic and other pollutant species.

The invention relates to the process for the removal of mercury and other pollutant species from gas streams generated during the burning of fossil fuels, such as in a coal-fired utility or synthesis gas from gasification facilities. This removal process would utilize a sorbent and/or a combination of additives to remove pollutants from the gas stream, which are at the same time interacting with other gas components that result in poisoning or deactivating the sorbent and reducing its capacity or reaction rates with the targeted pollutant species. The present invention provides a cost-effective way to capture the pollutants by utilizing exceptionally active carbon sorbents and promoting mercury sorbent surface reactions, containing a bromide form of the carbon, that capture mercury with high kinetic chemisorption (oxidation) activity, so that capture can occur during contact times of seconds or less. The sorbent does not require in situ activation (induction period) in the gas stream to achieve high activity as do conventional activated carbon sorbents. The reactivity of the sorbent toward the pollutants and the sorption capacity can be regenerated, recycled, and reused.

Burning fossil fuels generates a flue gas that contains mercury (and other trace elements) that was in the coal, plus oxides of sulfur and nitrogen (acid gas emissions) and particulates whose release to the environment must be controlled by use of sorbents, scrubbers, filters, precipitators, and other removal technologies. While control of other elements and/or flue gas pollutants may apply, the discussion provided is focused on mercury. Initially, mercury is released in the elemental form during combustion/gasification, but downstream of the boiler, in the ducts and stack of the combustion system, part of the elemental mercury is oxidized. The amount oxidized depends on the amount of acid gases present in the flue gas and other factors. Amounts of mercury vary with the coal, but a typical concentration of mercury in the stream of combustion gas is about 5 parts per billion (ppb). A pound of mercury or more per day may be emitted in some utilities.

Discussion of Sorbent Technologies

Several types of mercury control methods for flue gas have been investigated, including injection of fine sorbent particles into a flue gas duct and passing the flue gas through a sorbent bed. Fine-particle injection sorbents include activated carbon, metal oxide sorbent, sodium sulfide particles (for example, see U.S. Pat. No. 6,214,304), and basic silicate or oxide sorbents (for example, see the Ghorishi reference (Ghorishi, B.; Gullet, B. K. Waste Manage Res. 1993, 16, 582). and Lancia references). When particle injection is employed, the mercury chemisorbed to the sorbent particle is removed from the gas stream in a bag house or ESP and collected along with ash particulates (for example, see U.S. Pat. Nos. 4,889,698, 4,956,162, 5,672,323, 5,827,352, 6,027,551, and 5,505,766). The sulfide and basic silicate and oxide particles are effective only for the oxidized mercury, and the metal oxide sorbents exhibit slower capture kinetics than the carbon particles. Additionally, injection of fine carbon particles into the flue gas stream has been only partially successful in removing mercury, especially elemental mercury, where effective removal of approximately 60% was attained with a baghouse to collect carbon and ash. Even lower removal rates have been observed when using an ESP to collect the carbon, since the contact time of the carbon with the gas is very short.

A major problem with existing carbon injection systems is that the sorbent is initially unreactive, and only after exposure to the flue gas for about 20 minutes does the seasoned sorbent become effective and provide capture of 60% of the mercury in the gas. Consequently, these sorbents must be used in large amounts (high sorbent-to-mercury ratios) to effectively capture the mercury. These sorbents can be relatively expensive and cannot be easily separated from the ash, regenerated and reused. The collection of carbon in the ash also creates solid waste disposal problems, and the spent sorbent may contaminate the collected ash for use in various applications.

Use of Halogens in Mercury Capture

Methodologies for using halogens for the treatment of flue gas have not previously been effective. Halogen is defined as a member of the very active elements comprising Group VII-A of the periodic table. In the molecular elemental halogen form, including $F_2$, $Cl_2$, $Br_2$, and $I_2$, the reaction with elemental mercury is not fast enough to result in the formation of oxidized mercury in a coal combustion flue gas with conventional ash control technology. The atomic elemental halogen form, which includes F atom, Cl atom, Br atom, and I atom, is about a million times more reactive to mercury, but the concentrations of these forms are extremely low, and also, therefore, cannot result in oxidation of mercury in a utility flue gas.

A halide is a compound formed from reaction of a halogen with another element or radical. In general, the halide compounds are normally very much less reactive than the molecular halogens, having expended their high chemical potential in forming the low energy halide. The halide is considered a reduced form and cannot therefore oxidize anything by itself. It is for this reason that it is not obvious that a halide-halogen treated activated carbon would be effective at oxidizing elemental mercury and provide effective capture of elemental mercury. In fact, for tests with salts, analytical data show the addition of bromine to an activated carbon or carbon black or soot does form a compound by reacting with the unsaturated groups on the carbon. By applying x-ray photoelectron spectroscopy, it has been determined that bromine or HBr added to carbon black forms chemical compounds within a carbon structure.

A body of theory has been developed from scientific evidence to explain the nature of the promotion effect of the bromine compounds. This principle is illustrated in FIG. 2, which in step 1 shows the reaction of the hydrogen bromide with the unsaturated structure of the activated carbon. This may be a carbene species on the edge of the graphene sheets structures of the carbon. Molecular bromine or a bromine compound reacts to form a similar structure, with a positive carbon that is active for oxidizing the mercury.

We now teach that the formation of the new bromide compound with carbon increases the reactivity of the carbon forms toward mercury and other pollutants. The resulting bromide compound is uniquely suited to facilitate oxidation of the mercury. The effectiveness of the oxidation results from the promotion effect of the halide exerted on the developing positive charge on the mercury during the oxidation, known in the chemical art as a specific catalytic effect. Thus, as the mercury electrons are drawn toward the positive carbon, the halide anion electrons are pushing in from the other side, which stabilizes the positive charge developing on the mercury and lowers the energy requirement for the oxidation process.

Bromide is especially reactive, owing to the highly polarizable electrons in the outer $4p$ orbitals of the ion. Thus, adding HBr or $Br_2$ to the carbon forms a similar carbon bromide, in which the positive carbon oxidizes the mercury with the assistance of the bromide ion.

PRIOR ART PUBLICATIONS

The earliest patents that relate to mercury capture on a sorbent are actually not for flue gas mercury control but for capture of mercury from air or other gas mixtures on a carbon or other sorbent. These patents were based on a model that recognized the affinity of halogens for mercury, rather than the formation of a reactive carbon. These patents are discussed below according to the type of halogen used for impregnation.

One patent that teaches a halogen impregnation (Stock, U.S. Pat. No. 1,984,164, issued in 1934) describes the use of activated carbon or other solid impregnated with a halogen for removing Hg from air. The impregnation method is not specified. This seems to be the most general claim with respect to halogen impregnation. All the statements and claims appear to refer to halogen or iodine, but the patent does not appear to address bromides or other halides or bromide compounds or even specifically iodide or an iodine compound. The only example in the description is iodine impregnation. The patent also is restricted to air systems and did not pertain to flue gas systems with reactive acid gases. The description did not assume that the iodine formed a reactive carbon species.

Japanese Patent JP 49-43197 describes the treatment of Hg-contaminated electrolysis cell gas using a metal iodide salt on a support. A similar treatment using a resin impregnated with a metal iodide is described in JP 50-6438. These patents do not appear to represent a carbon bromide compound as specified in this patent application.

Another early patent (Hilgen, U.S. Pat. No. 3,849,267, issued in 1974) describes a method for Hg removal from a gas which claims mixing molecular chlorine ($Cl_2$) with the gas to be cleaned and passing it through a nonporous sorbent such as glass wool and NaCl (not carbon). This was evidently not an obvious extension of the Stock patent, since a halogen was introduced as part of the gas phase being cleaned.

A later patent (deJong, et al., U.S. Pat. No. 4,196,173, issued in 1980) describes a method for Hg removal in air which claims using a bed of activated carbon impregnated with halogen-only $Cl_2$ is specified in the other claims and examples, and it is prepared by flowing the $Cl_2$ stream through a carbon bed.

An improved sorbent for mercury in air was patented by Revoir and Jones (U.S. Pat. No. 3,662,523, issued in 1972), in which ICl and $ICl_3$ vapors were impregnated into the activated carbon. No explanation of the increased activity was provided. Since these compounds are interhalogen compounds, the patent did not infringe Stock.

U.S. Pat. No. 5,891,324 describes an activated carbon containing an acid (HCl, $H_2SO_4$, or $H_3PO_4$) for the removal of mercury contained in a liquid phase, such as would occur in a process steam in the oil industry. In this case, the model presented was that mercury is adsorbed from the liquid into the solid carbon phase at relatively low temperatures.

In U.S. Patent Application 2004/0003716, a method is described for removing mercury from a combustion gas. This method employs an exposure of a finely powdered activated carbon to a molecular bromine gas at an elevated temperature or to HBr to produce a sorbent with good mercury removal ability when injected into the flue gas duct. The model for the efficacy of the Nelson sorbent is not clearly stated, so it can be presumed that the reasoning for using bromine is the simple premise that some bromine form will help capture the mercury, as does iodine and chlorine. The methods for incorporation of the bromine in the Nelson application are not the same as with the present invention, and the Nelson method will not produce the identical carbon bromide species that are obtained in the art described in this application. The Nelson method lacks many of the features described in this application that impart exceptional activity to the sorbent in a convenient way, for example, the addition of smaller amount of a second more powerful promoting agent, the use of facile solvent systems, including aqueous bromine, and the use of in-flight bromine treatment. Additionally, the patent application does not mention regeneration, recycling, or reuse, or the use of moving contactors or larger particle size to facilitate sorbent-ash separation.

Embodiments of the Invention

A sorbent that is initially very reactive in oxidizing mercury can be used in very small amounts to achieve high capture efficiencies, thus lowering operation costs and lessening the disposal problem. In addition, further disposal reduction is made possible by recycling and reusing the sorbent that is produced using this technology. The time interval for the mercury and sorbent to interact in a flue gas duct and the subsequent collection of the mercury on the sorbent and ash may be very short—only seconds. This requires the sorbent to have high capacity and be very reactive toward mercury. A sorbent can be utilized in a very finely powdered form (e.g., 1-10 µm) to minimize mass transfer limitations. But, again, the reactivity should be very high to capture all of the mercury encountered by the fine particles. One feature of this invention is the process to prepare a sorbent containing a bromide compound formed on the carbon structure that provides a sorbent that is highly active on initial contact with the mercury contaminated gas stream, which allows for effective capture of the mercury.

One possible way to do this is to chemically combine molecular bromine from solution with activated carbon (edge sites). X-ray photoelectron spectroscopy established that the addition of bromine formed a chemical compound in the carbon structure. Thus, the sorbent does not represent a molecular bromine halogen form but a new chemically modified carbon structure. This may not occur with the less reactive iodine, where an $I_2$-molecular complex can exist on the carbon basal plane. In the bromine case, it is actually the carbon that oxidizes the mercury. Thus, an entirely new model is presented for the reactivity of the bromine-treated carbon with mercury. The reactive carbon form can be generated by the addition of bromine, hydrogen bromide, or combinations of bromine and other elements as described herein. Chlorine treatment resulted in lower-activity carbons because the chloride anion was less effective in promoting the oxidation by stabilizing the developing positive charge on the mercury in the transition state for oxidation. Based on this model, several innovative, inexpensive, activity-enhancing features have been developed.

It has been demonstrated that addition of an optional second component, in addition to the bromine, results in improved reactivity and capacity for the sorbent, exceeding that of both the untreated carbon and the brominated carbon. The second compound comprises either a second halogen or a compound from a second halogen, such as HBr. Thus, in addition to having a reactive carbon form present, the second component generates a Lewis base with greater ability to stabilize the developing positive charge on the mercury. Thus the second component is an element with more polarized electrons ($4p$ and $5p$).

Furthermore, we demonstrated that the sorbent can be readily treated with any combination of bromine and the second component in-flight using vapors of these components contacting the very fine carbon particles dispersed in air or other gas stream that conveys the particles to the flue gas duct. There is no particular temperature requirement for this contact. This technology is very simple to implement, so it will result in a great cost savings to the utility using this technology for mercury capture.

A unique, nonobvious technique for preparation of the treated carbon is through combining the treatment system with the carbon injection system at the end-use site. With this technique, the halogen is introduced to the carbon-air mixture in the transport line (or other part of the sorbent storage and injection system). Benefits over current concepts to treat sorbents off-site include the following:

Capital equipment costs at a treatment facility are eliminated.

Costs to operate the treatment facility are eliminated.

There are no costs for transporting carbon and additive to a treatment facility.

This process uses existing hardware and operation procedures.

This technology ensures that the sorbent is always fresh, and thus, more reactive.

No new handling concerns are introduced.

There are no costs for removing carbon from treatment system.

This process allows rapid on-site tailoring of additive-sorbent ratios in order to match the requirements of flue gas changes, such as needed when changing fuels or reducing loads, thus further optimizing the economics.

This technology reduces the amount of spent sorbents that are disposed.

With the foregoing and other features in view, there is provided, in accordance with the invention, a process for preparing and regenerating carbon sorbents whose activity for mercury capture is promoted by the addition of bromine to the carbon structure.

The invention applies to use of a sorbent in a powdered form that has been injected into a flue gas stream before or after ash particulates have been removed. Examples of the composition of the sorbent are a powdered modified activated carbon prepared by adding $Br_2$ or HBr plus a second optional component. Alternatively, the sorbent is on a moving contactor consisting of particles or fibers containing the compositions listed in the previous sentence. Either type can be regenerated; the poisoning contaminants from the flue gas are removed and an inexpensive promoting agent added to restore mercury sorption activity. This process of promoting the activity of the carbon itself contrasts with the earlier, more expensive art of adding a reagent (such as peroxide, gold, triiodide, etc.) to the sorbent. The activated carbon sorbent treated with bromine and/or the other components is noncorrosive.

Detailed examples of sorbent regeneration techniques are described in co-pending, commonly-owned PCT patent application No. PCT/US04/12828, titled "PROCESS FOR REGENERATING A SPENT SORBENT", which is incorporated by reference herein.

Although the invention is described herein as a sorbent material, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific exemplary embodiments.

Figure 11:
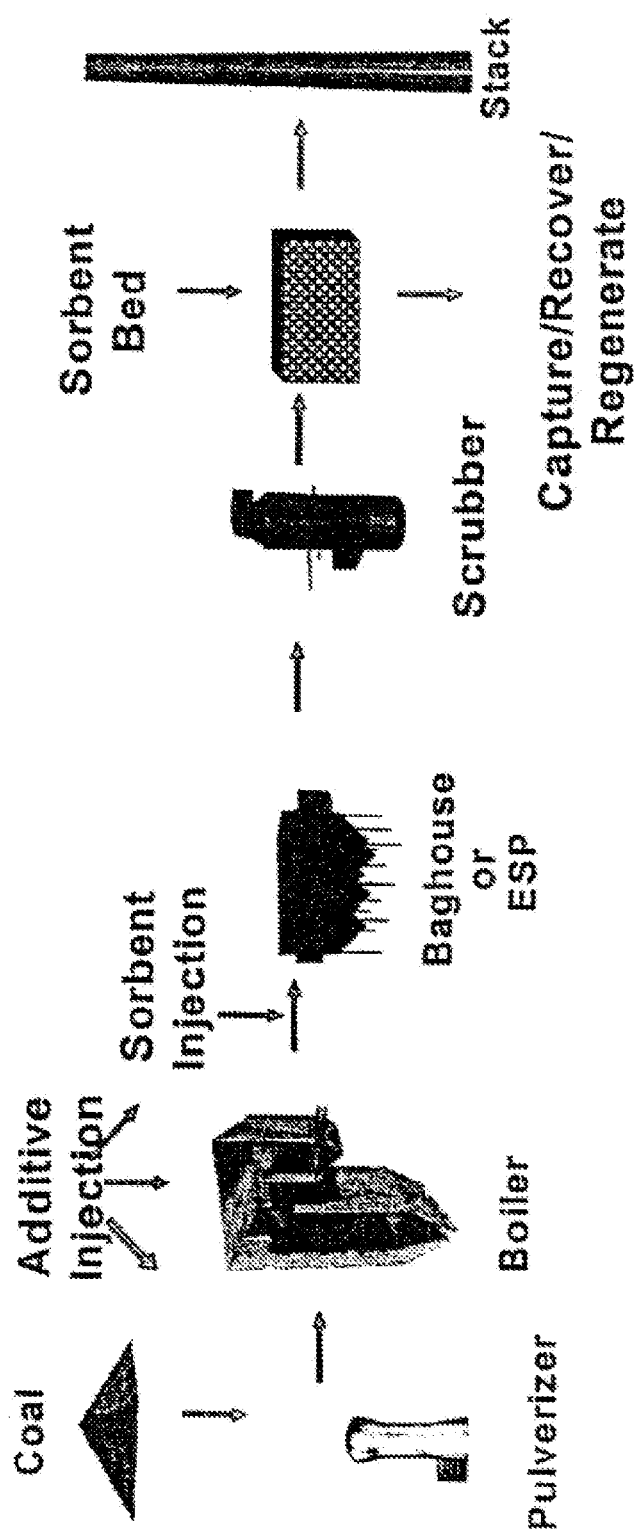
FIG. 11 is a block diagram illustrating the use of the invention in a coal fueled facility.

FIG. 11 is a block diagram illustrating the use of the invention in a coal fueled facility. Of course, the invention can also be used in any other desired type of facility. FIG. 11 shows a boiler for burning pulverized coal. The facility utilizes various devices to clean the exhaust of the boiler. In this example, a baghouse or ESP is used to collect particulates in the exhaust. A scrubber and sorbent bed are also used to remove undesired constituents from the flue gas stream, before being fed to the stack. In the example shown, the sorbent is injected into the flue gas after the boiler. The additive can be injected where desired (e.g., before, after, or within the boiler).

Another advantage of the present invention relates to the use of a feedback system to more efficiently utilize the invention. Where possible, the mercury control technology of the present invention will utilize measurement of mercury emissions as feedback to assist in control of the sorbent injection rate. Tighter control on the sorbent levels in this way will ensure mercury removal requirements are met with the minimal sorbent requirements and therefore the associated costs will be minimized. In one example, the emissions are measured at the stack.

Carbon Sorbent

Reactions of halogens and acidic species with the basic binding sites on the activated carbon sorbent create sites for oxidizing mercury. Other metal ions, such as boron, tin, arsenic, galium, Sb, Pb, Bi, Cd, Ag, Cu, Zn, or other contaminants, will also react with the oxidation sites generated on the carbon.

According to our model, adding the bromine from the bromine reagent or a proton from a hydrogen halide acid to a basic carbene site on the carbon edge structure forms a carbocation that accept electrons from the neutral mercury atom forming the oxidized mercury species that is bound to the sorbent surface. The reactive site may also generate reactive bromine radicals or carbon radicals at the active sites on the carbon. Thus, the activated carbon serves to stabilize the bromine, yet provides a highly reactive bromine-containing reagent that can oxidize the mercury and promote its capture on the activated carbon. The sorbent that contains bromine is expected to be more reactive than the corresponding sorbent containing chlorine and much less expensive than the sorbent containing iodine.

A bench-scale procedure based on the above description was used to test the initial activities and capacities of several powdered carbon sorbents, including the bromine-containing activated carbons prepared from a commercially available sorbent and an aerogel carbon film sorbent, as well as the original precursor carbons for comparison. Bromine-treated carbons were prepared by impregnation of the powdered activated carbon precursors in a stirred solution of bromine in carbon tetrachloride or methylene chloride, or alternatively, in an aqueous solution of HBr, followed by drying in air at ambient temperature and drying in an oven at 100° C. in air or nitrogen. Bromine-treated carbons were also prepared by impregnating bromine from the gas phase by passing the gas through a rotating dry bed of the activated carbon precursor. Adding a second component to the solution was demonstrated to improve the capacity of the sorbent.

The carbons were initially tested in a heated bed, where a synthetic flue gas stream containing elemental mercury (11 µg/m$^3$) was passed through the bed. Concentrations of total and elemental Hg in the effluent gas were determined using a Sir Galahad mercury CEM. The powdered sorbent was supported on a quartz filter during the test, and the other sorbents were tested as a triple layer.

A comparison of the original commercial-grade powdered carbon sorbent with the sorbent after it has been treated with 0.1 N HBr, collecting the powder by centrifugation and drying, revealed that the mercury capture activity is increased from an initial capture efficiency of about 50% of the Hg in the inlet to 100% capture. A comparison of the sorbent after subsequent regeneration with HBr indicates that it not only captures mercury at the same level as before (100% capture) but is enhanced such that its capacity is prolonged by several minutes. Similar results were obtained with the carbon film and carbon fiber sorbents by treatment with molecular bromine in solution or in dry beds as described above.

An activated carbon sorbent was prepared by treating the carbon by impregnating molecular bromine from a gas composition containing molecular bromine by flowing the gas through a liquid bromine reservoir in series with a fluidized bed of ebullated bed of the carbon. The amount of bromine taken up by the carbon ranges (in one example) from <1 to about 30 g per 100 g of activated carbon, depending on the proportions used.

In one exemplary test conducted at a facility fired with lignite coal, the flue gas phase mercury (elemental) concentration was between 10 and 11 µg/m$^3$. The ash and injected carbons were collected in the baghouse at 350E to 375EF. Injection of commercial-grade activated carbon powder (untreated) at a rate of 1.0 lb/Macf resulted in mercury effluent concentrations of 3.8-4.2 µg/m$^3$ (representing 62%-58% removal of the mercury from the gas), and at 2.0 lb/Macf, gave 74%-71% removal. Injection of the bromine-treated carbon at 1.0 lb/Macf resulted in 73%-69% removal and at 2.0 lb/Macfgave 86%-84% removal. Thus, a significant increase in the mercury capture was exhibited during use of the bromine-treated carbon.

Addendum: Other References to Hg Sorption
Sorbent Beds with Particulate Removal

Carbon beds have also been utilized for mercury capture in flue gas. The German Patent 34 26 059 describes the use of a very thick carbon bed for treatment of flue gases containing polyhalogenated compounds. Although the system employed at Dusseldorf would also have the potential for Hg removal (for example, see the Streng reference), it is not very practical to use such a thick bed. Spent sorbent is burned and not regenerated. The carbons are not pretreated.

The GE-Mitsui-BF system (Tsuji, K.; Shiraishi, I.; Dague, R. F. Proceedings, Sixth International Symposium, Air & Water Management Assoc., New Orleans, La., Mar. 10-12, 1993) employs a recirculating carbon bed, where mercury is removed along with acid gases (as ammonium salts) and the carbon is regenerated at high temperatures where ammonium sulfate is decomposed to $SO_2$ and $N_2$ and mercury is converted to the elemental form, which desorbs from the sorbent. Attrition of the sorbent results in a significant sorbent cost. The carbons are not pretreated.

Sorbent Injection after Particulate Removal

A process of injecting manganese oxide sorbent particles is described in U.S. Patent Application 2002/0150516. Regeneration is claimed by removal of spent oxide particles from the reaction zone and rinsing with dilute aqueous acid.

Sorbent Beds after Particulate Removal

Of particular interest in designing a mercury control process is to use the sorbent downstream of a particulate control device so the sorbent is not highly diluted with the ash particles. The sorbent could then be more easily regenerated and recycled. The prior art teaches several examples of this type of configuration and sorbent processing.

U.S. Pat. No. 5,607,496 teaches the oxidation of mercury on a metal oxide sorbent bed and subsequent absorption to sorbent. The sorbent bed follows the particulate-removal equipment and, thus, the gas still contains the $SO_x$ and $NO_x$, which react with the metal oxide sorbent to form the metal sulfates, which poison the bed. High temperatures are proposed to regenerate the bed. However, Hg is only partially removed from the sorbent at temperatures up to 500° C. The sorbents do not work effectively after regeneration using this technique; the problem may be that manganese sulfate formed during the sorption cycle does not completely decompose back to an active manganese oxide form.

U.S. Pat. No. 6,383,981 describes a fixed $MnO_2$ or $Fe_2O_3$ bed for removal of Hg from a hydrocarbon stream. No regeneration method appears to be included.

A recent U.S. Patent application (2001/0003116) describes the regeneration of a plate or honeycomb material composed of transition metal oxides that was used for sorption of mercury in flue gas. The claimed process involves heating the sorbent in a reducing gas stream to remove poisons, followed by impregnation with a polyfunctional complex-forming reagent containing the catalyst active component to restore mercury capture capacity. The first of these steps can remove the mercury, but it is unclear whether it actually removes the sulfate poison. The second of these steps is rather expensive, because one is actually reconstituting the reagent on the sorbent Porous beds containing a mercury oxidizing reagent on a solid support are described in several patents for removal of mercury from gas streams. These include peroxomonosulfate (for example, see U.S. Pat. No. 4,786,483), triiodide or other mixed halogens (for example, see U.S. Pat. Nos. 3,194,629; 3,662,523), or sulfur (for example, see U.S. Pat. Nos. 3,194,629, 4,101,631, 4,708,853, 6,258,334). The reagent material is destroyed either by reaction with the flue gas during sorption or by attempts to regenerate the sorbent; there is no way to regenerate these sorbents, except by reimpregnation of the expensive reagent.

Amalgamating noble metals (gold, silver) on a suitable support can be regenerated by microwave heating (for example, see U.S. Pat. No. 6,136,072), but they are expensive and not especially active for sorption in flue gas.

Hg Sorbents for Air or Natural Gas Treatment

Melkersson (U.S. Pat. No. 3,786,619) described a Hg sorbent comprising $SeO_2$ or $SeS_2$ for air treatment. This method did not appear to employ a carbon support or halide.

Yan (U.S. Pat. No. 4,814,152) described a Hg sorbent comprising elemental sulfur and a metal catalyst on a carbon support. This method did not appear to employ a halide.

Attia (U.S. Patent 65/080,281) described a sorbent for mercury and a variety of other contaminants comprising an inorganic aerogel composition. This method did not appear to employ a carbon support or halide.

Following is a List of Various Background References:

Lancia, A.; Musmarra, D.; Pepe, F.; Volpicelli, G. *Combust. Sci. & Technol.* 1993, 93, 277.

Streng, S.; Kassebohm, B. *Fuel Proc. Technol.* 1994, 39, 431.

U.S. Pat. No. 6,214,304 Rosenthal
U.S. Pat. No. 4,889,698 Moller
U.S. Pat. No. 4,956,162 Smith
U.S. Pat. No. 5,672,323 Bhat.
U.S. Pat. No. 5,827,352 Altman
U.S. Pat. No. 6,027,551 Hwang
U.S. Pat. No. 5,505,766 Chang
U.S. Pat. No. 5,607,496 Brooks
U.S. Pat. No. 6,383,981 Blankenship
U.S. Pat. No. 4,786,483 Audeh
U.S. Pat. No. 3,194,629 Dreibelbis, et al
U.S. Pat. No. 4,101,631 Ambrsini, et al
U.S. Pat. No. 3,662,523 Revoir
U.S. Pat. No. 4,708,853 Matviya
U.S. Pat. No. 6,258,334 Gadkaree
U.S. Pat. No. 6,136,072 Sjostrom
U.S. Patent Application 2002/0150516
U.S. Patent Application 2001/0003116 Neufert

The invention claimed is:

1. A method for separating mercury from a mercury-containing gas, the method comprising:
    combusting a mixture of coal and an additive in a combustion chamber, to form the mercury-containing gas, wherein the additive is chosen from halides, halogens, salts thereof, and combinations thereof;
    adding a particulate sorbent material comprising activated carbon into the mercury-containing gas, wherein a weight ratio of the additive added to the coal, added to the combustion chamber, or a combination thereof, to an amount of the sorbent material added to the mercury-containing gas is from about 1:100 to about 30:100;
    contacting mercury in the mercury-containing gas with the sorbent material, to form a mercury-sorbent; and
    separating the mercury-sorbent from the mercury-containing gas.

2. The method of claim 1, further comprising adding the additive to the coal before combusting the coal.

3. The method of claim 2, wherein the additive mixed with the coal is in a liquid.

4. The method of claim 3, wherein the liquid is a hydrocarbon, supercritical carbon dioxide, water, salt solution, or a combination thereof.

5. The method of claim 1, wherein carbocations in the activated carbon of the mercury-sorbent accept electrons from mercury atoms of the mercury-sorbent.

6. The method of claim 1, wherein the additive is substantially in vapor form in the mercury-containing gas.

7. The method of claim 1, wherein the additive is chosen from $Cl_2$, HCl, sodium chloride, calcium chloride, and a combination thereof.

8. The method of claim 1, wherein the additive is chosen from $Br_2$, HBr, sodium bromide, calcium bromide, and a combination thereof.

9. The method of claim 1, wherein the additive is chosen from $PBr_3$, $SCl_2$, and a combination thereof.

10. The method of claim 1, wherein the additive is chosen from $I_2$, HI, sodium iodide, calcium iodide, potassium iodide, and combinations thereof.

11. The method of claim 1, wherein the activated carbon is chosen from powdered activated carbon, granular activated carbon, carbon black, carbon fiber, aerogel carbon, pyrolysis char, and combinations thereof.

12. The method of claim 1, further comprising adding an alkaline component to the mercury-containing gas, the alkaline component chosen from alkali elements, alkaline earth elements, alkali salts, alkaline earth salts, and combinations thereof.

13. The method of claim 1, further comprising contacting the sorbent material with a mercury-stabilizing reagent chosen from S, Se, $H_2S$, $SO_2$, $H_2Se$, $SeO_2$, $CS_2$, $P_2S_5$, and combinations thereof.

14. The method of claim 1, further comprising contacting the sorbent material with a secondary component chosen from halogens, hydrogen halides, Group V halides, Group VI halides, and combinations thereof.

15. The method of claim 14, wherein the secondary component is chosen from halogens, halide salts, HI, HBr, HCl, and combinations thereof.

16. The method of claim 14, wherein the secondary component is chosen from $I_2$, HI, and combinations thereof.

17. A method for separating mercury from a mercury-containing gas, the method comprising:
    combusting coal comprising an additive in a combustion chamber, wherein the additive is chosen from halides, halogens, salts thereof, and combinations thereof, to form the mercury-containing gas, wherein the additive comprises a and b, b and c, a and c, or a, b, and c:
    a) $I^-$ and/or $I_2$,
    b) $Br^-$ and/or $Br_2$,
    c) $Cl^-$ and/or $Cl_2$;
    injecting a sorbent material comprising activated carbon into the mercury-containing gas, wherein a weight ratio of the additive added to the coal, added to the combustion chamber, or a combination thereof, to an amount of the sorbent material added to the mercury-containing gas is from about 1:100 to about 30:100;
    contacting mercury in the mercury-containing gas with the sorbent material, to form a mercury-sorbent; and
    separating the mercury-sorbent from the mercury-containing gas.

18. The method of claim 1, wherein the additive comprises a and b, b and c, a and c, or a, b, and c:
   a) $I^-$ and/or $I_2$,
   b) $Br^-$ and/or $Br_2$,
   c) $Cl^-$ and/or $Cl_2$.

* * * * *

UNITED STATES PATENT AND TRADEMARK OFFICE
CERTIFICATE OF CORRECTION

PATENT NO. : 10,933,370 B2  
APPLICATION NO. : 15/951970  
DATED : March 2, 2021  
INVENTOR(S) : Olson et al.

Page 1 of 2

It is certified that error appears in the above-identified patent and that said Letters Patent is hereby corrected as shown below:

On the Title Page

In "Related U.S. Application Data", in Column 1, Line 1, delete "(60)" and insert --(63)-- therefor On page 5, in Column 2, under "Other Publications", Line 21, delete "MaY" and insert --May-- therefor On page 6, in Column 2, under "Other Publications", Line 59, delete "Actioin" and insert --Action-- therefor On page 7, in Column 1, under "Other Publications", Line 67, delete "ay" and insert --May.-- therefor On page 8, in Column 2, under "Other Publications", Line 71, delete ""Effectsof" and insert --"Effects of-- therefor On page 8, in Column 2, under "Other Publications", Line 72, delete "Reducton" and insert --Reduction-- therefor On page 9, in Column 2, under "Other Publications", Line 5, delete "Remowil" and insert --Removal-- therefor On page 10, in Column 2, under "Other Publications", Line 62, delete "SHeet"" and insert --Sheet"-- therefor On page 10, in Column 2, under "Other Publications", Line 64, delete ""Fluegas" and insert --"Flue gas-- therefor In the Specification In Column 3, Line 13, delete "halides." and insert --halides,-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,933,370 B2

In Column 5, Line 51, delete "an" and insert --art-- therefor

In Column 10, Line 36, delete "131*h* and 131*c*." and insert --131*b* and 131*c*.-- therefor In Column 13, Line 34, after "eliminated", insert --.--

In Column 13, Line 43, after "system", insert --.--

In Column 14, Line 20, after "No", insert --.--

In Column 15, Line 7, delete "FGD." and insert --FGD,-- therefor

In Column 15, Line 7, delete "Marshall." and insert --Marshall,-- therefor

In Column 15, Line 49, delete "Miller." and insert --Miller,-- therefor

In Column 16, Line 12, after "sorbent", insert --.--

In Column 20, Lines 65-66, delete "73%-69%°" and insert --73%-69%-- therefor

In Column 20, Line 66, delete "86%-84° %" and insert --86%-84%-- therefor

In Column 34, Line 3, delete "Ib/Macfgave" and insert --Ib/Macf gave-- therefor

In Column 34, Line 19, delete "I993)" and insert --1993)-- therefor